United States Patent
Nakamura

(10) Patent No.: US 7,912,282 B2
(45) Date of Patent: Mar. 22, 2011

(54) IMAGE PROCESSING APPARATUS FOR CORRECTING AN INPUT IMAGE AND IMAGE PROCESSING METHOD THEREFOR

(75) Inventor: Tomokazu Nakamura, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1127 days.

(21) Appl. No.: 11/525,141

(22) Filed: Sep. 22, 2006

(65) Prior Publication Data
US 2007/0070214 A1  Mar. 29, 2007

(30) Foreign Application Priority Data

Sep. 29, 2005 (JP) ................................. 2005-284519
Feb. 23, 2006 (JP) ................................. 2006-047515

(51) Int. Cl.
*G06K 9/00* (2006.01)
(52) U.S. Cl. .................... 382/167; 382/162; 382/274
(58) Field of Classification Search .................. 382/167, 382/162, 274, 190, 195, 233; 345/640; 396/61, 396/123, 100, 56; 399/13, 49; 347/188, 347/43; 358/502; 348/252, 254, 222.1, E5.074
See application file for complete search history.

(56) References Cited

U.S. PATENT DOCUMENTS

| 4,931,864 | A |  | 6/1990 | Kawamura et al. |
| 5,715,377 | A |  | 2/1998 | Fukushima et al. |
| 5,940,530 | A |  | 8/1999 | Fukushima et al. |
| 6,281,920 | B1 | * | 8/2001 | Agano ......................... 347/188 |
| 7,330,600 | B2 | * | 2/2008 | Nishida ....................... 382/274 |
| 2003/0020974 | A1 |  | 1/2003 | Matsushima |
| 2003/0099407 | A1 |  | 5/2003 | Matsushima |

FOREIGN PATENT DOCUMENTS

JP  2004-180173 A  6/2004

* cited by examiner

*Primary Examiner* — Anh Hong Do
(74) *Attorney, Agent, or Firm* — Birch, Stewart, Kolasch & Birch, LLP

(57) ABSTRACT

An image processing apparatus includes a face detector and a gamma corrector. The face detector detects a subject area or areas out of image data output from an image sensor. A correction table is produced on the basis of luminance values of the subject area and a frequency distribution of luminance, i.e., distribution information derived from the entire or part of an area represented by the image data. The gamma corrector uses either one of the above correction table and a basic correction table to correct the tone of the image data.

102 Claims, 45 Drawing Sheets

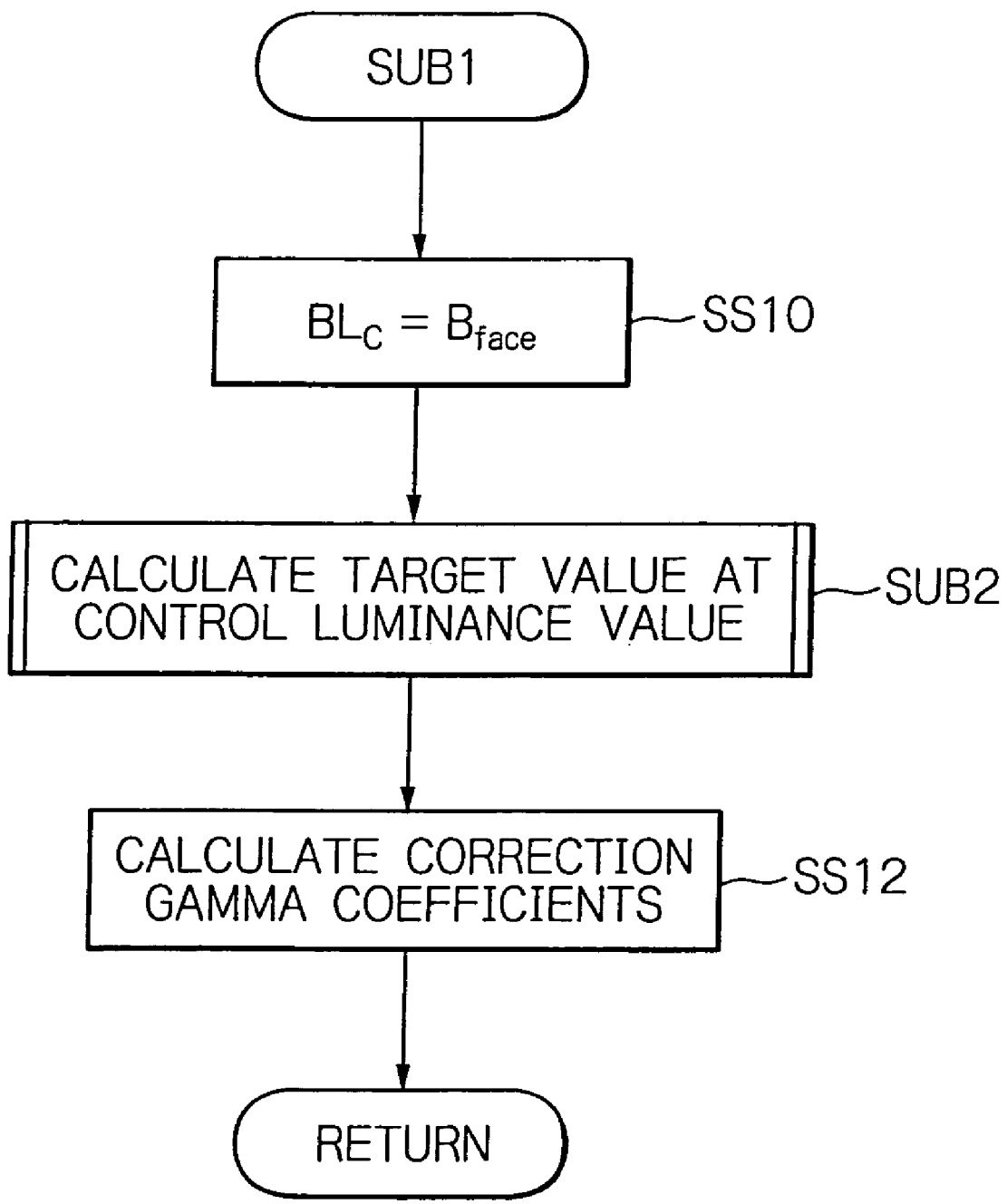

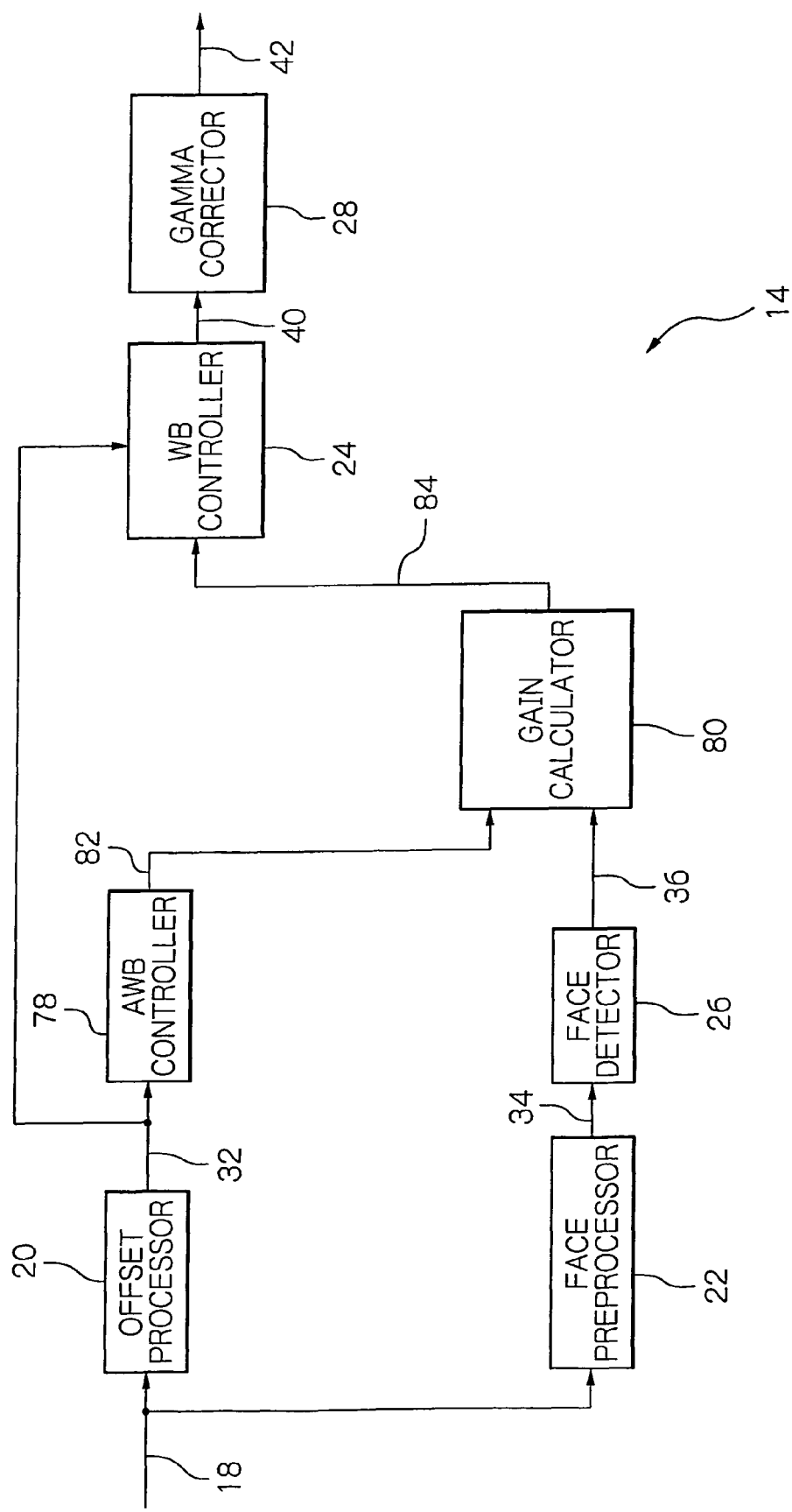

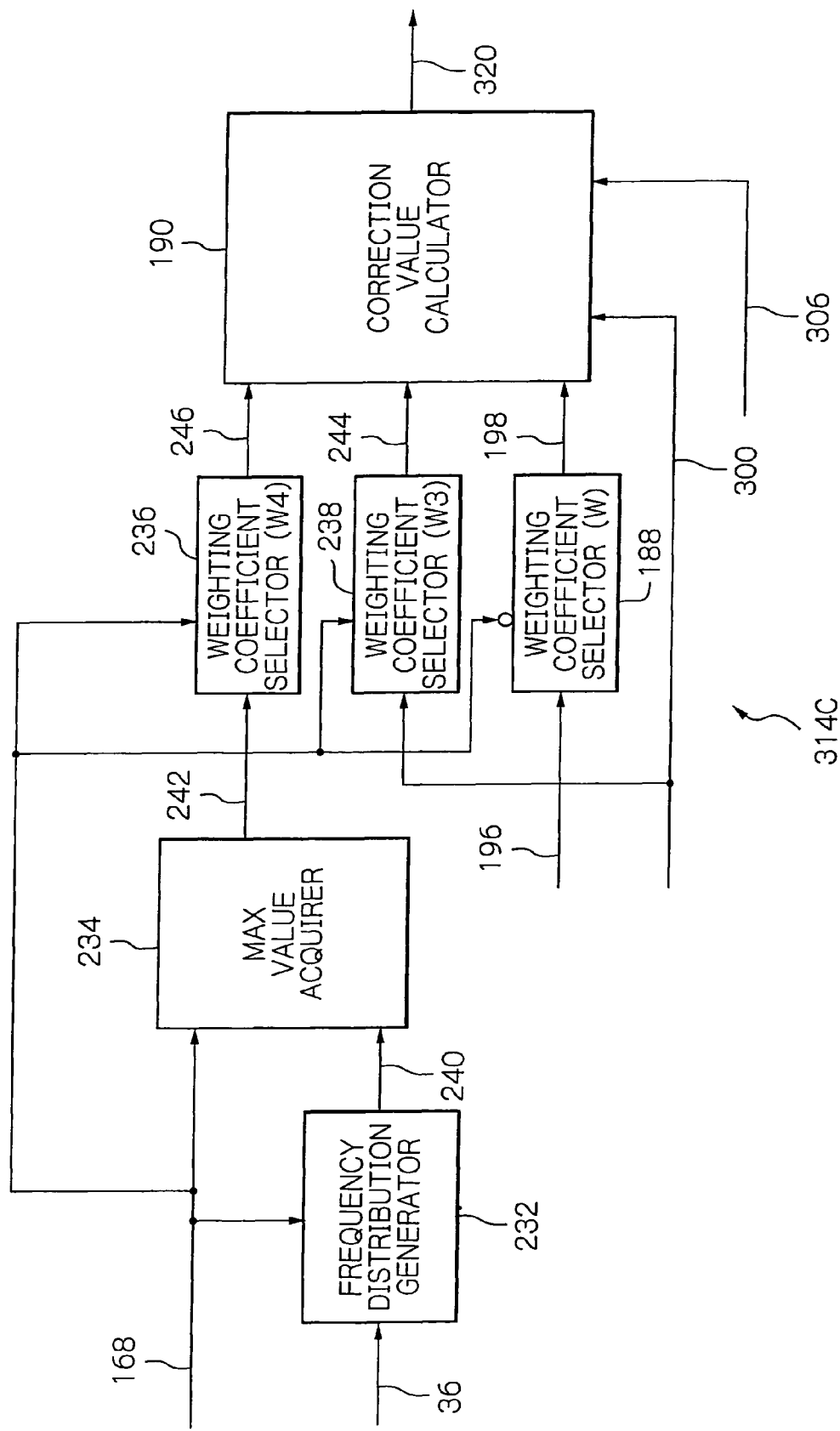

BASIC GAMMA

CORRECTION CURVE

CORRECTION GAMMA

BASIC GAMMA

CORRECTION CURVE

CORRECTION GAMMA

IMAGE PROCESSING APPARATUS FOR CORRECTING AN INPUT IMAGE AND IMAGE PROCESSING METHOD THEREFOR

BACKGROUND OF THE INVENTION

1. Field of the Invention

The present invention relates to an image processing apparatus and an image processing method therefor. More particularly, the present invention relates not only to processing for displaying an image input to, e.g., an image pickup apparatus or an image inputting apparatus, more specifically a digital camera, a video camera, a mobile-phone handset, a scanner or the like, but also to display processing in a recording/reproducing field including a display unit configured to display, e.g., image data recorded in a raw data mode or a printer configured to print images on recording media. Particularly, the present invention relates to automatic display and automatic printing or print service.

2. Description of the Background Art

Various methods have been proposed in the past for correcting an input image in such a manner as to render the image attractive, as will be described hereinafter.

U.S. Pat. No. 4,931,864 to Kawamura et al., for example, discloses an image forming apparatus configured to select a particular area of an image and execute gamma correction adequate for the selected area. U.S. Pat. No. 5,715,377 to Fukushima et al., proposes a gradation correcting method and an apparatus therefor configured to correct gradation in accordance with scene information relating to an input image and the degree of brightness.

Fukushima et al., also proposes a gradation correcting apparatus constructed to divide an image into a plurality of blocks, determine whether on not the image is backlit on the basis of luminance information of the blocks, extract a person on the basis of the luminance and color information of skin and then determine the degree of backlight on the basis of the luminance of the extracted person. The apparatus corrects gradation in accordance with the degree of backlight thus determined.

U.S. patent application publication No. 2003/0020974 A1 to Matsushima discloses an image processing apparatus configured to select a candidate area where the saturation of gradation would be conspicuous if the area were subjected to correction, update a gradation correction curve in accordance with information derived from the candidate area and then correct the entire image by using the above curve. This is successful to protect an image from the saturation of gradation ascribable to correction.

U.S. patent application publication No. 2003/0099407 A1 to Matsushima teaches an image processing apparatus constructed to correct contrast in such a manner as protect, e.g., an image representative of a backlit scene or a portrait from the saturation of gradation and hue variation. More specifically, the image processing apparatus taught in Matsushima '407 selects a candidate area where the saturation of gradation would be conspicuous if the area were subjected to contrast correction, sets a dynamic range in accordance with information derived from the candidate area and then corrects the contrast of the entire image by using the dynamic range thus set.

Further, Japanese patent laid-open publication No. 2004-180173 proposes an image pickup apparatus configured to execute gamma correction for softening the gradation of an image in accordance with the detection of a person present in the image, thereby picking up the person's face attractively.

However, a problem with the prior art technologies described above is that scene analysis cannot always correct a backlit scene, which is one of undesirable scenes including a person or persons, to desirable brightness alone. Another problem is that even if a desired person may be accurately detected and corrected to adequate brightness, it is impossible to correct the entire image to adequate brightness at all times.

SUMMARY OF THE INVENTION

It is an object of the present invention to provide an image processing method and an apparatus therefor capable of controlling not only a subject person included in an image but also the background of the image to adequate brightness.

An image processing apparatus for executing signal processing with input image data of the present invention includes a detector for detecting a subject area, which is included in the image data and includes a subject, characteristically distinguishable from the other area. A tone corrector uses a correction table produced from a representative value of the subject area and distribution information of the entire image area represented by the image data or only part thereof to correct the image data.

The correction table mentioned above may be replaced with a correction value, if desired.

Also, a signal processing method for executing signal processing with image data of the present invention begins with a step of detecting a subject area, which is included in the image data and includes a subject, characteristically distinguishable from the other area. Subsequently, a correction table is calculated on the basis of a representative value of the subject area and distribution information in the entire image area represented by the image data or part thereof. Thereafter, the tone of the image data is corrected by using either one of the calculated correction table and a basic correction table.

Again, the correction value may be replaced with a correction value, if desired.

BRIEF DESCRIPTION OF THE DRAWINGS

The objects and features of the present invention will become more apparent from consideration of the following detailed description taken in conjunction with the accompanying drawings in which:

FIG. 5 is a flowchart showing a subroutine included in the procedure of FIG. 4 in detail;

FIG. 14 is a block diagram schematically showing another specific arrangement of the preprocessor included in FIG. 1 of the illustrative embodiment;

FIG. 35 is a block diagram schematically showing another specific configuration of the target value corrector of FIG. 28;

DESCRIPTION OF THE PREFERRED EMBODIMENTS

Figure 1:
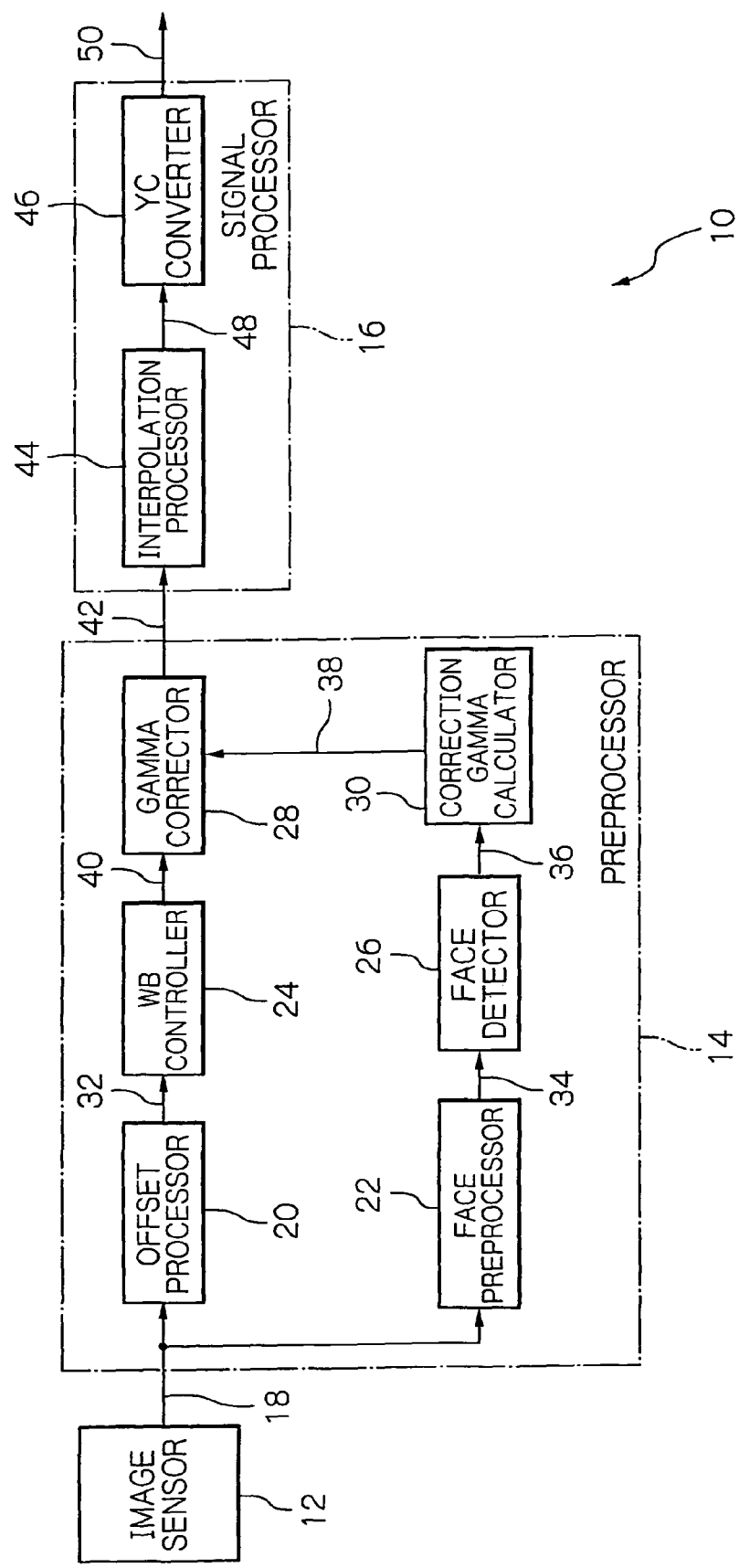
FIG. 1 is a schematic block diagram showing a digital camera to which applied is a preferred embodiment of the image processing apparatus in accordance with the present invention.

Referring to FIG. 1, an image processing apparatus embodying the present invention shown in a schematic block diagram is implemented as a digital camera by way of example. In the figures, part of the circuitry not directly relevant to the understanding of the present invention is not shown, and detailed description thereof will not be made in order to avoid redundancy.

As shown, the digital camera, generally 10, is generally made up of an image sensor 12, a preprocessor 14 and a signal processor 16. The image sensor 12 includes a plurality of photodiodes or photosensors arranged bidimensionally for generating signal charges corresponding to quantities of light incident thereon, although not shown specifically. The signal charges are read out of the image sensor 12 in the form of an analog electric signal 18 in response to a drive signal fed from a driver not shown. Signals are designated by reference numerals designating connections on which they appear. The image sensor 12 may be implemented by, but not limited to, a CCD (Charge Coupled Device) type of image sensor or a C-MOS (Complementary Metal Oxide Semiconductor) type of image sensor. In the illustrative embodiment, the analog electric signal or image signal 18 is a raw image signal, i.e., a signal output in the conventional raw data mode.

The preprocessor 14 includes an offset processor 20, a face preprocessor 22, a white balance (WB) corrector 24, a face detector 26, a gamma corrector 28 and a correction gamma calculator 30. The preprocessor 14 executes noise reduction and digital conversion with the analog image signal 18, although not shown specifically. The analog image signal is digitized by an analog-to-digital (AD) converter, not shown, and then input to the offset processor 20 and face preprocessor 22 as image data. The preprocessor 14 is controlled by a controller not shown.

The offset processor 20 is adapted to set a preselected level, e.g., a preselected black level on the digital data 18 each corresponding to a particular pixel, thereby regulating the level color by color. More specifically, the illustrative embodiment sets a black level in accordance with, e.g., the color attributes of the digital data 18 and feeds the resulting offset-controlled digital data 32 to the WB controller 24.

The face preprocessor 22 executes preprocessing for allowing whether or not the digital signal 18 include a face or faces to be easily determined and feeds the resulting corrected digital data 34 to the face detector 28. For example, the face preprocessor 22 normalizes the image data 18 at a preselected level and controls the gain of the image data 18.

The face detector 26 detects all areas representative of faces (face areas hereinafter) included in the digital data 34 fed from the face preprocessor 22. In the illustrative embodiment, faces included in an image are assumed to be the subject to be picked up. For example, to determine whether or not any face is present in an image, the face detector 26 determines whether or not an evaluation value derived from a face area is greater than a preselected threshold evaluation value. The evaluation value is representative of a degree of likelihood or likelihood based on a score. The face detector 26 feeds a detection signal representative of the result of such face detection to the controller not shown. In response, the controller delivers a control signal matching with the detection signal to the correction gamma calculator 30. The face detector 26 feeds image data 36, including the result of face detection, to the correction gamma calculator 30.

Figure 2:
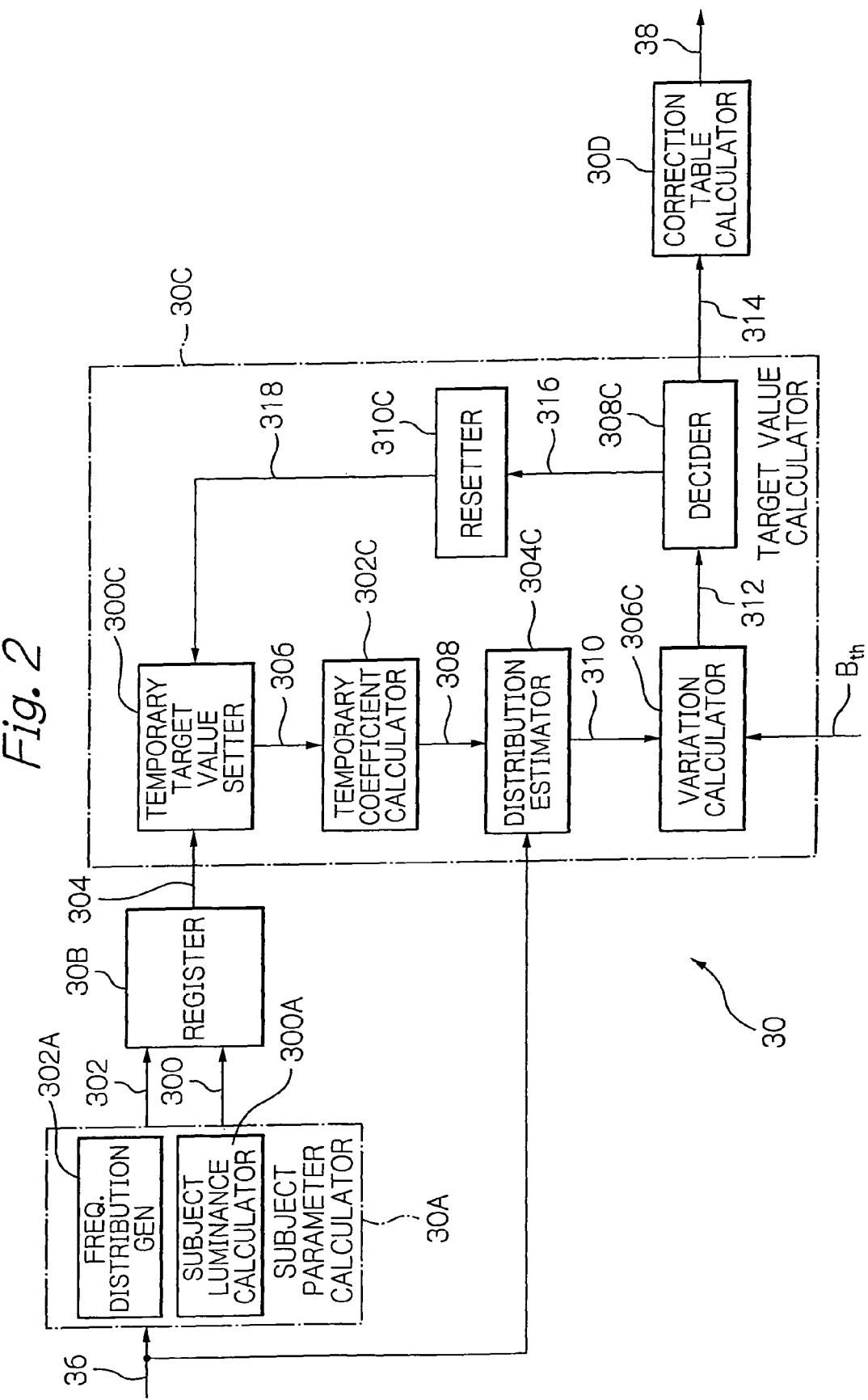
FIG. 2 is a block diagram schematically showing a specific configuration of a correction gamma calculator included in the illustrative embodiment shown in FIG. 1.

The correction gamma calculator 30 generates a corrected gamma table in accordance with the digital information and image data 36 input thereto. FIG. 2 shows a specific configuration of the correction gamma calculator 30. As shown, the correction gamma calculator 30 is made up of a subject parameter calculator 30A, a register 30B, a target value calculator 30C and a correction table calculator 30D.

The subject parameter calculator 30A includes a subject luminance calculator 300A and a frequency distribution generator 302A. The subject luminance calculator 300A generates the luminance value of each subject area as a subject luminance on the basis of one or more of four different conditions, e.g., the luminance of a face area and evaluation values on the position, size and area of a face included in the input image data 36. Alternatively, the subject luminance to be calculated on the basis of the entire image or part thereof may be the luminance of only a preselected reduced number of faces, as will be described later more specifically. Further, the subject luminance may be a weighted mean of subject luminance values indicated by all subject areas detected by weighting the subject luminance values of the individual areas as to at least one of the four conditions mentioned above.

The frequency distribution generator 302A applies a basic correction gamma coefficient stored therein to the input image data 36 to thereby produce a frequency distribution of the subject luminance values as basic distribution information. The face luminance and frequency distribution, respectively labeled 300 and 302 in FIG. 2, thus produced are fed from the subject parameter calculator 30A to the register 30B. The face luminance 300 representative of the luminance of the face area is stored in the register 30B as a control luminance value. The control luminance value 304 is fed from the register 30B to the target value calculator 30C.

The target value calculator 30C calculates, e.g., a true target value or a target value to be actually corrected on the basis of the control luminance value stored in the register 30B or a new or reset temporary target value. In the illustrative embodiment, the target value to be actually corrected will be simply referred to as a target value. A target value 314 thus determined is output to the correction table calculator 30D.

The correction table calculator 30D calculates correction gamma coefficients in the form of a correction gradation table on the basis of a spline curve that uses the target value calculated by the target value calculator 30C and the maximum and minimum output values.

The target value calculator 30C includes a temporary target value setter 300C, a temporary coefficient calculator 302C, a distribution estimator 304C, a variation calculator 306C, a decider 308C and a resetter 310C. The temporary target value setter 300C sets a temporary target value on the basis of the control luminance value, which is equal to the face luminance, 304 representative of the luminance of the face area or areas and feeds a temporary target value 306 thus set to the temporary coefficient calculator 302C.

The temporary coefficient calculator 302C determines a temporary correction gamma coefficient on the basis of the temporary target value 306 and feeds a temporary correction gamma coefficient 308 thus determined to the distribution estimator 304C. The distribution estimator 304C applies the temporary gamma efficient to the input image data 36 to thereby output an estimated frequency distribution as estimated distribution information. The estimated frequency distribution refers to distribution information identical with the basic frequency distribution information stated previously. Such distribution information is generally referred to as a luminance distribution derived from the entire image or part thereof. The estimated frequency distribution is fed from the distribution estimator 304C to the variation calculator 306C as generated information 310.

As for the variation calculator 306C, luminance values equal to or above a highlight value threshold $B_{th}$ set in the basic frequency distribution by the luminance distribution generator 302A are used as highlight portions, although not shown specifically. The variation calculator 306C integrates the generated information or estimated frequency distribution 310 and the frequencies of the highlight portions in the respective distributions and then produces a difference between the estimated frequency distribution and the integrated frequency of each distribution. The variation calculator 306C feeds the variation Δ to the decider 308C as its output 312.

On receiving the variation Δ, the decider 308C determines whether or not the variation Δ is smaller than a preselected value α. If the answer of this decision is positive, the decider 308C sets a target value 314 as a temporary target value and delivers it to the correction table calculator 30D. If the answer of the above decision is negative, meaning that the variation Δ is greater than the preselected value α inclusive, the decider 308C feeds a temporary target value 316 to be currently used to the resetter 310.

The resetter 310C sets a new or reset temporary target value on the basis of the temporary target value 316 input thereto and feeds it to the temporary target value setter 300C as its output 318.

The target value calculator 30C may be configured to calculate, as representative values, luminance values obtainable from color signals in the detected subject area, although not shown specifically. In such a case, the target value calculator 30C is capable of assuming temporary correction gamma coefficients based on the color-based representative values with the configuration stated above and then calculate a target value matching with the object of the present invention. As for the target value, an arrangement may be made such that representative values of color components are calculated on a color signal basis and used to calculate actual correction gamma coefficients color by color, so that tone is corrected color by color. With this function, it is possible to provide faces and the entire image including them with adequate brightness and colors.

The correction table calculator 30D generates a gradation table, which has a gradation correcting function, on the basis of a spline curve using a target value and the maximum and minimum values of an output. The correction table calculator 30D selectively delivers a gradation table generated in accordance with the control signal or a basic gradation table to the gamma corrector 28, FIG. 1, as its output 38, allowing the tone of the image data 40 to be corrected.

Tone correction mentioned above refers to gradation correction or gain correction executed with the image data by using gamma correction or gains, respectively. The gradation correction and gain correction are assigned to a gamma corrector 28 and a WB controller 24, respectively, which will be described specifically later. The preprocessor 14 of the illustrative embodiment concentrates on gradation correction.

The correction gamma calculator 30 may be configured such that it operates only when a control signal indicative of face detection is generated by the controller, not shown, and fed thereto, and does not operate, when otherwise, but outputs a basic gradation table. This is successful to save power. The correction gamma calculator 30 delivers the gamma coefficients thus determined to the gamma corrector 28 as its output 38.

The WB controller 24 controls the white balance of the digital signal 32 subjected to offset control and feeds the resulting WB-controlled digital signal to the gamma corrector 28 in the form of image data 40.

The gamma corrector 28 executes gamma correction on the input image data 40 in accordance with the gamma coefficients 38 for thereby correcting the tone of the image data 40. The gamma corrector 28 may alternatively be configured to store a conversion table listing gamma coefficients for usual tone correction. In such a case, in the event of unusual tone correction, e.g., when a face is detected, the correction gamma coefficients 38, selected from a correction table calculated by the gamma calculator 30 beforehand, is fed to the gamma corrector 28, causing the gamma corrector 28 to execute tone correction with the correction gamma coefficients 38. Image data 42 thus corrected in tone is fed to the signal processor 16.

The signal processor 16 includes an interpolation processor 44 and a YC converter 46. The image data 42 input to the signal processor include color components, or color attributes, corresponding to photosensors, not shown, arranged in the image sensor 12. More specifically, in the image sensor 12, a color filter made up of color filter segments is positioned at the light incidence side for separating light incident to the photosensors to color components, although not shown specifically. In this condition, the image data 42 do not include image data corresponding to colors other than the colors of the color filter segments. The interpolation processor 44 produces colors other than the color attributes of the photosensors by, e.g., interpolation that calculates a weighted mean of image data around each subject photosensor. Such interpolation is successful to implement all colors at least for the photosensors of the image sensor 12. Image data 48 thus interpolated are input to the YC converter 46.

The YC converter 46 converts the input image data 48 to a luminance signal Y and color difference signals (R-Y) and (B-Y) and outputs image data 50 consisting of the signals Y, (R-Y) and (B-Y). The image data 50 are written to a recording medium via, e.g., a compressor, although not shown specifically.

The arrangements stated above are applicable not only to a digital camera but also to any other apparatus having an image pickup capability, e.g., a mobile-phone handset or an image inputting apparatus. Also, by applying conversion for display to the image data 50, it is possible to generate image data with a display format so as to display them on a monitor.

A raw data mode is available with the digital camera 10 for simply recording raw data output from the image sensor 12, i.e., not subjected to any processing. Even the image data recorded in the raw data mode can be reproduced as image data 50 if read out to the input side of the preprocessor 14 and then sequentially subjected to preprocessing and signal processing stated above. Further, subtractive mixture of color, e.g., YeMzCy conversion may be applied to the image data 48 output from the interpolation processor 44 in order to generate image data for printing. By sending such image data to a printer, it is possible to automatically print an attractive image or implement an automatic print service.

It should be noted that the principle of face detection unique to the illustrative embodiment is similarly applicable to a flower, an animal's face, a character or the like. The alternative configurations stated above are, of course, practicable with a digital camera, a mobile-phone handset, an image display unit, a printer, a print service or the like even in an alternative embodiment to be described later.

Figure 3:
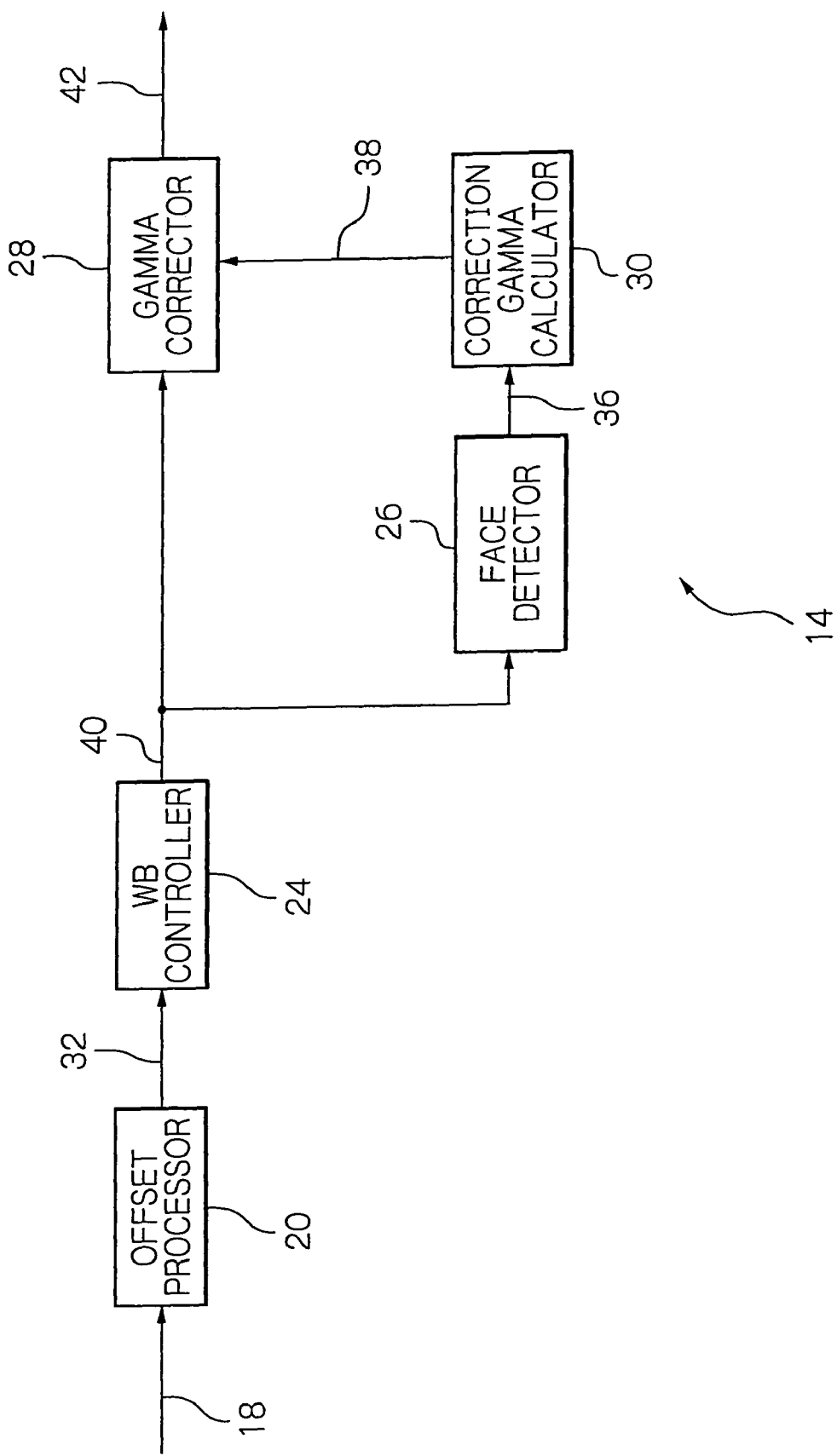
FIG. 3 is a block diagram schematically showing another specific arrangement of a preprocessor included in the illustrative embodiment shown in FIG. 1.

FIG. 3 shows another specific configuration of the preprocessor 14, which is simpler than the configuration of FIG. 1. As shown, the image data 40 output from the WB controller 24 are input to the face detector 26 so as to detect a face. Subsequently, correction gamma coefficients, i.e., the usual gamma correction coefficients or the correction gamma coefficients 38 calculated are fed to the gamma corrector 28 in accordance with the output of the face detector 26. The gamma corrector 28 therefore corrects the tone of the image data with the usual gamma coefficients or the correction gamma coefficients. In the circuitry of FIG. 3, blocks identical with the blocks shown in FIG. 1 are designated by identical reference numerals, and a detailed description thereof will not be made in order to avoid redundancy.

Figure 4:
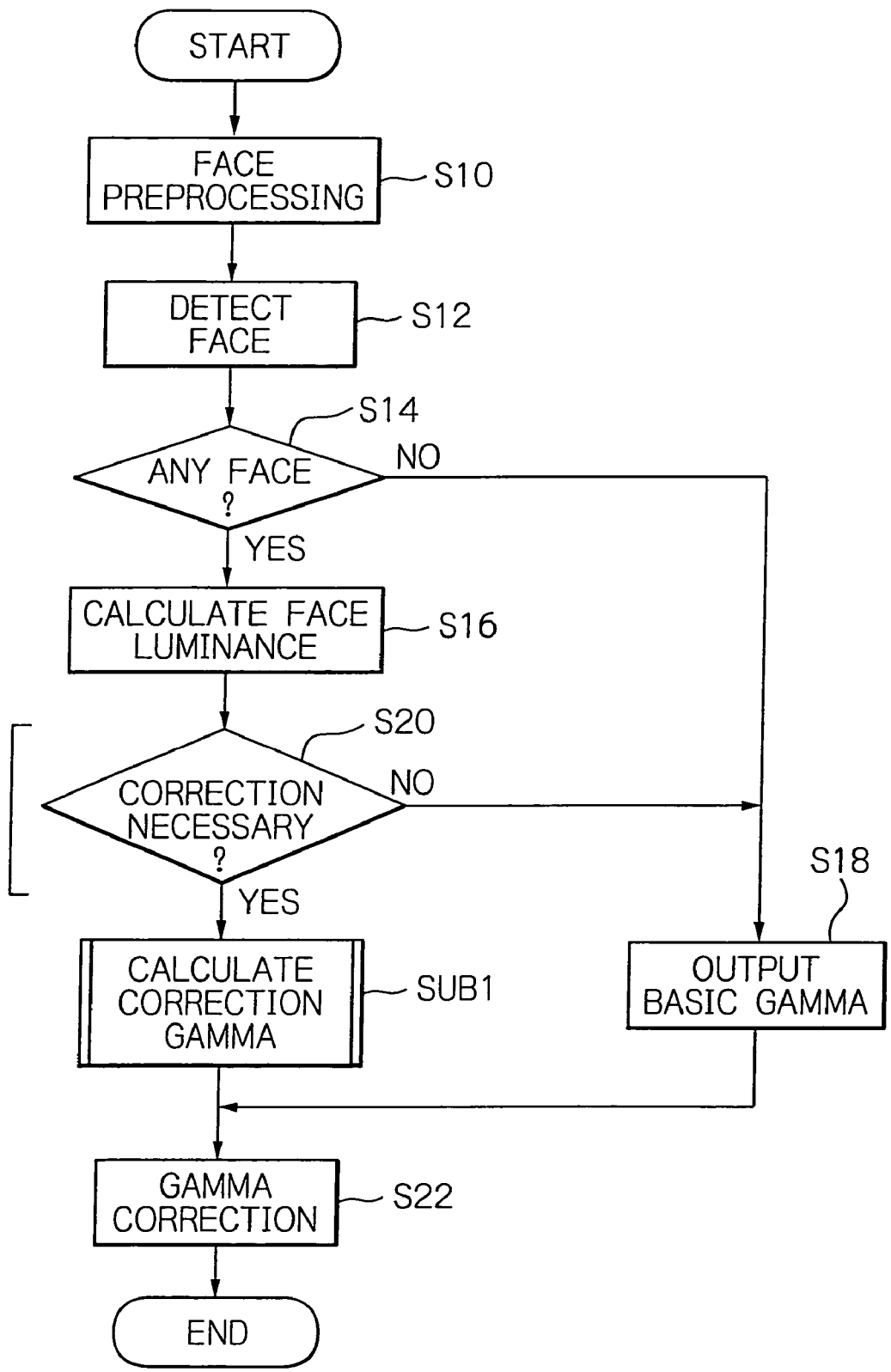
FIG. 4 is a flowchart demonstrating a specific preprocessing procedure of the digital camera of the illustrative embodiment shown in FIG. 1.

Reference will be made to FIG. 4 for describing tone correction executed by the preprocessor 14 and characterizing the illustrative embodiment. Briefly, for tone correction, the preprocessor 14 detects subject areas each containing a subject and characteristically distinguishable from the other area in image data, calculates a correction table on the basis of a representative value of the subject area thus detected and distribution information in the entire area or part thereof represented by the image data, and then corrects the tone of the image data by using either one of the calculated correction table and basic correction table.

More specifically, the preprocessor 14 receives the image signal 18 from the image sensor 12, converts the image signal 18 to image data, and delivers the image data to the face preprocessor 22, although not shown specifically. The face preprocessor 22 feeds the resulting digital signal 34 to the face detector 26 for allowing the face detector 28 to easily determine whether or not the digital signal includes a face or faces (step S10).

The face detector 26 detects a subject area including a person's face out of the entire image area represented by the input digital signal 34 (step S12). For such detection, the face detector 26 determines, e.g., whether or not an evaluation value of likelihood greater than a preselected threshold value exists. Of course, the evaluation value of likelihood may be replaced with any one of the other three conditions stated earlier, i.e., the luminance, position and size of a face.

The face detector 26 then determines whether or not the result of the above detection shows the presence of a face, e.g., whether or not an estimation value greater than the threshold value exists in the digital signal 34 (step S14). If the answer of the step S14 is positive, YES, face luminance is calculated (step S16). If the answer of the step S14 is negative, NO, usual processing is executed (step S18).

Subsequently, the subject luminance calculator 300A, included in the correction gamma calculator 30, calculates luminance values of the individual subject areas for thereby determining face luminance area by area (step S16). Let the face luminance be defined as a mean value of luminance values in the calculated area by way of example. When a plurality of face luminance values are detected, a weighting coefficient, based on at least one of the evaluation values of the luminance, position, size and area of a face and determining the degree of importance, may be set as the luminance of the face area. In such a case, the weighted mean of luminance in all subject areas of interest is produced by dividing the sum of weighted luminance values, which are produced by multiplying the luminance values of the face areas by the weighting coefficient, by the total area of the face areas.

In the illustrative embodiment, a luminance value is implemented by one of a luminance component Y and color components R (red), G (green) and B (blue), L* representative of a color value or brightness in the CIE (Commission Internationale de l' Éclairage) 1976 L*a*b* color space or the CIE 1976 L*u*v* color space or Y of the XYZ color system. Alternatively, the luminance value may be implemented by a color component conventional with the subtractive mixture of color, i.e., the Y (yellow), M (magenta), C (cyan) and K (black) color system.

After the step S16, the correction gamma calculator 30 determines whether or not to correct the calculated face luminance by comparing it with the luminance threshold value (step S20).

If the answer of the step S14 is NO, meaning that the information fed from the face detector 26 shows that a face is absent in the image, the correction gamma calculator 30 outputs a basic gamma coefficients 38 via usual processing. More specifically, the correction gamma calculator 30 corrects the tone of the input image data 40 by using the basic gamma coefficients, i.e., tone correction data. The usual processing mentioned above refers to offset processing and WB correction sequentially executed with the input digital signal for thereby executing correction with the basic gamma coefficient data output from the correction gamma calculator 30 (step S18).

After the step S16, the correction gamma calculator 30 determines whether or not to correct the gamma coefficients on the basis of the face luminance represented by the image data from which a face has been detected (step S20). If the answer of the step 20 is NO, meaning that the calculated face luminance is higher than the threshold luminance, the step S18 for outputting the basic gamma coefficients is executed. If the answer of the step S20 is YES, meaning that the calculated face luminance is lower than the threshold luminance inclusive, a subroutine SUB1 is executed in which the correction gamma calculator 30 corrects the gamma coefficients.

Subsequently, the tone of the input image data 40 is corrected by the basic gamma correction or the corrected gamma correction (step S22). After such tone correction, the image data 42 are fed to the signal processor 16. This is the end of the preprocessing routine. As for the decision on whether or not to execute correction stated above, tone may be corrected in an incrementing direction or a decrementing direction with respect to a solid curve 52, see FIGS. 6A and 6B, derived from the basic gamma correction in matching relation to the condition selected.

Figure 6A:
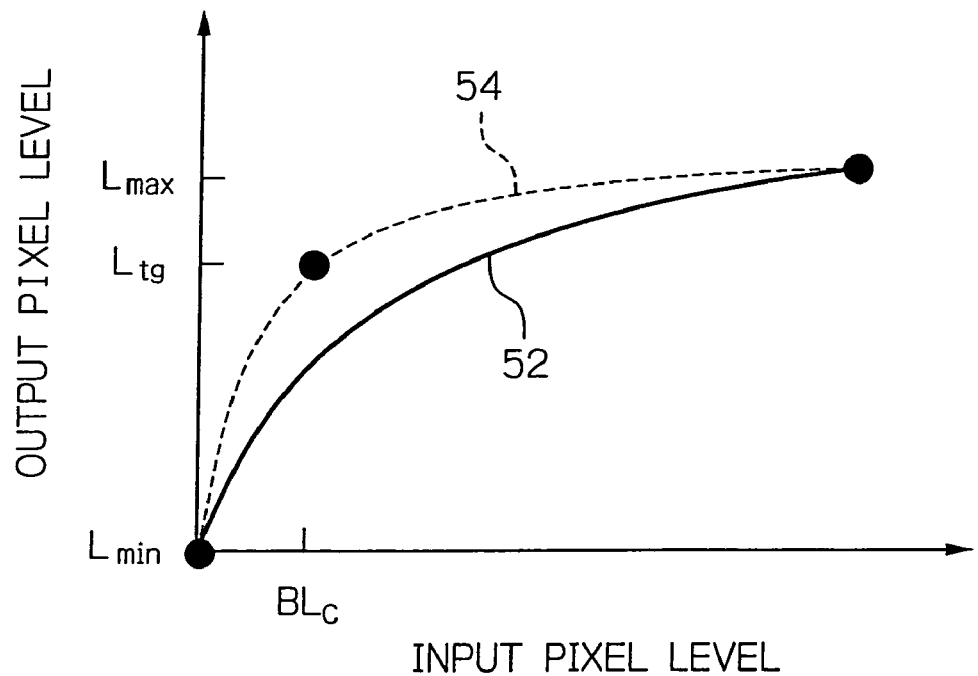
FIGS. 6A and 6B are graphs each showing a particular relation between input pixel levels and output pixel levels implemented by the procedure of FIG. 4.

FIG. 5 shows the subroutine SUB1 for calculating a corrected gamma coefficients specifically. Assume that the minimum possible level and maximum possible level of a pixel are $L_{min}$ and $L_{max}$, respectively. Then, as shown in FIG. 5, the face luminance $B_{face}$ of the input image data is controlled to a control luminance value ($BL_c = B_{face}$, substep SS10). Subsequently, a target value $L_{tg}$ of a control luminance value $B_c$ for providing the face and the entire image with adequate brightness is calculated (subroutine SUB2). The target value $L_{tg}$ thus calculated and the minimum level $L_{min}$ and maximum level $L_{max}$ are used to calculate corrected gamma coefficients based on spline interpolation (substep SS12). By such calculation, a table listing corrected gamma coefficients is produced. As shown in FIG. 6A, when the correction gamma coefficients thus determined are applied to input pixel levels, the output pixel level subjected to tone correction, represented by a dotted curve 54, can be made higher than the output pixel level, represented by a solid curve 52, to which the basic gamma coefficients is applied.

Referring again to FIG. 5, the subroutine SUB1 ends after the substep SS12. The procedure then returns to the step S22, FIG. 4.

The subroutine SUB2, FIG. 5, for calculating the target luminance value $L_{tg}$ will be described with reference to FIG. 7. As shown, paying attention only to the detected face area, a temporary target value $L_v$ at the control luminance value $BL_c$ is set (substep SS20). Initially, the temporary target value $L_v$ is set in accordance with the control luminance value $BL_c$ with reference to, e.g., a lookup table stored in the correction gamma calculator 30, although not shown specifically.

Subsequently, a luminance distribution or a frequency distribution shown in FIG. 8A and to be established when the basic gamma correction is applied to the image data of the entire input image is determined (substep SS22). A temporary corrected gamma coefficient is calculated on the basis of the temporary target value $L_v$ set beforehand (substep SS24).

Figure 8:
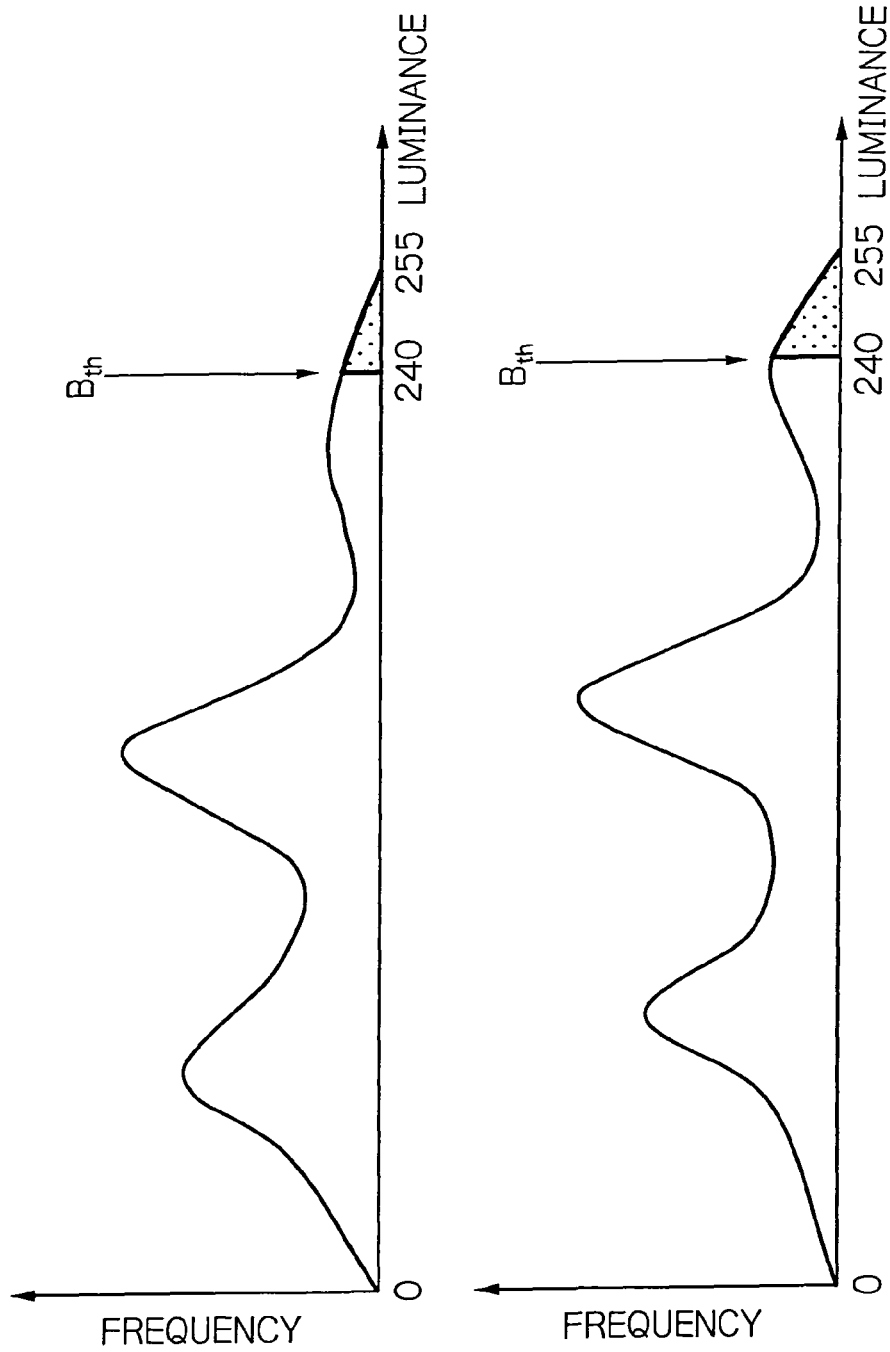
FIGS. 8A and 8B are graphs respectively showing luminance distributions resulting when a basic gamma coefficient and a correction gamma coefficient are applied to an image included in the procedure of FIG. 5.

After the substep SS24, there is estimated a luminance distribution shown in FIG. 8B and to be established when the above temporary correction gamma coefficient is applied to the input image data 36 (substep SS26). Such a luminance distribution may be simply estimated on the basis of the basic luminance distribution, if desired.

Subsequently, as shown in FIGS. 8A and 8B, assume that luminance representative of highlight is $B_{th}$, which is selected to be "240" in eight-bit luminance representation in the illustrative embodiment. Then, the frequencies $N_{base}$ and $N_v$ of pixels higher than the luminance $B_{th}$ inclusive are determined (substep SS28). Subsequently, a difference between the pixel frequencies $N_{base}$ and $N_v$, i.e., a variation $\Delta$ is produced (substep SS30), and then whether or not the variation $\Delta$ lies in a preselected allowable range $\alpha$, i.e., $\alpha > \Delta$ is determined (substep SS32). If the answer of the substep SS32 is YES, the temporary target value $L_v$ is used as the target value $L_{tg}$ ($L_{tg}=L_v$, substep SS34). Thereafter, a preselected step value $L_v$ is added to the temporary target value $L_v$ to thereby set a new temporary target value $L_v$ ($L_v=L_v+L_{sv}$, substep SS36). After the substep SS36, the procedure returns to the substep SS24 for newly calculating a temporary correction gamma coefficient at the temporary target value $L_v$.

By the tone correction stated above, it is possible to correct even an image consisting of a face and background to adequate brightness.

Figure 7:
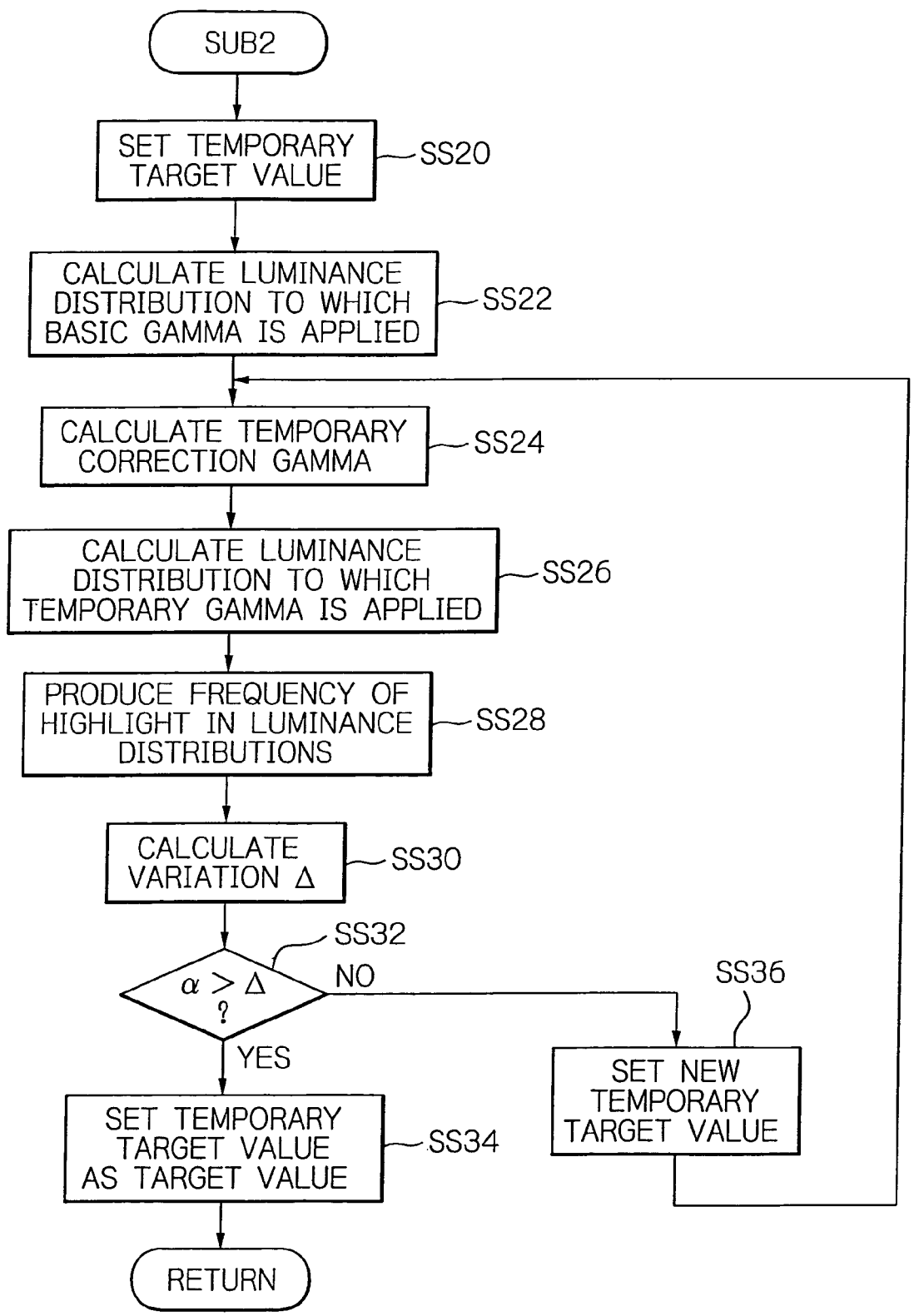
FIG. 7 is a flowchart showing a subroutine included in the procedure of FIG. 5.

It should be noted that the target value $L_{tg}$ may be selected by any method other than the method of FIG. 7 that uses a variation $\Delta$ derived from the frequencies $N_{base}$ and $N_v$ of pixels above the luminance $B_{th}$ inclusive and the allowable range $\alpha$. An alternative method will be described with reference to FIG. 9. It is generally understood that while a luminance distribution is obtainable if a basic gamma coefficient is used while the luminance position representative of the peak of a frequency, i.e., a peak luminance value $B_p$ in the luminance distribution based on the basic gamma coefficient is shifted toward a higher luminance side.

Figure 9:
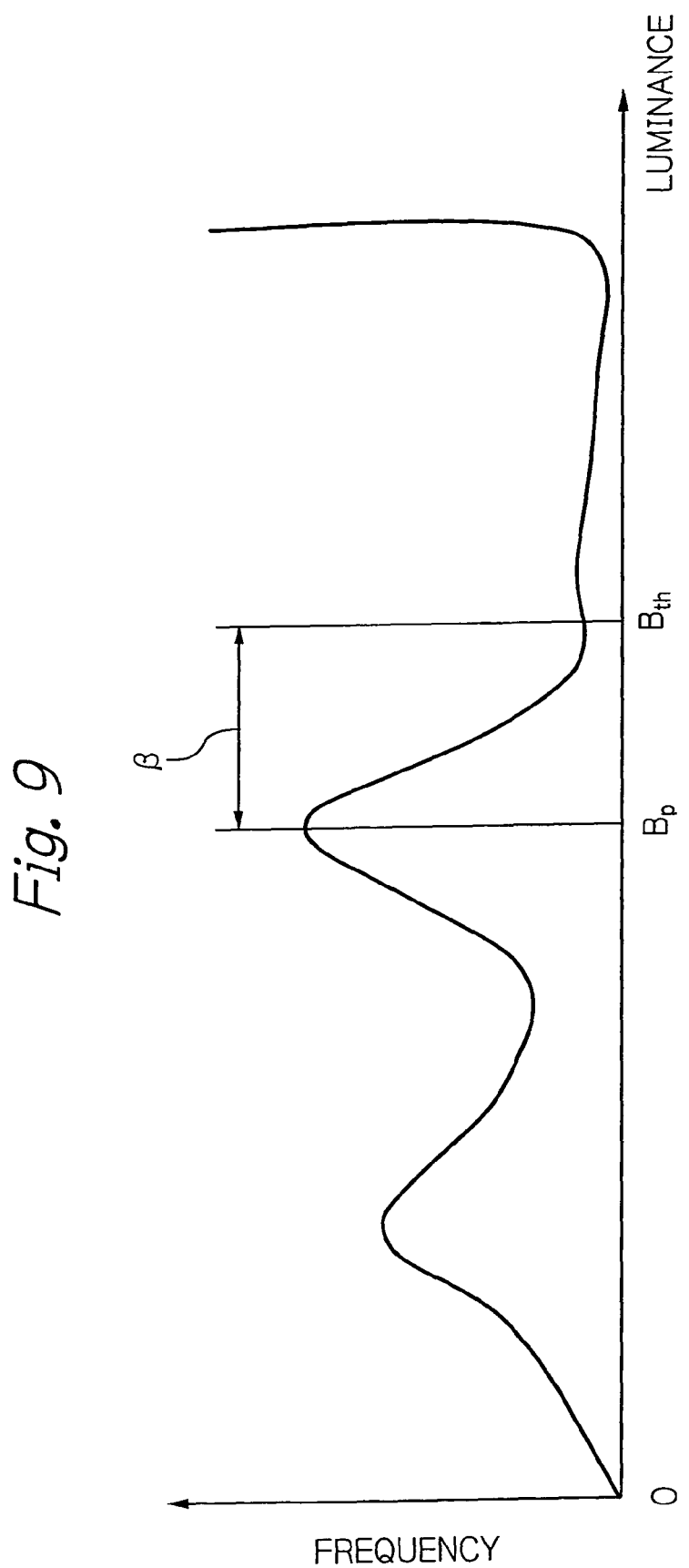
FIG. 9 is a graph representative of another specific procedure executed for the same purpose as the procedure of FIG. 7.

In light of the above, the alternative method shown in FIG. 9 sets the luminance $B_p$ representative of highlight and an allowable range $\beta$ and uses a difference between the luminance $B_{th}$ and the peak luminance $B_p$ as a variation $\delta$. If the variation $\delta$ lies in the allowable range $\beta$, the temporary target value $L_v$ is used as the target value $L_{tg}$ while, if the former does not lie in the latter, the preselected step value $L_{sv}$ is added to the target value $L_{tg}$ for setting a new or reset temporary target value $L_v$. If desired, a sign to be added to the step value $L_{sv}$ in the event of resetting may be set by initial setting or by the user.

With the above method described with reference to FIG. 9, too, it is possible to correct even an image consisting of a face and background to desirable brightness.

The decision step S20 included in the procedure of FIG. 4 may be omitted, if desired. By omitting the step S20, it is possible to make an excessively dark face bright, as indicated by the dashed curve 54 in FIG. 6B, or make an excessively dark face comparatively dark, as indicated by a solid curve 56 shown in FIG. 6B. This means that the target value $L_{tg}$ can be increased or decreased with respect to the solid curve 52, as desired.

Figure 10:
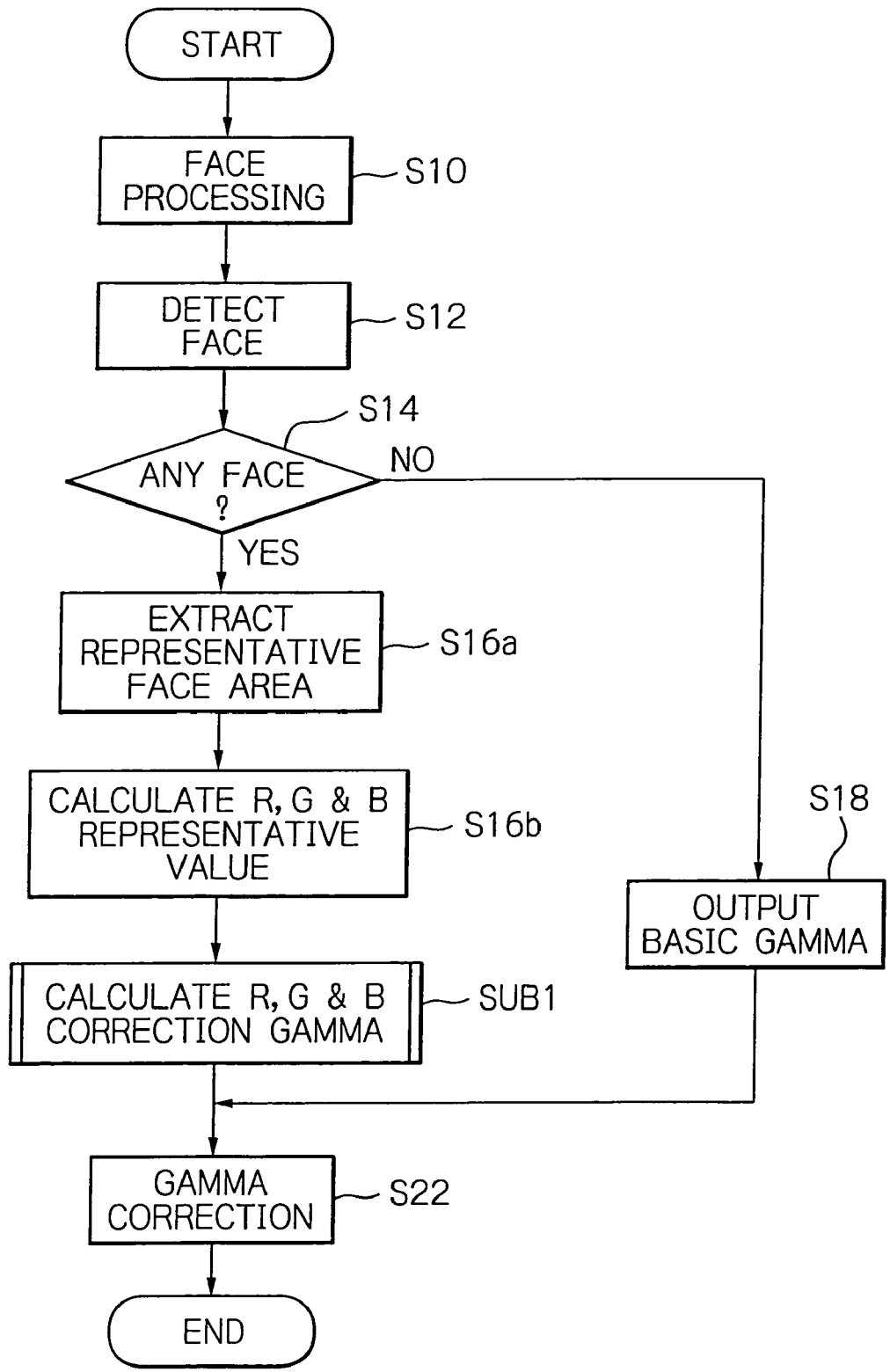
FIG. 10 is a flowchart showing how an R (red), a G (green) and a B (blue) correction gamma coefficient are calculated for preprocessing on the basis of the procedure of FIG. 4.

FIG. 10 demonstrates another specific procedure practicable with the illustrative embodiment. Briefly, paying attention to color signals included in the input image data, the procedure of FIG. 10 calculates a correction gamma coefficient for each color component and corrects tone with the resulting corrected gamma coefficients.

More specifically, as shown in FIG. 10, if subject areas, including a face each, are detected (YES, step S14), not only the face luminance of each subject area is calculated, but also a representative face area is extracted on the basis of at least one of the luminance, position, size and likelihood or score of the face area (step S16a).

Subsequently, the intermediate value of a frequency distribution is calculated for each of the colors R, G and B forming the representative face area and used as a representative value (step S16b). The intermediate value may be replaced with a simple mean value, if desired. Again, the target value $L_{tg}$ can be increased or decreased with respect to the solid curve 52, as desired. Assume that the representative values of the colors R, G and B are $B_{CR}$, $B_{CG}$ and $B_{CB}$. The step S16b corresponds to the substep SS20 of the subroutine SUB2 shown in FIG. 7.

Figure 11A:
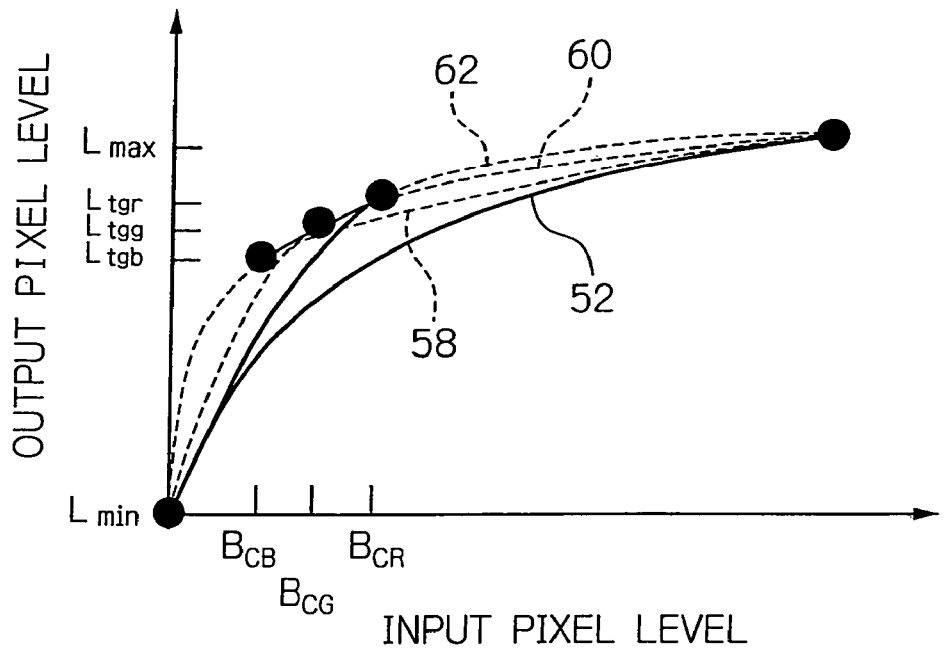
FIGS 11A and 11B are graphs respectively showing relations between input pixel levels and output pixel levels corresponding to colors R, G and B and a face area.

In the step of calculating a corrected gamma coefficient (subroutine SUB1), there should preferably be produced target values $L_{tgr}$, $L_{tgg}$ and $L_{tgb}$ for the control values $B_{CR}$, $B_{CG}$ and $B_{CB}$ of the colors R, G and B, respectively. For corrected gamma coefficients for the colors R, G and B, spline interpolation is executed by using thee sets of three values, i.e., the target value $L_{tgr}$ and minimum and maximum levels $L_{min}$ and $L_{max}$, the target value $L_{tgg}$ and minimum and maximum levels $L_{min}$ and $L_{max}$ and the target value $L_{tgb}$ and minimum and maximum levels $L_{min}$ and $L_{max}$. As shown in FIG. 11A, output pixel data are represented by dotted lines 58, 60 and 62 representative of tone correction using the R, G and B correction gamma coefficients, respectively, relative to the solid curve 52 representative of tone correction using the basic gamma coefficient. By applying such correction gamma coefficients to the image data 40, it is possible to execute tone correction in such a manner as to provide the face and entire image with adequate brightness and colors, thereby correcting even an image consisting of a face and background to desirable brightness.

Figure 12:
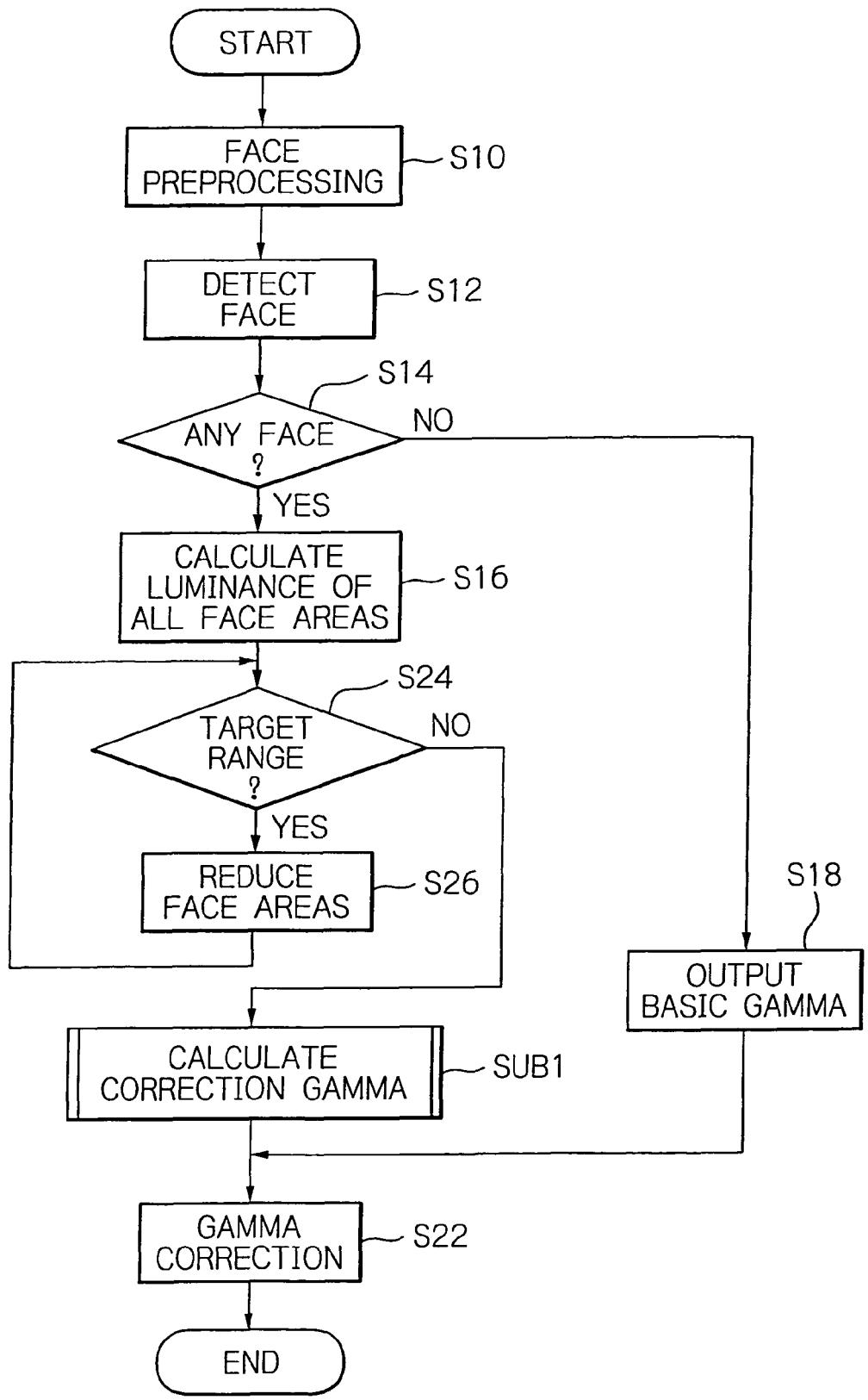
FIG. 12 is a flowchart showing how a correction gamma coefficient is calculated for preprocessing in relation to a face area on the basis of the procedure of FIG. 4.

FIG. 12 shows another specific procedure also available with the illustrative embodiment and executing tone correction by calculating corrected gamma coefficients while paying attention to the number of faces included in the input image. As shown, when face areas are detected in the input image (YES, step S14), luminance of each face area is calculated (step S16). This allows the number of faces FN present in the image to be determined.

Subsequently, it is determined whether or not the number of faces FN is excessively great (step S24). More specifically, the upper limit $FN_u$ of the number of faces allowed to exist in a single image is determined beforehand. If the number of faces FN is greater than the upper limit $FN_u$ inclusive (YES, step S24), the number FN is determined to exceed the allowable or target range. This is followed by a step S16. Otherwise (NO, step S24), correction gamma coefficients are calculated (subroutine SUB1).

In the step S26, the number of faces FN is reduced by the subject luminance calculator 30A by using at least one of the four conditions, i.e., the luminance and the position, size and likelihood of a face. After the step S26, the procedure returns to the step S24 for again determining whether or not the number of faces FN lies in the target range.

Figure 11B:
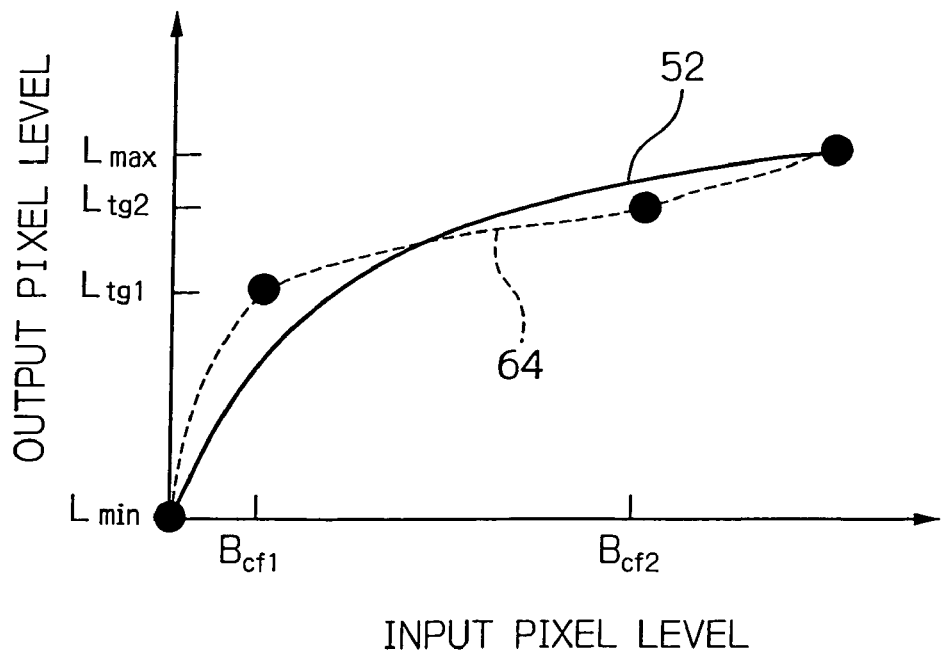

Subsequently, correction gamma coefficients are calculated (subroutine SUB1). In this specific procedure, as shown in FIG. 11B, control target values $B_{cf1}$ and $B_{cf2}$ are set within the upper limit $FN_u$ of the number of faces FN. In this case, target values $L_{tg1}$ and $L_{tg2}$ are produced for the control target values $B_{cf1}$ and $B_{cf2}$, respectively (subroutine SUB2) Spline interpolation based on the target values $L_{tg1}$ and $L_{tg2}$ thus determined is executed for calculating interpolation gamma coefficients. It will be seen that the correction gamma coefficients allows tone to be corrected to the output pixel levels represented by the dotted line 64, FIG. 11B. Of course, R, G and B corrected gamma coefficients for a single face luminance may be calculated, as stated previously, instead of paying attention to the number of faces FN. The R, G and B color signals may, of course, be replaced with Y, M, C and K color signals.

In the specific procedures described above, a target value is determined for a control luminance value by setting a temporary target value, generating a first and a second luminance frequency distribution derived from basic gamma coefficients and correction gamma coefficients, respectively, and determining whether or not a variation between the two frequency distributions lies in a preselected allowable range. If desired, spatial distribution information may be additionally applied to the calculation of the target value or may be applied alone. Preferably, both the frequency distributions and spatial distribution information should be used.

Figure 13A:
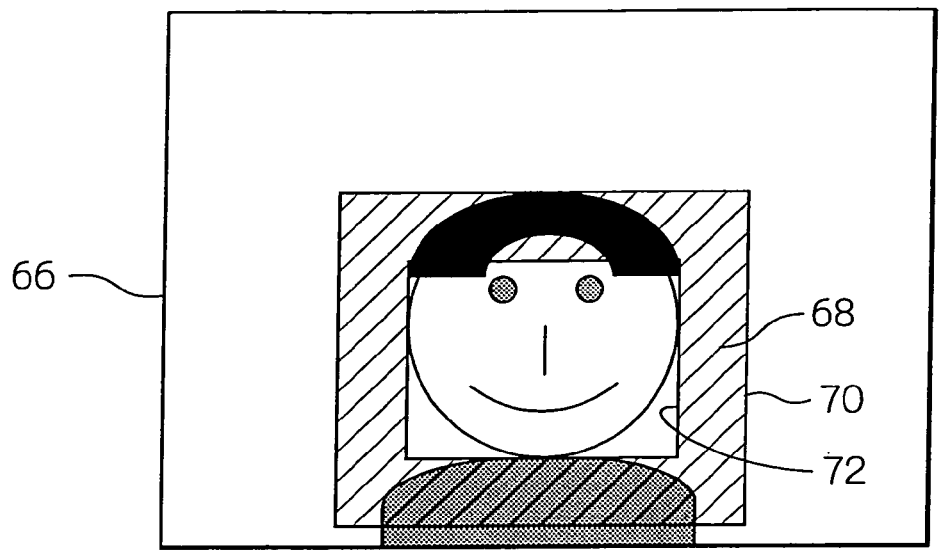
FIGS. 13A, 13B and 13C show a specific image representative of processing for calculating correction gamma coefficients by using spatial information, which corresponds to a particular region set in a face area, on the basis of the procedure of FIG. 4.

FIG. 13A shows a specific image 66 in which a monitor zone 68 indicated by hatching is set. The monitor zone 68 surrounds a face area or subject area and is delimited by an outer frame 70 greater than the face area and an inner frame 72 distinguishing the face area from the other area.

There are determined beforehand a luminance threshold or decision level $B_{th}$ relating to luminance in the monitor zone 68 and an area threshold $A_{th}$ for determining an area in which the luminance is higher than the threshold luminance inclusive.

Figure 13B:
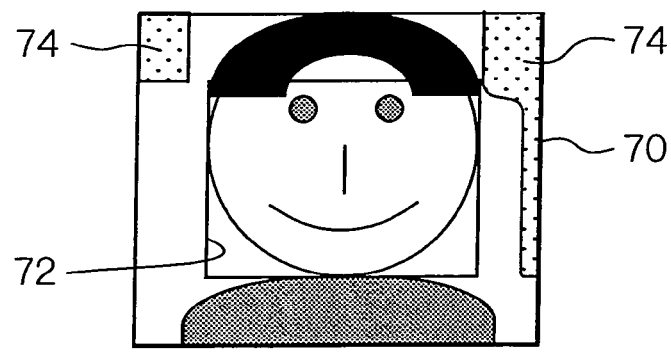
Figure 13C:
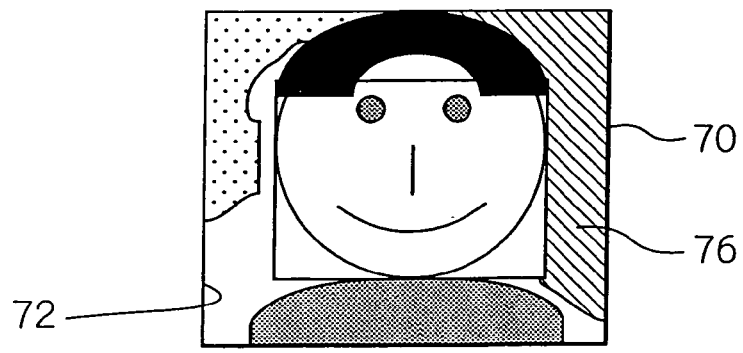

In FIG. 13B or 13C, in the monitor zone 68, a region with luminance lower than the luminance threshold $B_{th}$ is indicated by dots and determined to be a desirable region 74 while a region with luminance higher than the threshold luminance $B_{th}$ inclusive is indicated by leftward hatching and determined to be an undesirable region 76. Further, assuming that the area A of the undesirable region 76 is dealt with as distribution information, it is determined whether or not the area A is smaller than the area threshold $A_{th}$. If the area A is greater than the area threshold $A_{th}$ inclusive, a new temporary target value is set to thereby make the excessively light image comparatively dark. Subsequently, new correction gamma coefficients are determined on the basis of the new target value and used to determine a luminance frequency distribution.

The luminance frequency distributions and spatial distribution information shown in FIGS. 8A and 8A should preferably be calculated after the image data have reduced, or thinned out, or resized, so that the amount of image data and therefore processing load is reduced. The reduction or resizing of image data should preferably be executed by the image sensor 12 or the preprocessor 14.

As stated above, by correcting the color of an image by using not only a luminance distribution but also spatial information, it is possible to execute tone correction in such a manner as to provide not only a face but also the entire image including it with desirable brightness. If desired, there may be used at least one of the frequency distributions of colors contained in the color signal and spatial information.

Reference will be made to FIG. 14 for describing another specific configuration of the preprocessor 14. While the previous configuration of the preprocessor 14 pays attention to tone correction, the preprocessor 14 shown in FIG. 14 pays attention to gain control included in WB control and is also successful to provide the entire image, including a face, with desirable image quality. Identical structural parts and elements included in the illustrative embodiments are designated by identical reference numerals, and detailed description thereof will not be made in order to avoid redundancy.

Briefly, the preprocessor 14 of FIG. 14 is configured to detect a subject area included in the image data and including a characteristically distinguishable subject, calculate a correction value based on the representative value of the subject area detected and the distribution of the entire area or part of the area represented by the image data, and then correct the tone of the image data with either one of the correction value thus calculated and the basic correction value.

As shown in FIG. 14, the preprocessor 14 includes an automatic white balance (AWB) corrector 78 and a gain calculator 80 in addition to the offset processor 20, face preprocessor 22, WB controller 24, face detector 26 and gamma corrector 28. It will thus be seen that the preprocessor 14 of FIG. 14 lacks the correction gamma calculator 30, but additionally includes the AWB controller 78 and gain calculator 80. The offset processor 20 delivers offset digital data 32 to the AWB controller 78 and WB controller 24.

In the illustrative embodiment, the AWB controller 78 automatically controls the color balance of the image data 32 input from the offset processor 20 with illumination using a preselected light source color such that the average of the entire image represented by the image data 32 becomes gray. The AWB controller 78 then feeds an AWB control gain 83 for the input digital data 32 to the gain calculator 80.

Figure 15:
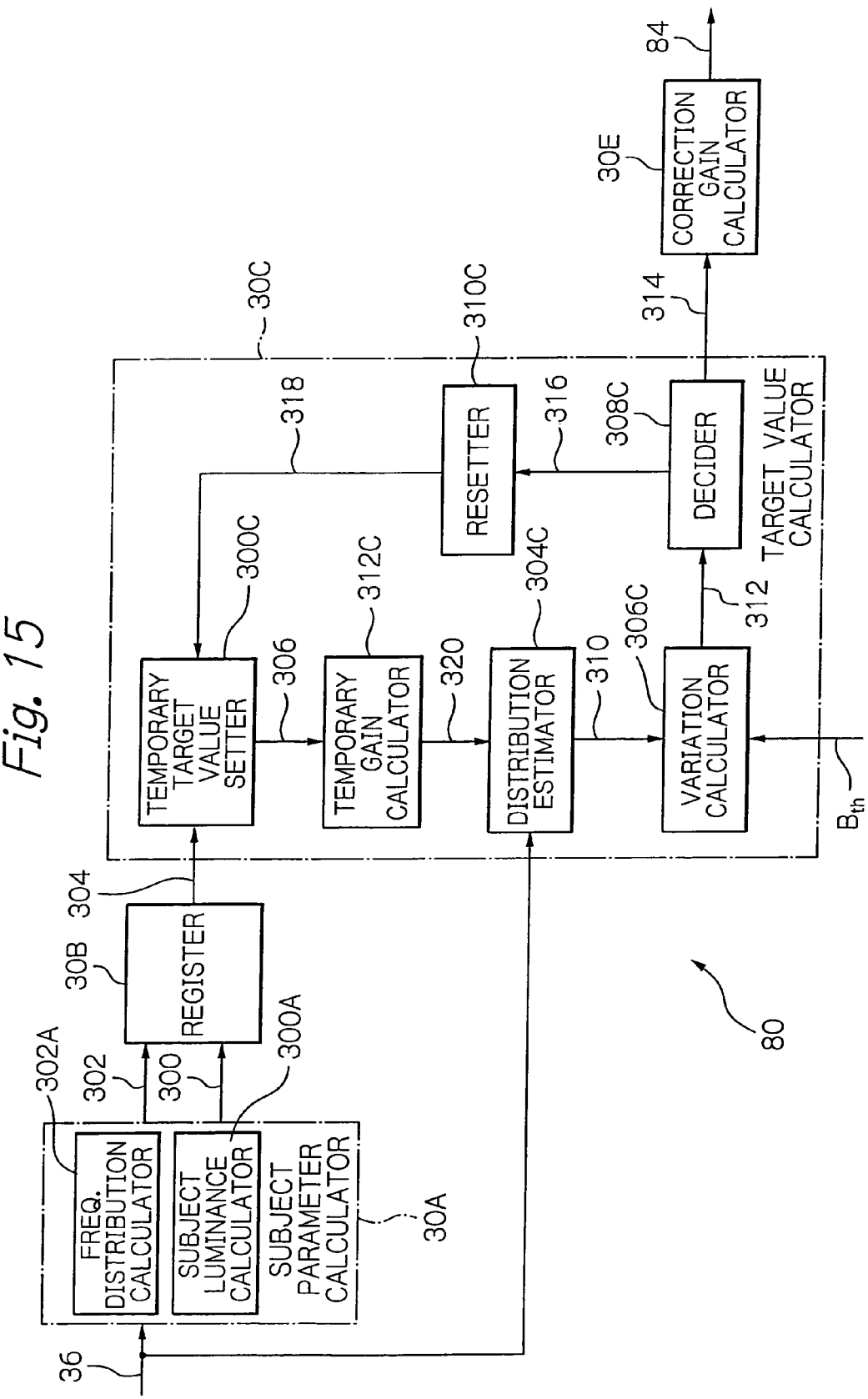
FIG. 15 is a block diagram schematically showing a specific configuration of a gain calculator included in the illustrative embodiment.
Figure 16:
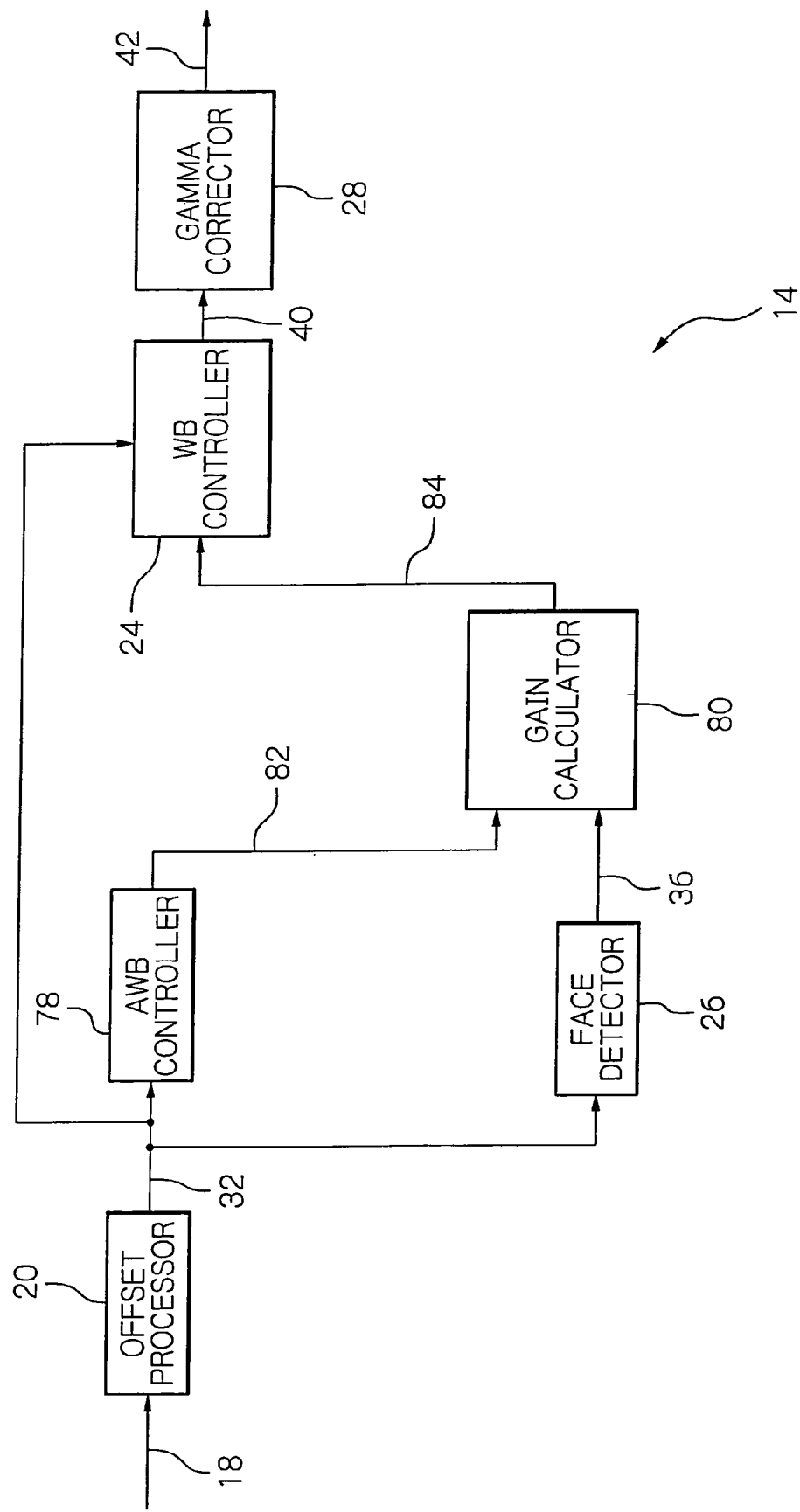
FIG. 16 is a block diagram showing another specific configuration of the preprocessor included in the illustrative embodiment.

The gain calculator 80 generates a correction gain in accordance with the AWB control gain 83 and the image data 36 input from the face detector 26. FIG. 15 shows a specific configuration of the gain calculator 80 of FIG. 14. As shown, the gain calculator 80 includes a temporary gain calculator 312C in place of the temporary coefficient calculator 302C shown in FIG. 2. The temporary gain calculator 312C delivers a temporary gain 312 to the distribution estimator 304C.

A correction gain calculator 30E, also included in the gain calculator 80, differs from the circuitry of FIG. 2 in that it does not use a tone correction table listing basic gamma coefficients or correction gamma coefficients, but calculates a correction gain. More specifically, when a control luminance value, or face luminance, providing the face area or the entire image with adequate brightness on the basis of the image data 36 is input to the correction gain calculator 30E, the correction gain calculator 30E calculates a target value for the face luminance as an output value, as will be described specifically later. The ratio G1 of the output value to the input value is the gain to be applied to the entire image. Assuming that the gain finally determined is G, then the gain G is produced by:

$$G_R = G0_R \times G1 \quad (1)$$

$$G_G = G0_G \times G1 \quad (2)$$

$$G_B = G0_B \times G1 \quad (3)$$

where G0 denotes a usual AWB control gain.

If desired, the above correction gain may be produced for each color. In this case, when AWB control gain 82 is input to the correction gain calculator 30E in the form of gains $G0_R$, $G0_G$ and $G0_B$, although not shown specifically, the correction gain calculator 30E calculates the final gains $G_R$, $G_G$ and $G_B$ by using the following expressions:

$$G_R = G0_R \times G1_R \quad (4)$$

$$G_G = G0_G \times G1_G \quad (5)$$

$$G_B = G0_B \times G1_B \quad (6)$$

where $G1_R$, $G1_G$ and $G1_B$ denote gains produced for the colors R, G and B, respectively.

The gain calculator 80 delivers the correction gains $G1_R$, $G1_G$ and $G1_B$ thus calculated or the usual AWB control gains $G0_R$, $G0_G$ and $G0_B$ to the WB controller 24.

Referring again to FIG. 14, on receiving the gains 82 or the correction gains 84 output from the gain calculator 80 in accordance with the detection of a subject and the digital signal 32 output from the offset processor 20, the WB controller 24 corrects the gains of the digital signal 32 with the gains 82 or 84 for thereby controlling the white balance. Particularly, on receiving the gains 82, the WB controller 24 considers that "1" is selected as the correction gains $R1_R$, $G1_G$ and $G1_B$, and executes gain correction with the usual correction AWB correction gains $G0_R$, $G0_G$ and $G0_B$. Subsequently, the gamma corrector 28 executes gamma correction on the image data 40 to thereby output tone-corrected image data 42. The circuitry shown in FIG. 14 corrects a face and the entire image including the face to adequate brightness.

The digital camera 100 should preferably use the previously stated frequency distributions and spatial distribution information relating to luminance even when tone is corrected by gain correction. Preferably, the frequency distributions and spatial distribution information should be calculated after the reduction or the resizing of the image data. Further, the reduction or the resizing of image data should preferably be executed by the image sensor 12 or the preprocessor 14.

Figure 17:
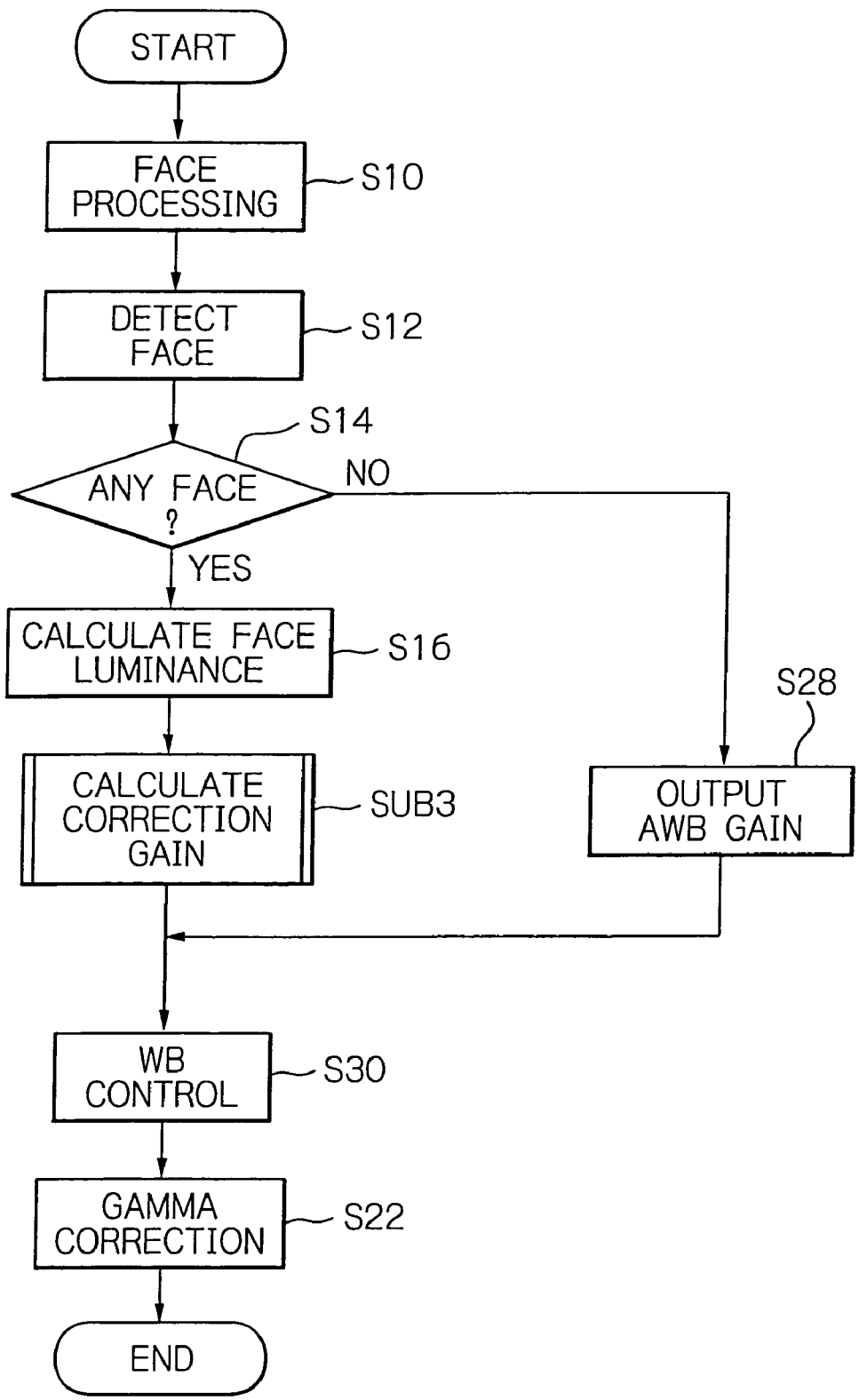
FIG. 17 is a flowchart demonstrating a specific operation executed with the gain calculator of FIG. 15.

A specific operation of the preprocessor 14 shown in FIG. 14, i.e., a specific tone correction procedure based on gain control will be described with reference to FIG. 17. The procedure of FIG. 17 is basically identical with the procedure of FIG. 4, so that identical steps are designated by identical reference numerals and will not be described specifically in order to avoid redundancy. The procedure of FIG. 17 determines whether or not a face is present.

As shown in FIG. 17, the face detector 26 detects a subject area including a person's face out of the entire image area represented by the input digital signal 34 (step S12). For such detection, the face detector 26 determines, e.g., whether or not an evaluation value of likelihood greater than a preselected threshold value exists. If an evaluation value greater than the preselected threshold value exists, the face detector 26 determines that a face is detected (YES, step S14), and then executes the calculation of face luminance (step S16). Otherwise (NO, step S14), the face detector 26 outputs the gains of the AWB controller 78 (step S28).

In the step S16, the subject parameter calculator 30A, included in the gain calculator 80, calculates the luminance value of the face area detected by the face detector 26 for thereby determining the face luminance value of the face area. The face luminance and luminance value have the same definition as in the previous embodiment. Alternatively, face luminance may be produced by setting a weighting coefficient, based on at least one of the estimation values of the luminance, position, size and area of a face and determining the degree of importance, and dividing the weighted mean of luminance in all subject areas of interest produced by dividing the sum of weighted luminance, which are produced by multiplying the luminance of the face areas by the weighting coefficient, by the total area of the face areas.

If the answer of the step S14 is NO, meaning that a face is not detected in the image, the gain calculator 80 outputs the gains of the AWB controller 78 (step S28). After the calculation of face luminance, the preprocessor 14 calculates corrected gains (subroutine SUB3). The function of correcting the gains is assigned to the corrected gain calculator 80.

Subsequently, the WB controller 24 executes WB correction by use of the gains or the corrected gains output from the AWB 78 in response to the digital signal 32 (step S30) and then delivers the resulting image data 40 to the gamma corrector 28. In response, the gamma corrector 28 corrects the tone of the image data 40 by, e.g., multiplying the image data 40 by the basic gamma coefficients and feeds the resulting image data 42 to the signal processor 16.

Figure 6B:
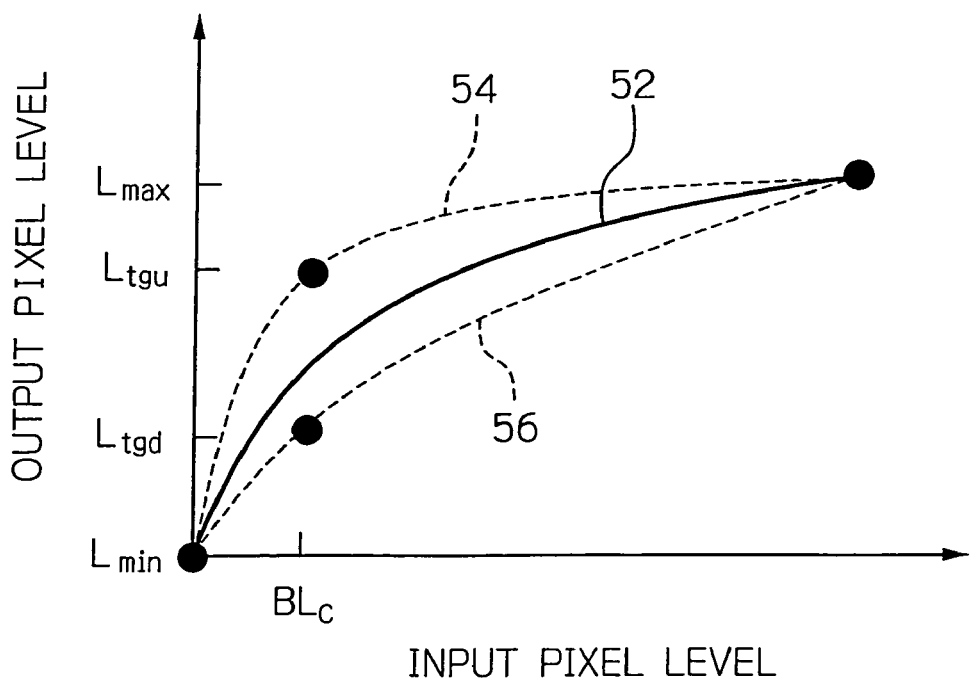
Figure 18:
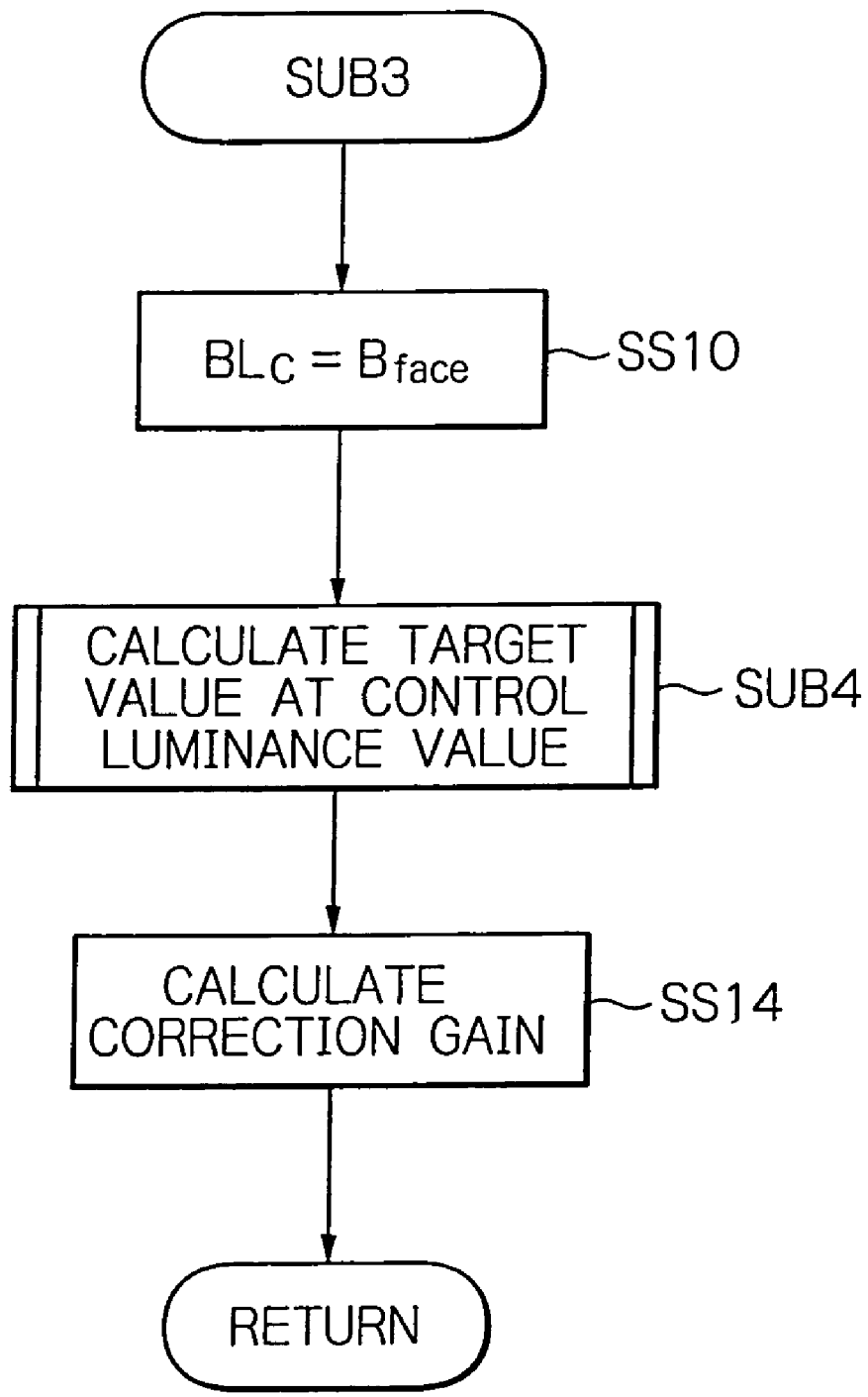
FIG. 18 is a flowchart showing still a subroutine included in the procedure of FIG. 17 in detail.

FIG. 18 shows the subroutine SUB3 included in the routine of FIG. 17 for calculating correction gains in detail. Assume that the minimum and maximum levels which a pixel may take are $L_{min}$ and $L_{max}$, respectively. First, the face luminance $B_{face}$ of the image data input first in the correction gain calculating step is used as a control luminance value $BL_c$ (substep SS10). Subsequently, the target value $L_{tg}$ of the control luminance value $BL_c$ that will provide the face and the entire image including the face with adequate brightness is calculated (subroutine SUB4). The target value $L_{tg}$, minimum level $L_{min}$ and maximum level $L_{max}$ shown in FIG. 6B are used to calculate correction gains by spline interpolation (substep SS14). The corrected gains thus calculated are applied to the input pixel levels for thereby establishing an adequate output pixel level. The procedure then returns from subroutine SUB3 to the preprocessing routine shown in FIG. 17.

Figure 19:
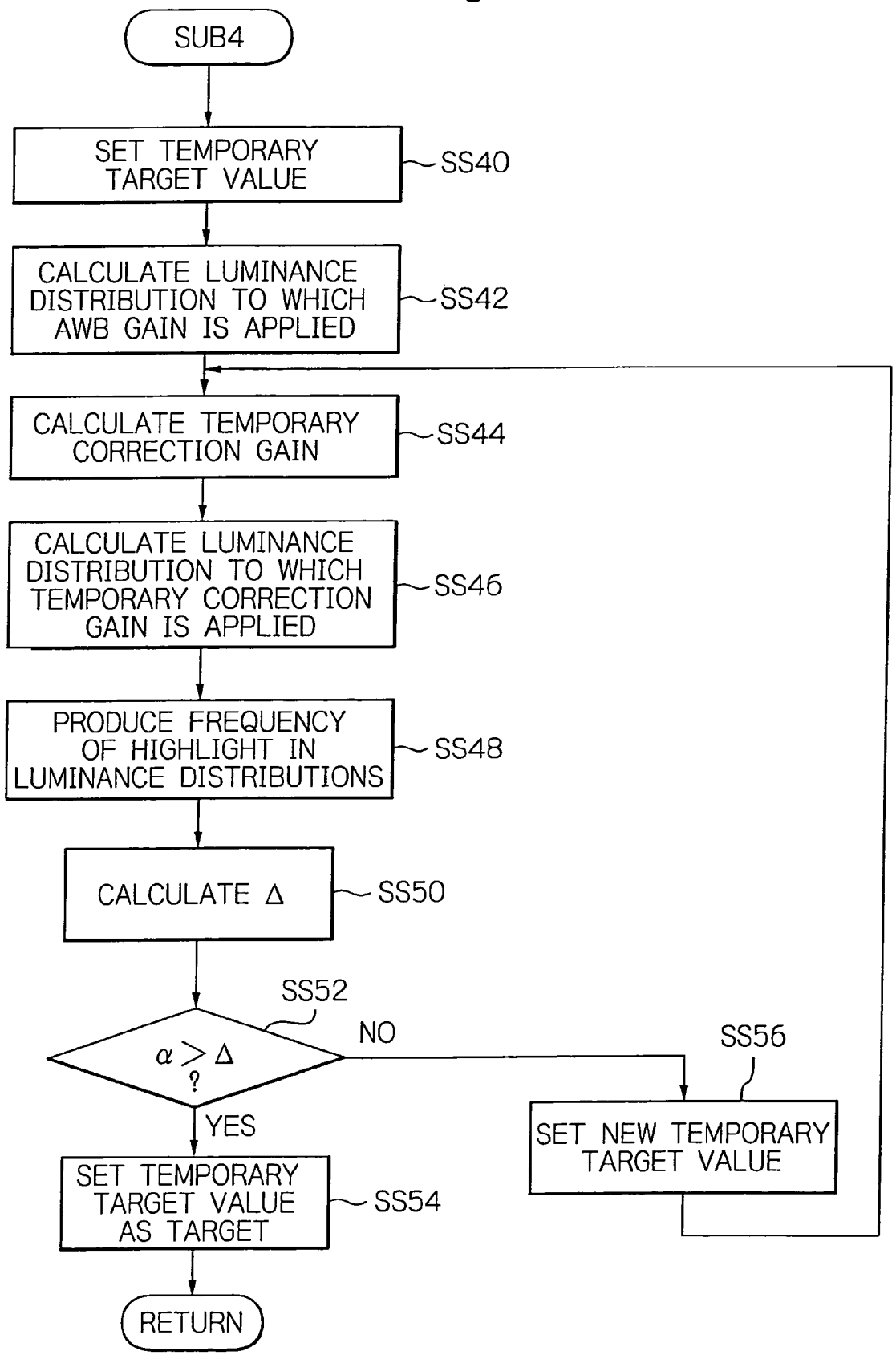
FIG. 19 is a flowchart showing a subroutine included in the procedure of FIG. 18.

FIG. 19 shows the subroutine SUB4 of FIG. 18 specifically. As shown, paying attention only to a face area detected, the temporary target value $L_v$ of the control luminance value $BL_c$ is set for the target value $L_{tg}$ (substep SS40). The temporary target value $L_v$ may be selected in accordance with the control luminance value $BL_c$ stored in the gain calculator 80 by way of example.

Subsequently, a luminance distribution established by applying the AWB gains to the image data constituting the entire image is determined, as shown in FIG. 8A (substep SS42). Further, the ratio of the temporary target value $L_v$ to the control luminance value $BL_c$, i.e., gain G1 is determined, and then the gains G1 and G0 thus determined are multiplied to produce a gain G as a temporary gain (substep SS44). Thereafter, a luminance distribution to be produced when the temporary gain is applied to the input image data, as shown in FIG. 8B, is estimated (substep SS46).

As shown in FIGS. 8A and 8B, luminance representative of highlight is assumed to be $B_{th}$. In the illustrative embodiment, the luminance $B_{th}$, among eight-bit luminance representation, is set to be "240". Then, as shown in FIG. 19, the integrated frequencies $N_{base}$ and $N_v$ of pixels higher than the luminance $B_{th}$ inclusive are produced (substep SS48), and then a difference between the pixel frequencies $N_{base}$ and $N_v$ thus produced, i.e., a variation $\Delta$ is calculated (substep SS50).

Subsequently, it is determined whether or not the variation $\Delta$ lies in a preselected allowable range $\alpha$, i.e., whether or not a condition of $\alpha > \Delta$ is satisfied (substep SS52). If the answer of the substep SS52 is YES, the temporary target value $L_v$ is used as the target value $L_{tg}$ ($L_{tg}=L_v$, substep SS54). After the substep S54, the procedure returns to the subroutine SUB3, FIG. 18. Otherwise, i.e., if $\alpha < \Delta$ holds (NO, substep SS52), a preselected step value $L_{sv}$ is added to the temporary target value $L_v$ to thereby set a new temporary target value $L_v$ ($L_v=L_v+L_{sv}$, substep SS56). After the substep SS56, the procedure returns to the step SS44.

While the procedure shown in FIG. 19 sets a target value $L_{tg}$ on the basis of the relation between a variation $\Delta$ derived from the integrated pixel frequencies $N_{base}$ and $N_v$ and the allowable range $\alpha$, use may alternatively be made of a principle shown in FIG. 9. By using the AWB gain, there is obtained a luminance frequency distribution. When the temporary correction gain is used, the peak luminance $B_p$ of the luminance distribution is shifted toward the higher luminance side. In this case, the luminance $B_{th}$ representative of highlight and the allowable range $\beta$ are set beforehand, as stated earlier. In accordance with the principle shown in FIG. 9, a difference between the luminance $B_{th}$ and the peak luminance $B_p$ is dealt with as a variation $\delta$. If the variation $\delta$ lies in the allowable range $\beta$, the temporary target value $L_v$ is used as the target value $L_{tg}$. On the other hand, if the variation $\delta$ is greater than the allowable range $\beta$ inclusive, a preselected step value $L_{sv}$ is added to the temporary target value $L_v$ to thereby produce a new temporary target value $L_v$.

With the procedure described above with reference to FIG. 9, it is possible to provide even an image made up of a face and background with satisfactory brightness without determining a luminance frequency distribution based on the basic AWB gain, i.e., simply by determining a luminance frequency distribution based on the correction gain.

Figure 20:
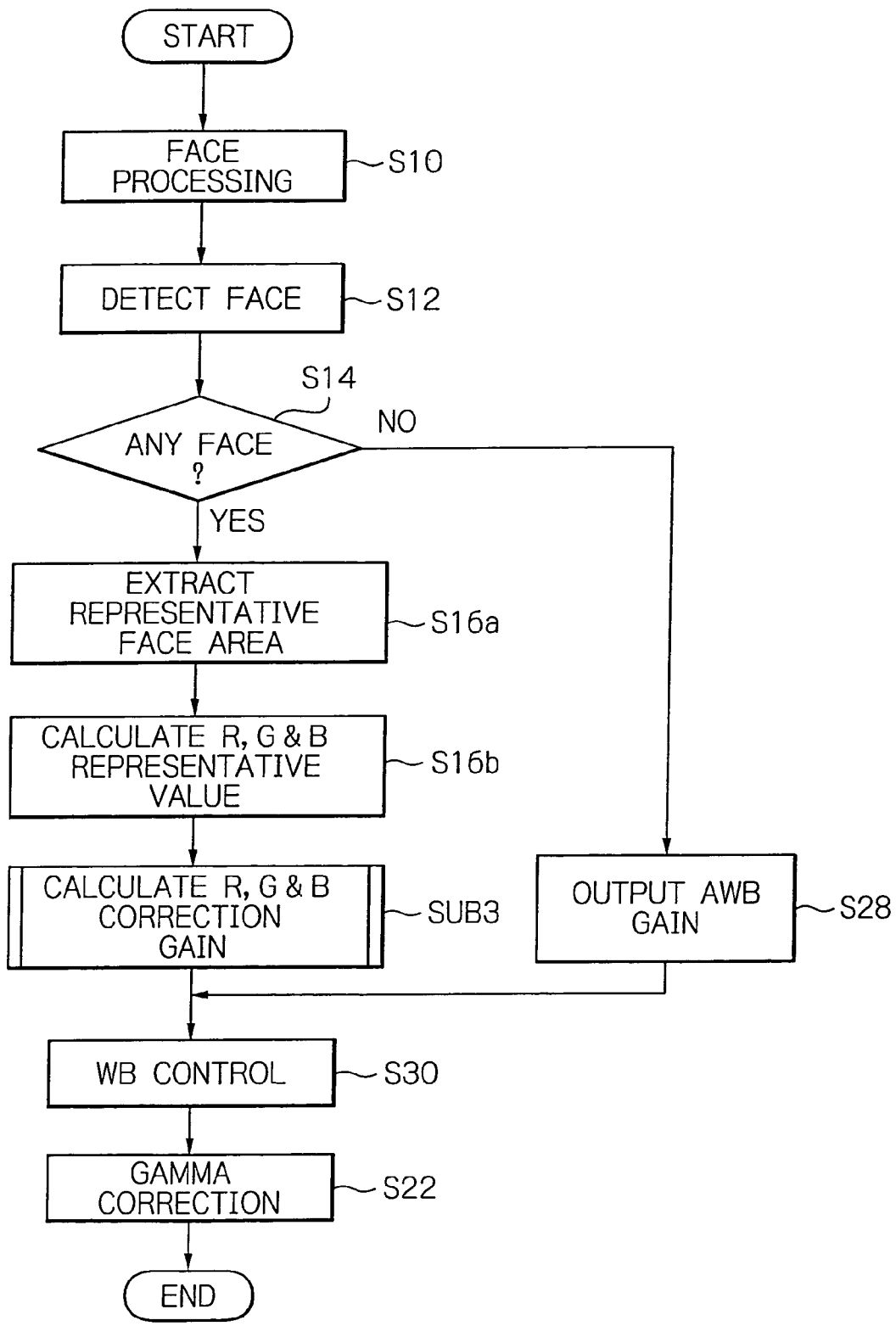
FIG. 20 is a flowchart showing a preprocessing procedure for calculating an R, a G and a B correction gain on the basis of the procedure of FIG. 17.

Further, as shown in FIG. 20, a correction gain may be produced for each of the colors R, G and B. More specifically, a representative face area is extracted (substep SS16a), and then a representative value is calculated for each of the colors R, G and B (substep SS16b). Subsequently, corrected gains are calculated color by color (subroutine SUB3). To describe this calculation briefly, gains $G1_R$, $G1_G$ and $G1_B$ are produced for the colors R, G and B, respectively, on the basis of the ratios of the temporary target values $L_v$ to the control luminance values $BL_c$ also produced for the colors R, G and B. Further, the gains $G1_R$, $G1_G$ and $G1_B$ thus produced and the gains $G0_R$, $G0_G$ and $G0_B$ are calculated to determine final temporary gains $G_R$, $G_G$ and $G_B$ as temporary gains (substep SS44, FIG. 19).

Thereafter, the temporary gains $G_R$, $G_G$ and $G_B$ are applied to the input image in order to estimate luminance distributions or frequency distribution to be obtained when the temporary gains are used (substep SS46, FIG. 19). After the substep SS46, the substeps SS48 through SS56 should only be executed with each of the colors R, G and B.

While the foregoing description has concentrated on specific configurations and procedures executing tone correction or gain correction as part of preprocessing, the object of the present invention is achievable even with the signal processor 16 that follows the preprocessor 14, as will be described hereinafter. It is to be noted that the operation of the signal processor 16 to be described hereinafter is controlled in accordance with the output of the preprocessor 14.

Figure 21:
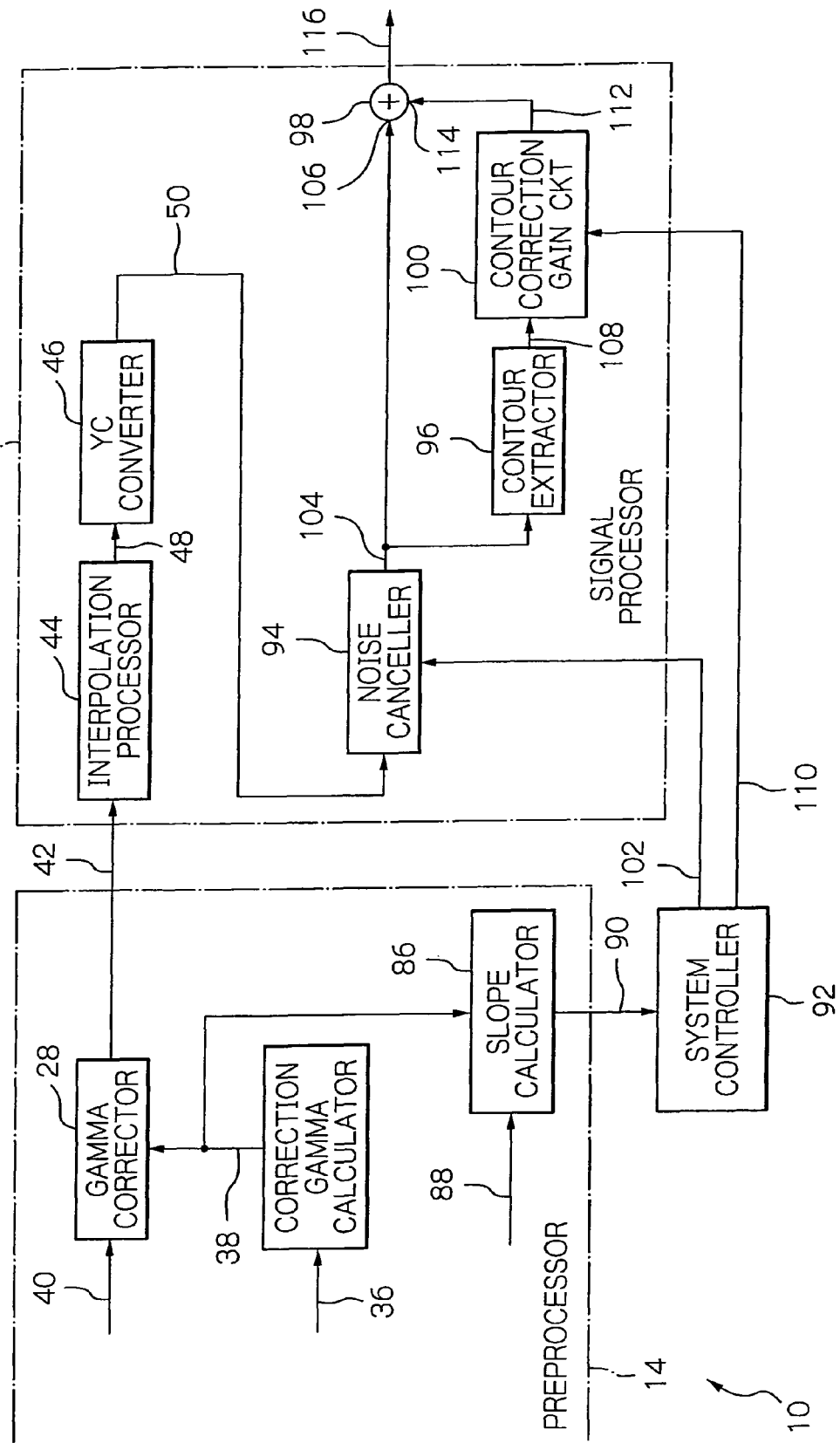
FIG. 21 is a schematic block diagram showing another specific configuration of the preprocessor shown in FIG. 1 and a specific configuration of a signal processor also shown in FIG. 1.

FIG. 21 shows another specific configuration of the preprocessor 14 and a specific configuration of the signal processor 16 connected thereto. As shown, the preprocessor 14 includes a slope calculator 86 in addition to the various components stated previously. The slope calculator 86 is configured to calculate output luminance values for reference luminance values set beforehand and then determine a slope angle θ in accordance with the reference and output luminance values.

Figure 22:
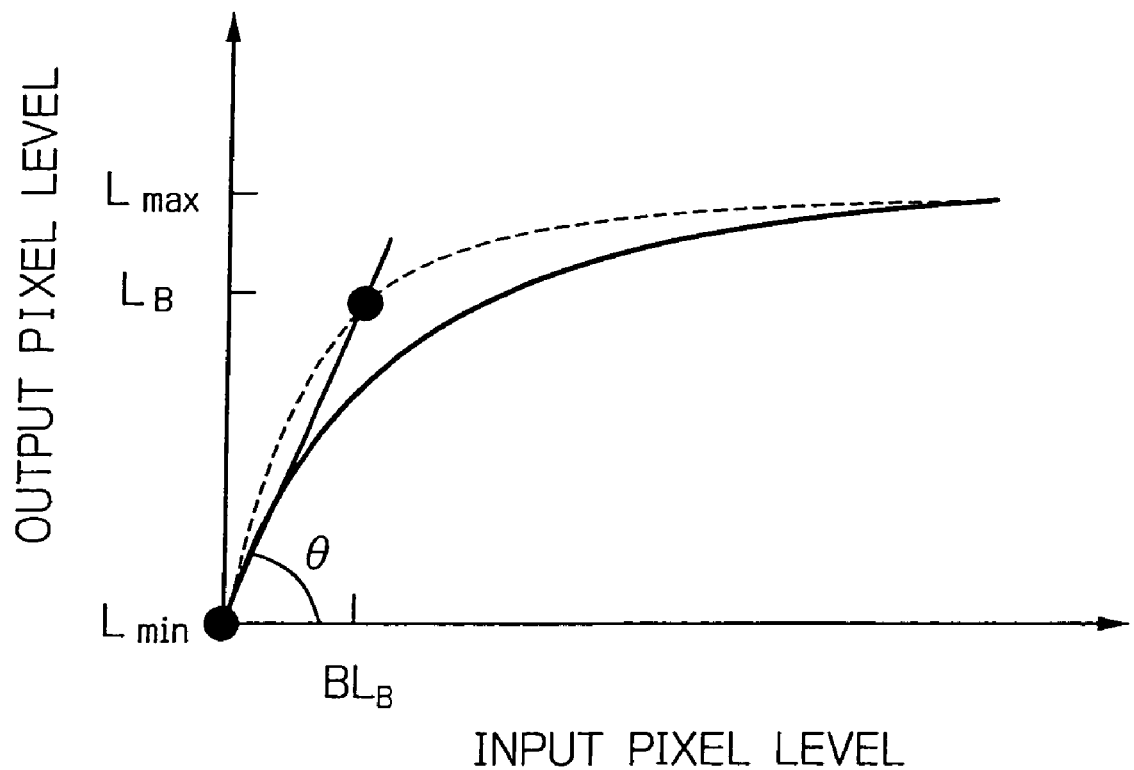
FIG. 22 is a graph showing the principle of operation of a slope calculator included in the configuration of FIG. 21.

More specifically, as shown in FIG. 22, the reference luminance value, labeled $BL_B$, is different from the control luminance values set for the individual face areas, and the reference luminance value $BL_B$ is face luminance represented by input luminance value which is constant without regard to the face area. The output luminance values, labeled $L_B$ in FIG. 22, are output values produced by multiplying the reference luminance values by a correction gamma coefficient.

Referring again to FIG. 21, the reference luminance values, designated by the reference numeral 88, are input to and set in the slope calculator 86. The slope calculator 86 feeds a calculated slope angle 90 (θ) to a system controller 92. It is to be noted that because the slope angle 90 is calculated on the basis of the output reference luminance values 88, the slope angle 90 can, of course, be calculated by the gain calculating function stated earlier.

As shown in FIG. 21, the signal processor 16 includes a noise canceller 94, a contour extractor 96, an adder 98 and a contour correction gain circuit 100 in addition to the interpolation processor 44 and YC converter 46. The noise canceller 94 cancels noise contained in the input signal under the control of a control signal 102 output from the system controller 92. More specifically, the noise canceller 94 includes median filters or smoothing filters arranged in (n × n) steps and controlled by the control signal 102 to vary the number of steps, i.e., a filter size n through which the signal is to be passed. The control signal 102 causes the noise canceller 94 to increase the filter size n in proportion to the size of the slope angle θ. The noise canceller 94 delivers the resulting noise-free image data 104 to the contour extractor 96 and one input 106 of the adder 98.

The contour extractor 96 extracts a contour or edge portion included in the image data 104 in order to enhance it because the image data 50 output from the YC converter 46 have been smoothed and therefore lowered in resolution. Image data 108 with the thus enhanced contour are fed from the contour extractor 96 to the contour correction gain circuit 100.

A correction gain, capable of being increased in proportion to the size of the slope angle θ, is set in the contour correction gain circuit 100 by a control signal 110 fed from the system controller 92. The correction gain circuit 100 applies the correction gain to the contour represented by the input image data 108 in such a manner as to enhance, or correct, the contour, thereby outputting image data 112 with an enhanced contour. The image data 112 are fed from the correction gain circuit 100 to the other input 114 of the adder 98. The adder 98 combines the image data 104 and 112 input thereto for thereby outputting combined image data 116.

In the specific configuration shown in FIG. 21, the system controller generates the control signals 102 and 110 matching with the slope angle 90 input thereto. More specifically, the system controller 92 compares a preselected slope angle $θ_B$ with the input slope angle θ (90) and causes the noise canceller 94 to select, if the slope angle θ is greater than the slope angle $θ_B$, a filter size n matching with the slope angle θ or select, otherwise, a usual number of steps with the control signal 102. Further, the system controller 92 sets in the contour correction gain circuit 100 a correction gain matching with the slope angle θ if the slope angle θ is greater than the slope angle $θ_B$ or, otherwise, a usual correction gain.

With the above configuration, it is possible to correct even an image made up of a face and background to desirable brightness and to insure a noise-free, high quality image with an enhanced contour. The system controller 92 may be configured to control only one of the noise canceller 94 and contour correction gain circuit 100, if desired.

Figure 23:
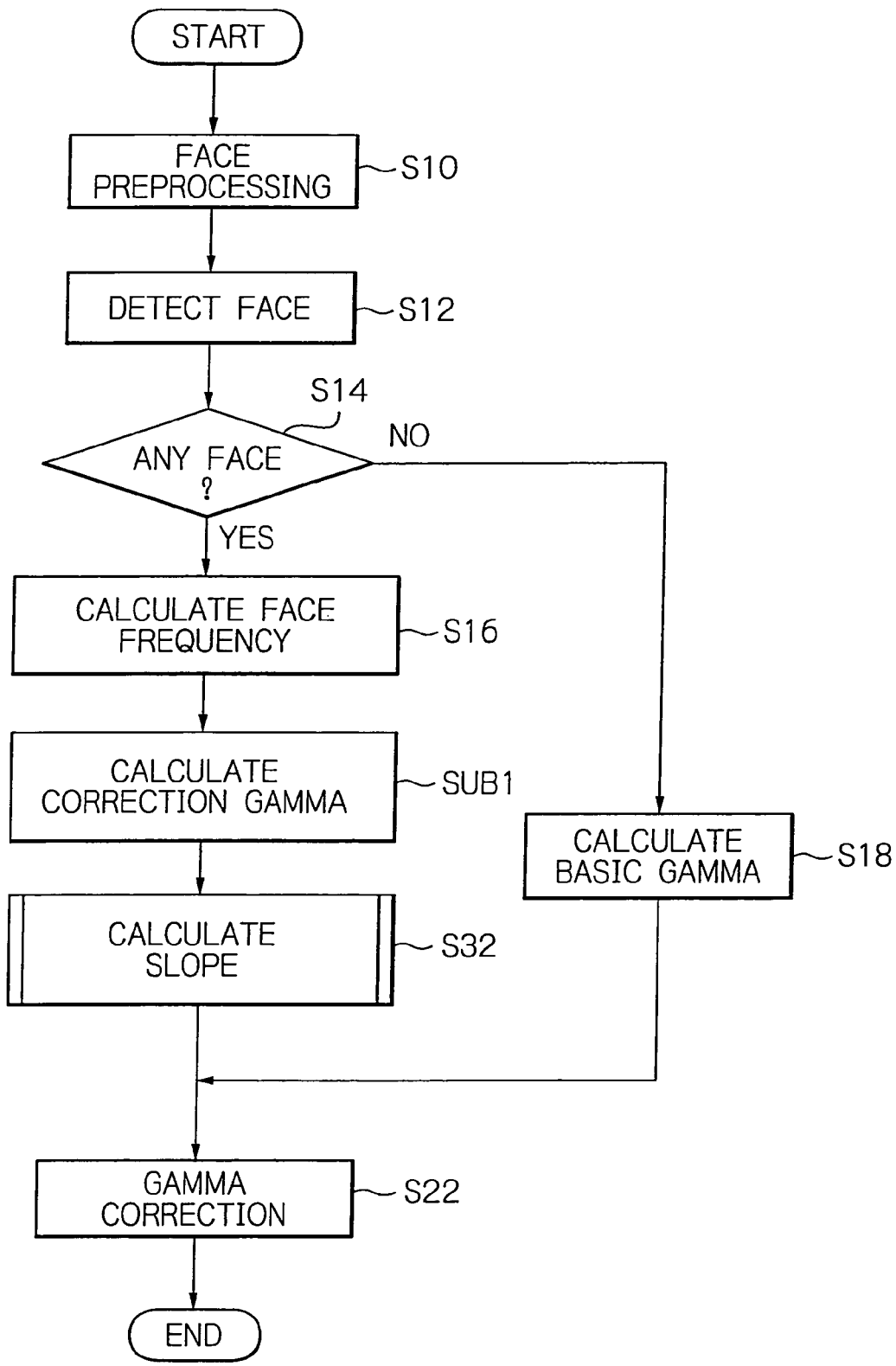
FIG. 23 is a flowchart showing a specific procedure for calculating correction gamma coefficients and a slope angle on the basis of the processing of FIG. 4.

A specific preprocessing procedure practicable with the circuitry of FIG. 21 will be described with reference to FIG. 23 hereinafter. The procedure of FIG. 23 is similar to the procedure of FIG. 4 except that the calculation of a slope angle θ is added. As shown, after a correction gamma coefficient has been calculated (substep SUB1), a slope angle is calculated (step S32) by the slope angle calculator 86 on the basis of an arctan for the ratio of the output luminance value $L_B$ to the reference luminance value $BL_B$. The slope angle 90 thus calculated is fed to the system controller 92.

Figure 24:
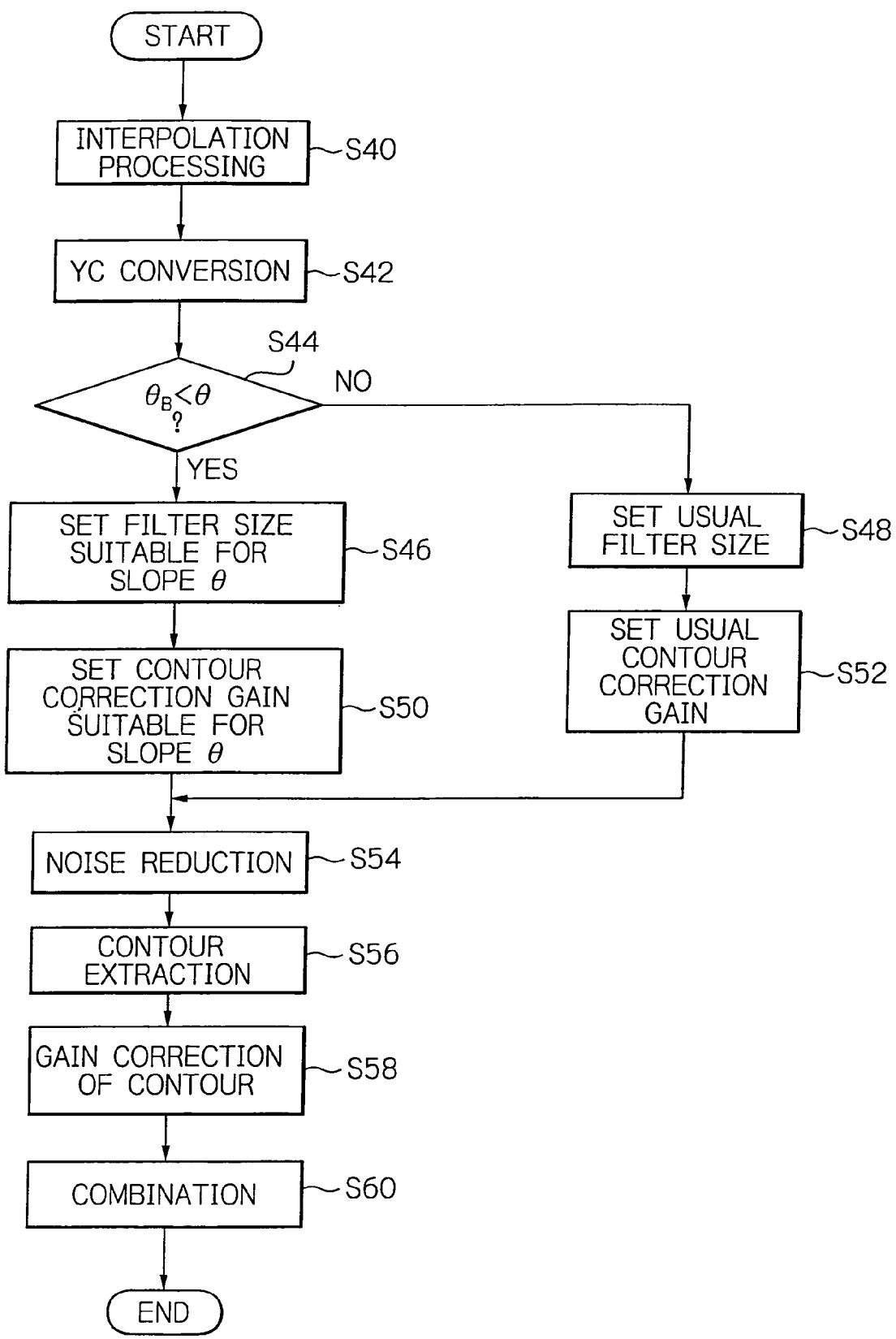
FIG. 24 is a flowchart showing signal processing and control executed by the configuration of FIG. 21.

FIG. 24 demonstrates a more specific procedure executed by the circuitry of FIG. 21. As shown, input image data 40 are interpolated by the interpolation processor 44 to become synchronized or interpolated R, G and B of data 48 (step S40) and then converted to image data 50 by the YC converter 46 (step S42). The image data 50 are fed from the YC converter to the noise canceller 94.

Subsequently, the system controller 92 determines whether or not the calculated slope angle θ (90) is greater than the slope angle $θ_B$ (step S44). The system controller 92 causes, if the slope angle θ (90) is greater than the slope angle $θ_B$ (YES, step S44), a filter size n matching with the slope angle θ (S46) to be selected or causes, otherwise (NO, step S44), a usual number of steps to be selected with the control signal 102 (step S48).

After the step S46, the system controller 92 generates a control signal 110 for setting a contour correction gain matching with the slope angle θ (step S50) or generates a control signal 110 for setting a usual contour correction gain (step S52). After the step S50 or S52, the noise canceller 94 smoothes the image data 50 with the filter size matching with the input control signal 102 to thereby output noise-free image data 104 and feeds them to the contour extractor 96 and one input terminal 106 of the adder 98.

The contour extractor 96 extracts a contour out of the image data 104 and then delivers the image data with the extracted contour to the contour correction gain circuit 100. The contour correction gain circuit 100 applies a contour correction gain based on the control signal 110 to the input image data 104 for thereby enhancing the contour of the image data 104 (step S58). Image data with the contour thus enhanced are delivered to the other input terminal 114 of the adder 98.

The adder 98 combines the image data 104 and 112 input from the noise canceller 94 and contour correction gain circuit 100, respectively, and outputs the resulting combined image signal 116 (step S60). This is the end of the procedure shown in FIG. 24.

By controlling the parameters of the configuration elements in accordance with a correction amount and executing signal processing with an image by using the resulting adequate parameters, as stated above, it is possible to further improve the image quality of a subject and background constituting an image, compared to the case wherein the configuration elements simply execute signal processing. Such signal processing should preferably additionally deal with at least one of the sharpness and granularity of an image.

The specific procedures described above are successful to correct even an image made up of a face and background to adequate brightness and to insure a noise-free, high quality image with an enhanced contour.

Figure 25:
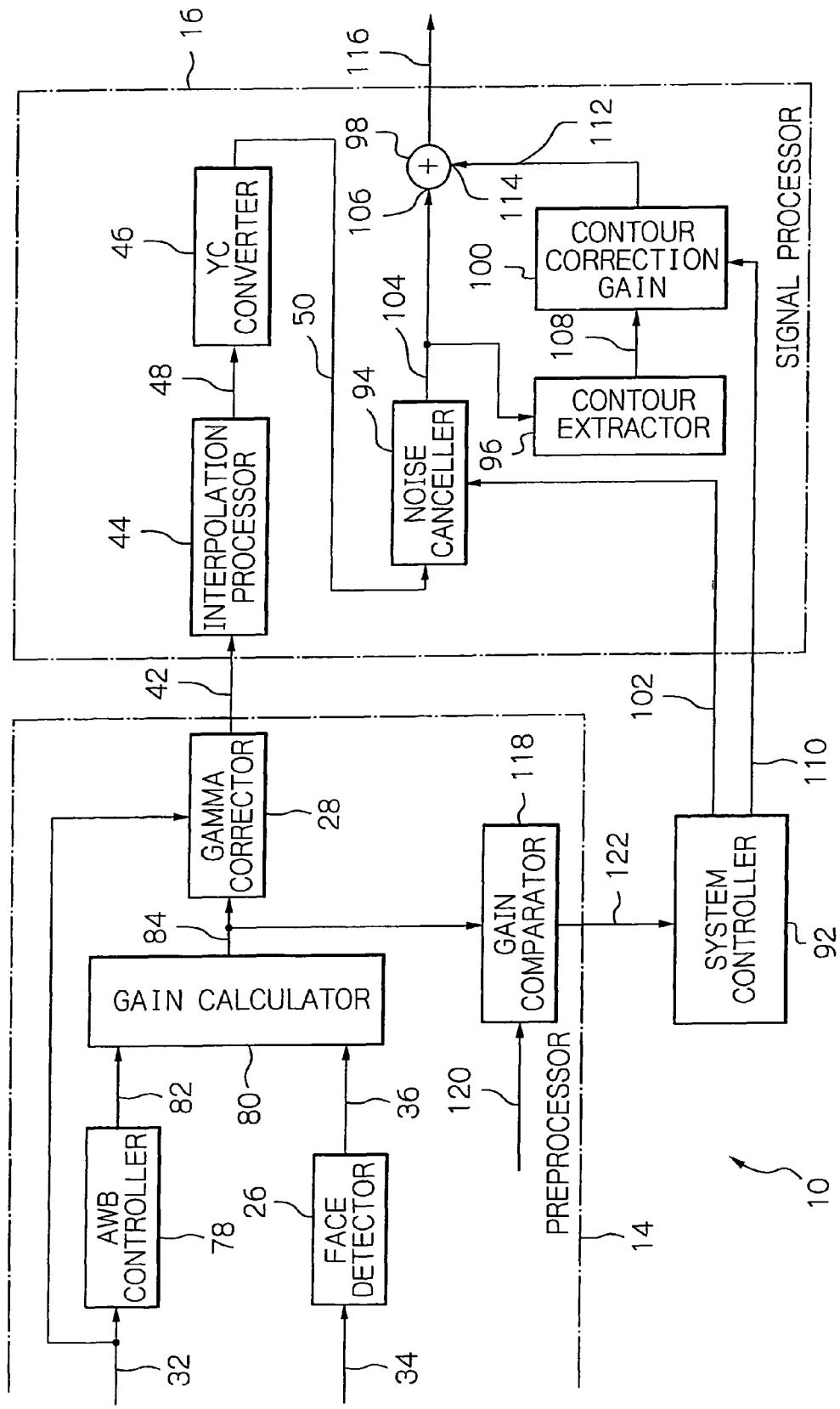
FIG. 25 is a block diagram schematically showing another specific configuration of the preprocessor and a specific configuration of the signal processor connected thereto.

To control the configuration elements of the signal processor 16, the system controller 92 may use, in place of the slope angle, an output gain G (84) produced by applying a correction gain to the values of the input image data. FIG. 25 shows circuitry for executing such alternative control. As shown, the gain calculator 80 feeds an output gain G (84) to a gain comparator 118 in which a preselected output gain 120 is set as a threshold value beforehand. The gain comparator 118 compares the output gain G (84) with the threshold output gain 120 and delivers the result of comparison 122 to the system controller 92. The system controller 92 generates the control signals 102 and 110 that cause, if the result of comparison 122 shows that the output gain G (84) is greater than the threshold output gain 120, a correction gain matching with the size of the output gain G (84) to be set or cause, if the former is smaller than the latter inclusive, a usual correction gain to be set. Comparing the circuitry of FIG. 25 with the circuitry of FIG. 21, the gain comparator 118 may be configured to form part of the system controller 92, if desired.

In response to the control signals 102 and 110, the noise canceller 94 and contour correction gain circuit 100, respectively, vary the parameters, i.e., the number of filter steps and contour correction gain in accordance with the result of comparison. By so controlling the parameters, it is also possible to provide the image data 116 or image with high quality.

The circuitry of FIG. 25 also executes the procedure of FIG. 24 except for the steps S44 through S52. More specifically, the comparison of two gains corresponds to the calculation of a slope angle and a decision made thereon (step S44). If the output gain G (84) is greater than the threshold output gain 120 (YES, step S44), a filter size and a contour correction gain are set in accordance with the output gain G (84). If the output gain G is smaller than the threshold output gain 120 inclusive (NO, step S44), a usual filter size and a usual contour correction gain are set. Such a procedure is also successful to correct even an image made up of a face and background to adequate brightness and to insure a noise-free, high quality image with an enhanced contour.

Of course, the specific procedures and configuration parts and elements described above can be implemented as a program.

Figure 26:
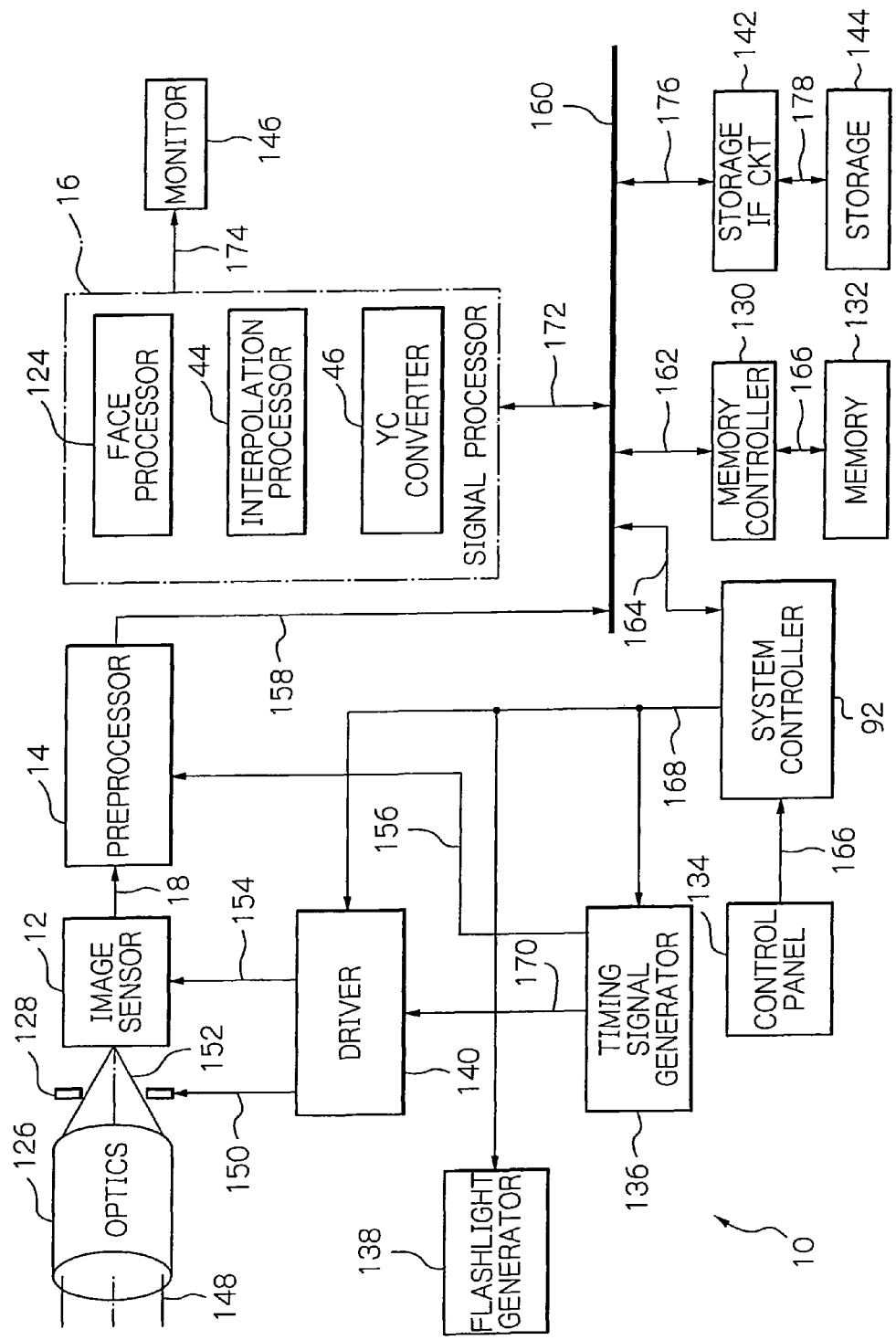
FIG. 26 is a block diagram schematically showing an alternative embodiment of the digital camera in accordance with the present invention.

Referring to FIG. 26, an alternative embodiment of the present invention is shown and also implemented as a digital camera generally designated by the reference numeral 10. In FIG. 26, configuration parts and elements like those shown in FIG. 1 are designated by identical reference numerals, and detailed description thereof will not be repeated in order to avoid redundancy. As shown, the illustrative embodiment mainly differs from the previous embodiment as to the configuration of the preprocessor 14 and that of the signal processor 16.

In the illustrative embodiment the preprocessor 14 includes only a correlated double sampling (CDS) circuit and an AD converter, although not shown specifically. On the other hand, the signal processor 16 includes a face processor 124 in addition to the interpolation processor 44 and YC converter 46. The face processor 124 may simply include the offset processor 20, face preprocessor, WB controller 24, face detector 26, gamma corrector 28 and correction gamma calculator 30 shown in FIG. 2 or may be configured to improve the functions of the individual configuration elements, as will be described specifically later.

More specifically, the digital camera 10 shown in FIG. 26 includes optics 126, an aperture control mechanism 128, a memory controller 130, a memory 132, a system controller 92, a control panel 134, a timing signal generator 136, a flashlight generator 138, a driver 140, a storage interface (IF) circuit 142, a storage 144 and a monitor 146 in addition to the configuration elements shown in FIG. 1.

The optics 126 focuses light 148 incident thereto and representative of a field on the image sensor 12 in accordance with the operation of the control panel 134. The optics 126 controls a field angle and a focal distance in response to a zooming operation performed on the control panel 134 or the depress of a shutter release key positioned on the control panel 134 to its half-stroke position. The aperture control mechanism 126 is positioned at the light output side of the optics 126 and configured to control the beam of the incident light 148 in response to a drive signal 150 fed from the driver 140. The aperture control mechanism 126 additionally has a shutter function.

The image sensor 12 converts a beam 152 output from the optics 126 to signal charges, transfers the signal charges in response to a drive signal 154 fed from the driver 140, and then outputs the signal charges transferred via a field diffusion amplifier (FDA) in the form of an analog image signal 18. The preprocessor 14 executes CDS sampling and AD conversion, not shown, with the image signal input from the image sensor 12 in response to a sampling signal 156 fed from the timing signal generator 136 for thereby outputting the resulting image data 158 to a bus 160.

The image data 158 thus transferred via the bus 160 are input to the memory controller 130 via a signal line 162. The memory controller 130 writes the image data 162 in the memory 132 as image data 166 in response to a control signal 164 fed from the system controller 92 or reads the image data 162 out of the memory 132 as image data 166, as needed. The memory 132 should preferably be implemented as a non-volatile memory or an SRAM (Static Random Access Memory) by way of example.

Various switches including a power switch, a zoom button, a menu display switch, a selection key, a movie mode setting section, a continuous shot setting section and a shutter release button are arranged on the control panel 134. An operation signal 166 is fed from the control panel 134 to the system controller 92 in accordance with the operation of the control panel 134.

The system controller 92 generates control signals 164 and 168 in response to the operation signal 166, face detection and scene decision and data output from an integrator, not shown, included in the signal processor 16. The control signal 164 is fed to the memory controller 130, signal processor 16 and storage IF circuit 142 via the bus 160 while the control signal 168 is fed to the timing signal generator 136, flashlight generator 138 and driver 140. The timing signal generator 136 delivers various timing signals 170 to the driver 140 and generates not only the drive timing of the image sensor 12 but also various sampling signals and a drive clock or timing signal 156 for the preprocessor 14.

The flashlight generator 138 emits a preselected quantity of electrically generated light toward a subject when the control signal 168 output from the system controller 92 shows that the scene is dark. More specifically, the flashlight generator 138 emits such light in synchronism with the push of the shutter release to its full-stroke position, as distinguished from the half-stroke position mentioned earlier, commanding actual pickup.

The driver 140 generates, e.g., a vertical and a horizontal drive system in response to the various timing signals 170 fed from the timing signal generator 136. More specifically, the driver 140 feeds to the image sensor 12 the drive signals 154 including the vertical and horizontal drive signals, a field shift gate signal, a reset signal and an over-flow drain (OFD) signal.

In the illustrative embodiment, the signal processor 16 is characterized in that it includes the face processor 124. The signal processor 16 operates in response to the control signal 146 fed from the system controller 92 via the bus 160 and a signal line 172. The image data 166 temporarily stored in the memory 132 as raw data not subjected to signal processing are fed to the signal processor 16. A display controller, not shown, is included in the signal processor 16 for converting the raw image data to a format suitable for display on the monitor 146 and then delivers the reformatted image data to the monitor 146 as an image signal 174.

The storage IF circuit 142 controls input/output in the event of recording/reproduction of the image data in response to the control signal 164 fed thereto via the bus 160 and a signal line 176. The storage IF circuit 142 controls the input/output of the image data for the storage 144. The storage 144 is a recording medium capable of recording or reproducing not only the image data fed via the storage IF circuit 142 but also conditions for generating an image as well as information relating thereto.

Figure 27:
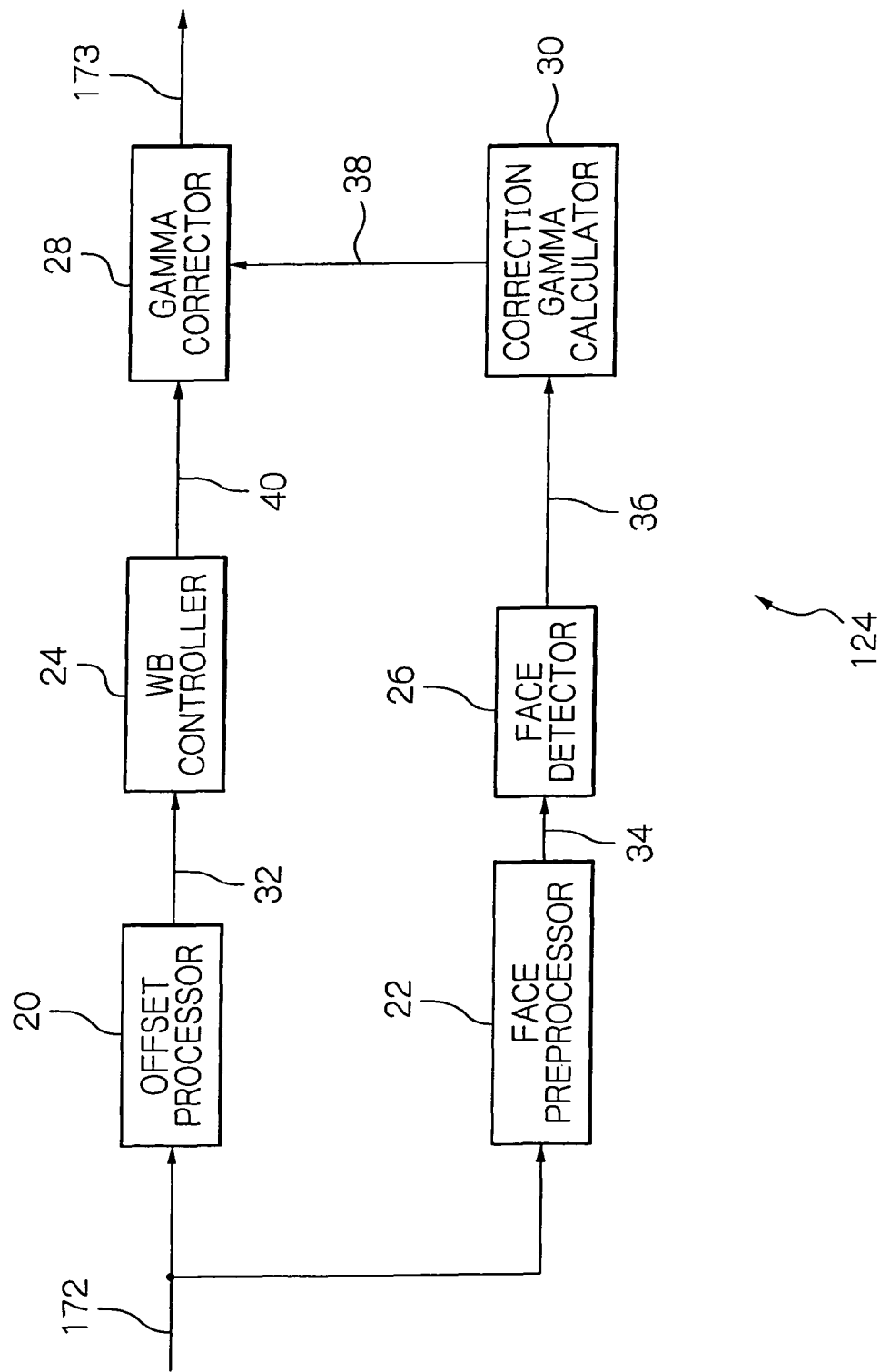
FIG. 27 is a block diagram schematically showing a specific configuration of a face processor included in the alternative embodiment.

FIG. 27 shows a specific configuration of the face processor 124 included in the signal processor 16. As shown, the face processor 124 includes the offset processor 20, face preprocessor 22, WB controller 24, face detector 26, gamma corrector 28 and correction gamma calculator 30 shown in FIG. 2 and outputs face-processed image data 173. The face processor 124 executes the basic procedure shown in FIG. 4, as will be briefly described hereinafter.

The face processor 124 detects all image are as included in the image and then obtains the position, size and likelihood of each image area. If no face areas are detected in the image, the face processor 124 outputs a preselected basic gamma. The face processor 124 may be provided with the specific configuration described with reference to FIG. 3.

Subsequently, the face processor 124 calculates face luminance of the individual face areas and then outputs the greatest face luminance as face luminance. Alternatively, the face processor 124 may be configured to assign a particular weighting coefficient, which determines the degree of importance, to each face area on the basis of at least one of the luminance and the position, size and likelihood of a face area and then output face luminance implemented as a weighted mean of the weighting coefficients.

The face processor 124 then compares the face luminance thus calculated with a preselected threshold value and outputs the basic gamma if the former is greater than the latter. If the calculated face luminance is smaller than the threshold value inclusive, the face processor 124 calculates a target value $L_{tg}$ that will provide the faces and the entire image including them with adequate brightness, selects a control luminance value $BL_c$ as face luminance, and then generates a correction gamma by spline interpolation or similar interpolation using the target value $L_{tg}$ and the minimum and maximum values $L_{min}$ and $L_{max}$ within the range available for a pixel.

Particularly, the illustrative embodiment is characterized in that it corrects the target value, as will be described specifically with reference to FIG. 28 hereinafter. As shown, a target value calculator 30C shown in FIG. 28 includes a temporary target value setter 300C and a target value corrector 314C. Paying attention to only the face areas detected, the temporary target value setter 300C sets a temporary target value of face luminance and, in the illustrative embodiment, generates a temporary correction gamma corresponding to the temporary target value.

Figure 29:
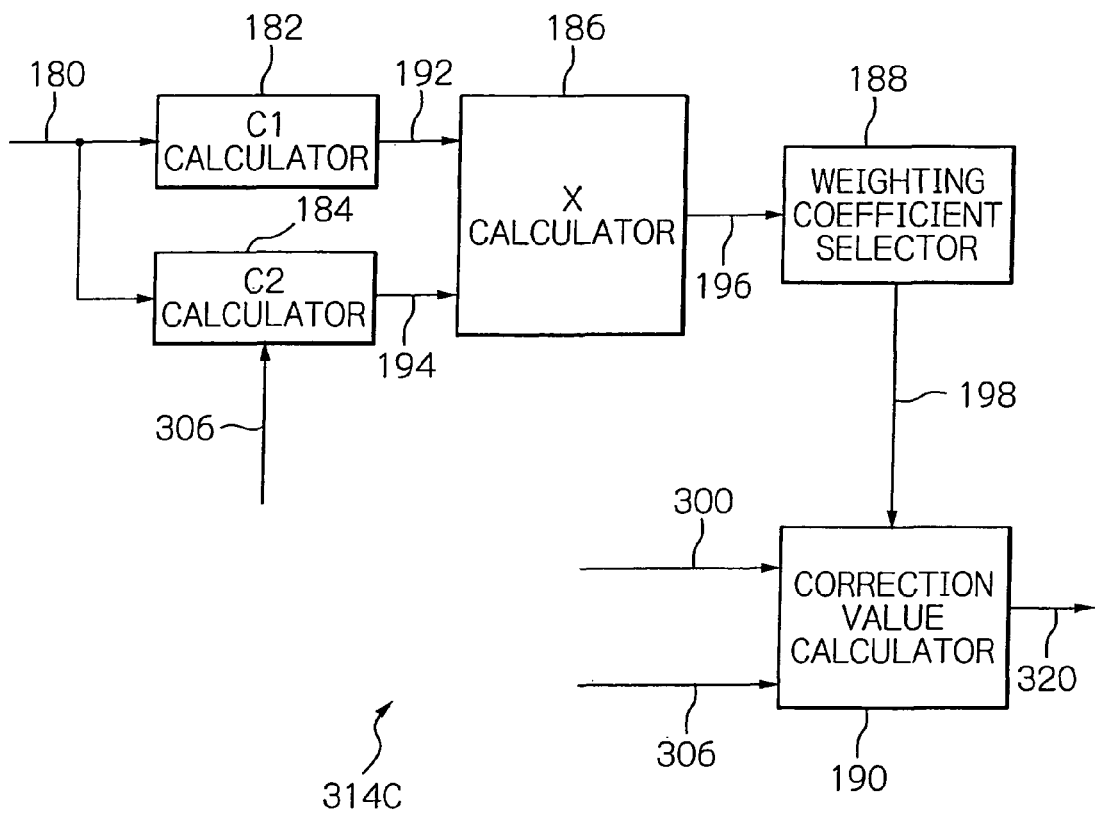
FIG. 29 is a schematic block diagram showing a specific configuration of a target value corrector included in the correction gamma calculator of FIG. 28.

As shown in FIG. 29 specifically, the target value corrector 314C is made up of a C1 calculator 182, a C2 calculator 184, an X calculator 186, a weighting coefficient selector 188 and a correction value calculator 190. By using background information 180 included in an image, the target value corrector 314C corrects the target value in such a manner as to provide the entire image, including the background, with adequate brightness. For such correction, use is made of a color difference amount C as a characteristic amount. The color difference amount C is expressed as:

$$C=\sqrt{C_r^2+C_b^2} \qquad (7)$$

where C1 denotes a color difference amount produced when the basic gamma is applied to the image while C2 denotes a color difference amount produced when the temporary correction gamma derived from the temporary target value is applied.

The C1 and C2 calculators 182 and 184 calculate color difference amounts C1 and C2, respectively, for each pixel and feed the amounts C1 and C2 thus calculated to the X calculator 186 as outputs 192 and 194 thereof. The X calculator 186 calculates a decrease in color difference 196 (X) produced by:

$$X = \frac{\sum_{i=1}^{N}(c1_i - c2_i)}{N} \qquad (8)$$

where N denotes a variable representative of the total number of pixels.

Figure 30:
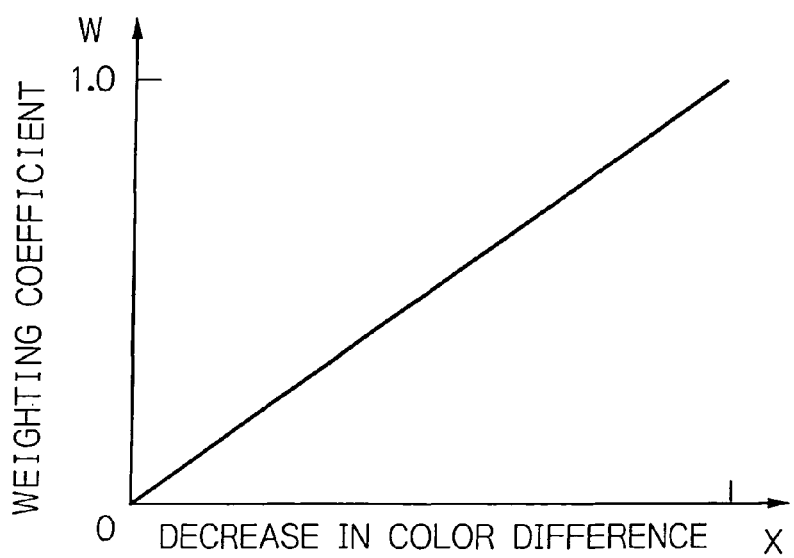
FIG. 30 is a graph showing a relation between decreases in color difference and weighting coefficients stored in a weighting coefficient selector included in the target value corrector of FIG. 29.

As shown in FIG. 30, the weighting coefficient selector 188 to which the decrease in color difference X is fed from the X calculator 186 includes a lookup table for selecting a particular weighting coefficient W for each decrease in color difference X. The weighting coefficient selector 188 feeds a weighting coefficient 198 (W) thus selected to the correction value calculator 190. The correction value calculator 190, receiving the face luminance value 300 and set temporary target value 306 also, calculates a target value 320 corrected on the basis of the weighting coefficient 198 (W):

corrected target value=face luminance value +(temporary target value) −(face luminance)×(1−$W$)  (9)

The correction value calculator 190 executes correction such that the corrected target value decreases with an increase in determined weighting coefficient W. A target value 320 thus calculated is fed from the correction value calculator 190 to the correction table calculator 30D, FIG. 28. The correction table calculator 30D generates correction gamma coefficients 38 on the basis of the corrected target value 320.

A specific operation of the illustrative embodiment will be briefly described hereinafter. The operation to be described is identical with the face detection procedure of FIG. 4 up to the step S14. After all face areas have been detected out of an image, there are obtained the position, size and likelihood of each face area. If no face areas are detected, it is determined that correction is not necessary, so that the basic gamma is used.

Subsequently, the face luminance values of the individual face areas are calculated, and then the greatest one of them is output as face luminance (step S16). Also, a particular weighting coefficient that determines the degree of importance is assigned to each face area on the basis of at least one of the luminance and the position, size and likelihood of the face area. A weighted mean of the luminance values of the face areas produced by multiplying the luminance of each face area by the respective weighting coefficient is output.

Thereafter, whether or not correction is necessary is determined (step S20). The basic gamma or the correction gamma is used when the face luminance is greater than the threshold luminance or when the former is smaller than the latter inclusive. In the illustrative embodiment, a target face luminance value that will provide the face and the entire image including it with adequate brightness is calculated and dealt with an input selected as a control luminance value. An output corresponding to the above input is a target value. This target value and the minimum and maximum values within the area available for each pixel are used to execute, e.g., spline interpolation for thereby generating a correction gamma.

As for the calculation of a target face luminance value, a temporary target face luminance value is set with attention paid only to the detected face areas. Subsequently, background information is also used to correct the target value in such a manner as to provide the entire image, including the background, with adequate brightness. More specifically, the color different amount C1 to be produced when the basic gamma is applied to the image and the color difference amount C2 to be produced when the temporary correction gamma is applied to the same are calculated in order to determine a decrease in color difference amount X represented by the expression (8).

Subsequently, a weighting coefficient W is selected in accordance with the decrease in color difference amount X and used as the tone of the image, thereby controlling the amount of correction while preventing the tone of the background from being lost by more than a certain degree.

While the illustrative embodiment uses a color difference signal for calculating a decrease in color difference X, use may alternatively be made of a chroma signal.

Figure 31:
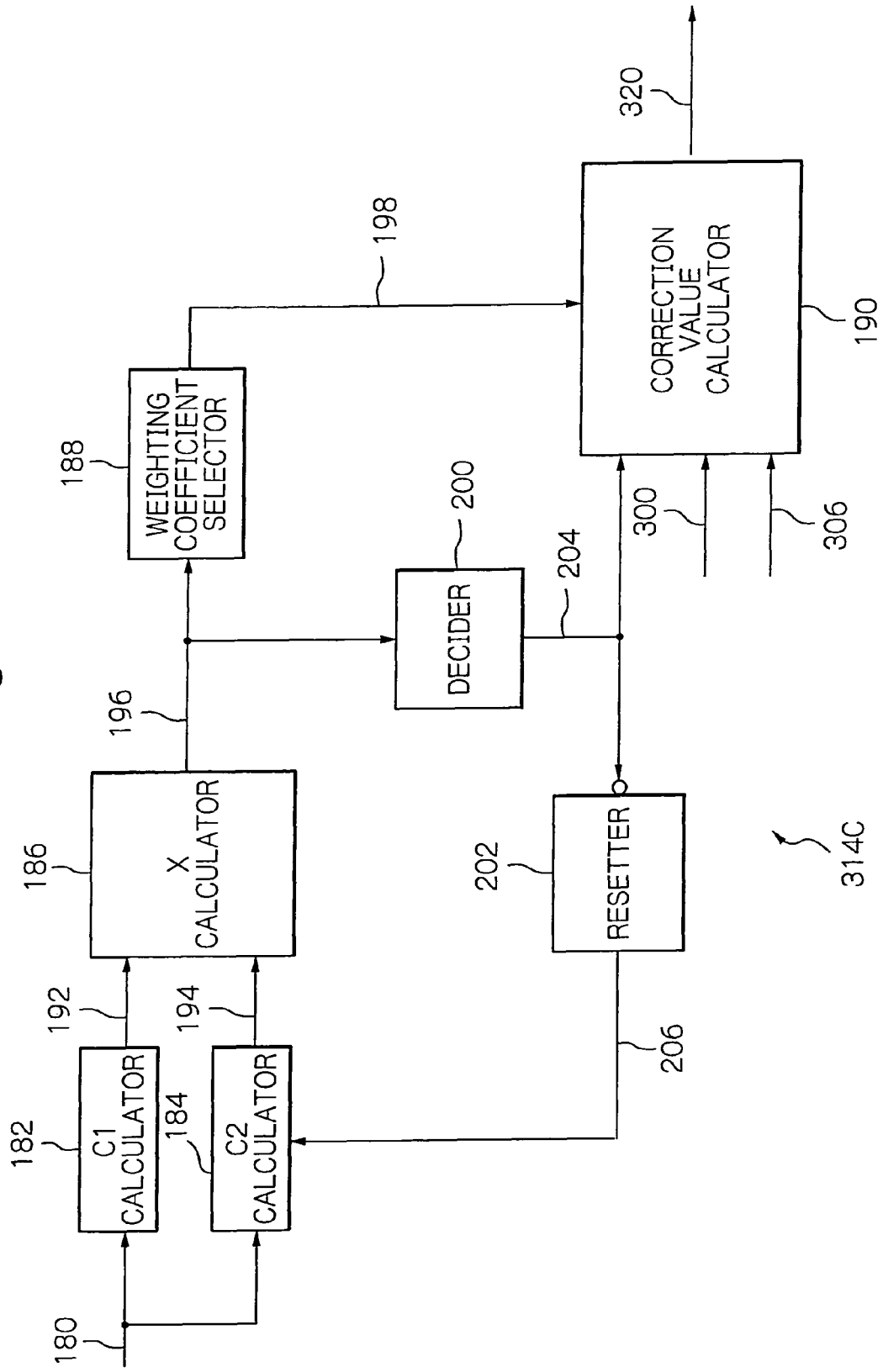
FIG. 31 is a block diagram schematically showing another specific configuration of the target value corrector.

FIG. 31 shows another specific configuration of the target value corrector 314C included in the face detector 124. As shown, the target value corrector 314C includes a decider 200 and a resetter 202 in addition to the various configuration elements shown in FIG. 29. The decider 200 outputs, if the decrease in color difference X output from the X calculator 186 is greater than a preselected threshold $\epsilon$, a low level or "L" as its output 204. If the decrease X is smaller than the threshold $\epsilon$ inclusive, the decider 204 outputs a high level or "H" on its output 204. The result of decision 204 is input to the resetter 324 and correction value calculator 190.

When the result of decision 204 presents an active "low level", the resetter 202 sets a new temporary target value lower than the existing temporary target value, which is input to the resetter 202 although not shown in FIG. 31, by a preselected fixed value. The new temporary target value is fed from the resetter 202 to the C2 calculator 184 as a temporary target value 206. The correction value calculator 190 outputs a target value 320 corrected by the expression (9) when the output of the decider 200 is of an active "high level".

A specific operation of the circuitry of FIG. 31, partly differing from the operation of the previous configuration as to the correction of a target value, will be described hereinafter. The two circuits are identical in that they calculate a decrease in color difference X when correction is executed with the temporary correction gamma derived from the temporary target value. Subsequently, the resetter 202 resets the temporary target value lowered by the preselected fixed value as the new temporary target value, if the above decrease X is greater than the threshold $\epsilon$, and outputs the new temporary target value. And the circuitry of FIG. 31 returns to the calculation of a decrease in color difference X. Also, if the above decrease X is smaller than the threshold $\epsilon$ inclusive, the circuitry of FIG. 31 uses the existing temporary target value as a final target value. A correction gamma is produced by spline interpolation using the target value, minimum value and maximum value and is applied to the image data.

By executing control based on feedback stated above, the circuitry of FIG. 31 enhances correction accuracy more than the previous circuitry.

Figure 32:
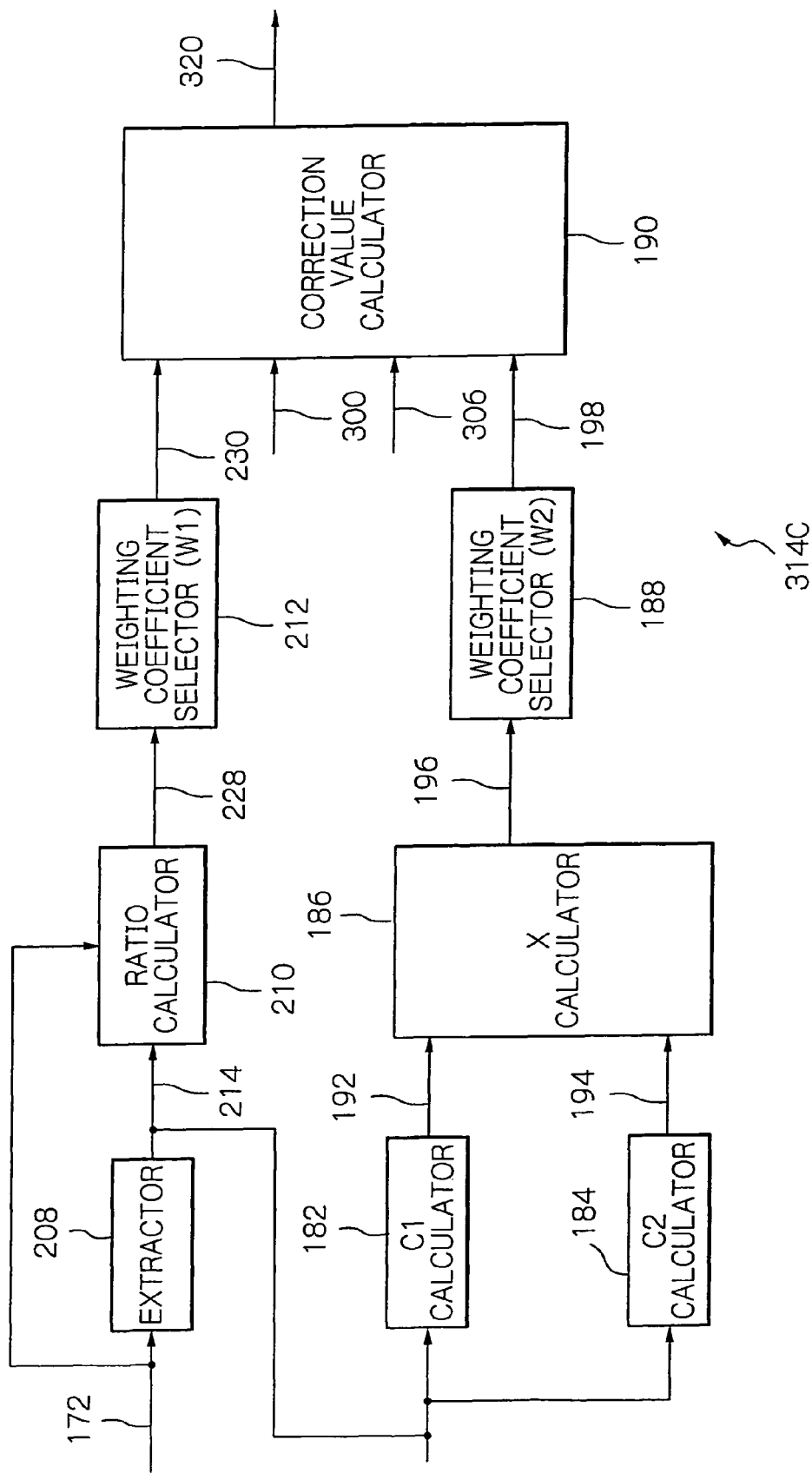
FIG. 32 is a block diagram schematically showing another specific configuration of the target value corrector.

FIG. 32 shows still another specific configuration of the target value corrector 314C and including an extractor 208, a ratio calculator 210 and a weighting coefficient selector 212 in addition to the circuitry of FIG. 29. The extractor 208 extracts, among the input image data, pixels having luminance higher than a preselected threshold inclusive as pixels of interest. It is to be noted that the luminance to be extracted may be any one of, e.g., the sum of three primary colors R, G and B "R+G+B", Y of image data Y, $C_r$ and $C_b$, L* representative of brightness of either one of the CIE (Commission International de l' Éclairage) 1976 L*a*b* color space and CIE 1976 L*u*v* color space, and a single channel of the primary colors R, G and B. The extractor 208 delivers the pixels of interest, labeled 214, to the ratio calculator 210, C1 calculator 182 and C2 calculator 184.

Figure 33A:
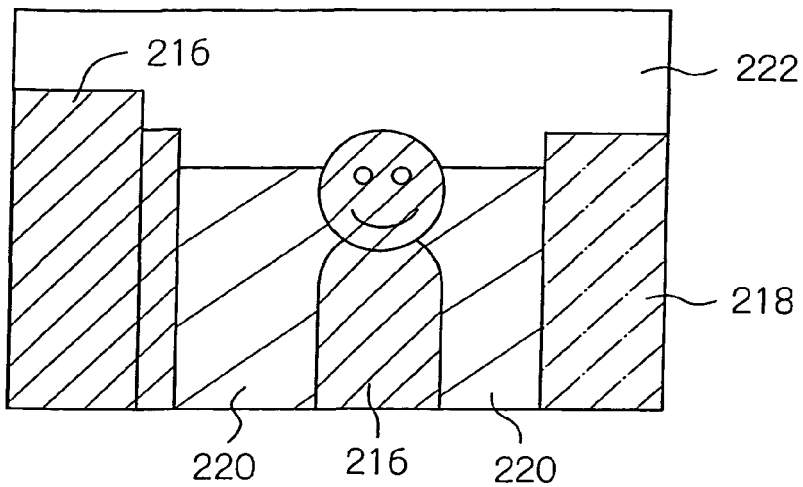
FIGS. 33A, 33B and 33C show a specific image subjected to different gamma correction by an extractor, which is included in the target value corrector of FIG. 32, and divided into pixels of interest and pixels of non-interest.
Figure 33B:
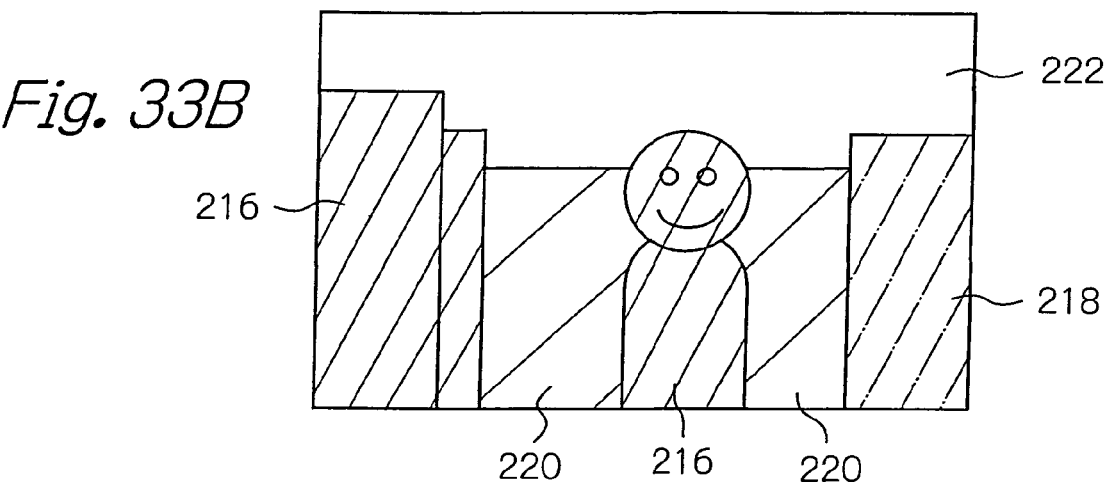
Figure 33C:
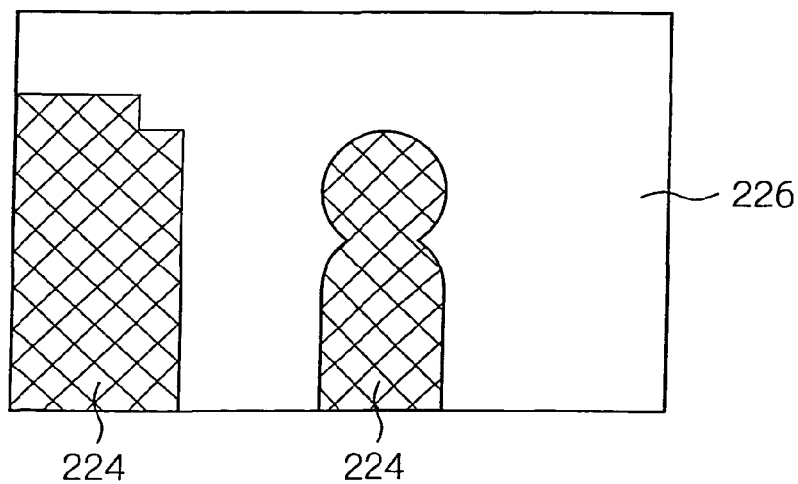

FIGS. 33A, 33B and 33C show a specific field picked up. As shown in FIG. 33A, when the image of the field is processed by the basic gamma, the image data are divided into a region 216 with luminance a, a region 218 with luminance b, a region 220 with luminance c and a region 222 with luminance d where a<b<c<d holds. On the other hand, as shown in FIG. 33B, when the same image is processed by the temporary correction gamma unique to the illustrative embodiment, the image data divided into a region 216 with luminance e, a region 218 with luminance f, a region 220 with luminance g and a region 222 with luminance d where e<f<g<d holds. The luminance e, for example, is set in the extractor 208 as preselected threshold. As shown in FIG. 33C, the extractor 208 separates pixels of non-interest constituting the regions 224 with luminance smaller than the preselected luminance e inclusive and indicated by cross-hatching and pixels of interest constituting the region 226 with luminance greater than the preselected luminance e.

If desired, there may be separately set a threshold Thresh1 for the extraction of pixels of interest and used as a reference for the calculation of a ratio X1 and a threshold Thresh2 for the extraction of pixels of non-interest and used as a reference for the calculation of a decrease in color difference X.

Referring again to FIG. 32, the ratio calculator 210, receiving the image data 172 representative of a single image, calculates the ratio (X1) of the extracted pixels of interest, i.e., having luminance higher than the threshold luminance e to the entire image. The ratio X1 is fed from the ratio calculator 210 to the weighting coefficient selector 212 as a signal 228.

Figure 34A:
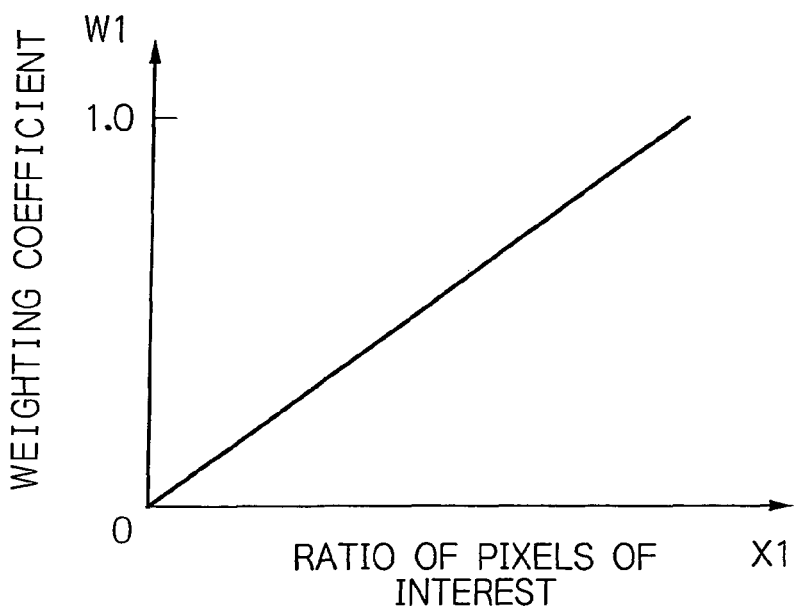
FIGS. 34A and 34B are graphs respectively showing a relation between ratios of pixels of interest and weighting coefficients and a relation between decreases in color difference and weighting coefficients stored in a weighting coefficient selector of FIG. 32.
Figure 34B:
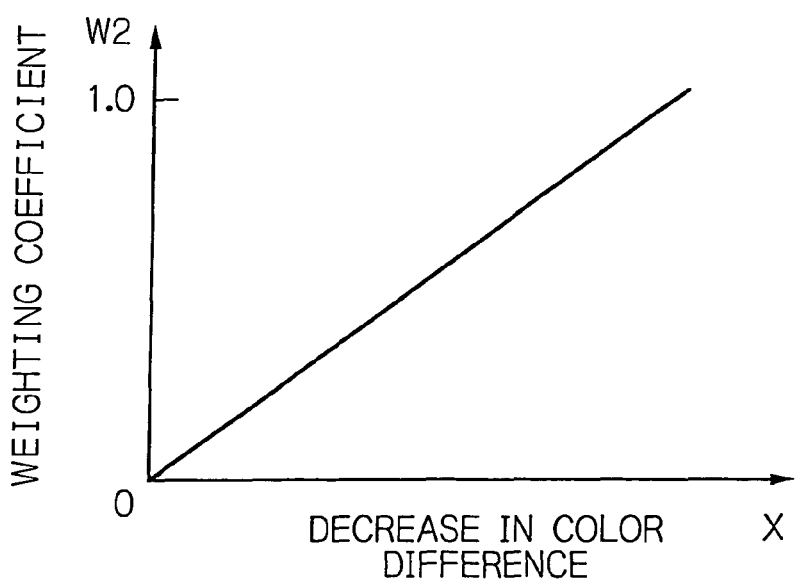

The weighting coefficient selector 212 stores a lookup table for selecting a particular weighting coefficient W1 for each ratio 228 (X1). FIG. 34A shows a specific lookup table stored in the selector 212. The weighting coefficient W1 is fed to the correction value calculator 190. The weighting coefficient selector 188 mentioned previously includes a lookup table for determining a particular weighting coefficient W2 for each decrease in color difference X (196). FIG. 34B shows a specific lookup table available for the weighting coefficient W2 and identical with FIG. 30. The weighting coefficient W2 is also fed to the correction value calculator 190 as a signal 198.

As shown in FIG. 32, the C1 calculator 182 and C2 calculator 184, receiving the pixels of interest from the extractor 208 each, respectively calculate a color difference amount C1 produced by applying the basic gamma to the pixels of interest and a color difference amount C2 produced by applying the temporary correction gamma to the same. Subsequently, the X calculator 186 produces a decrease in color difference X from the two color difference amounts C1 and C2 by using the expression (8) and feeds the decrease X to the weighting coefficient selector 188. In response, the weighting coefficient selector 188 feeds to the correction value calculator 190 the weighting coefficient 192 (W2) selected for the pixels of interest. Receiving the face luminance 300 and set temporary target value 306, the correction value calculator 190 calculates a corrected target value 320 corrected on the basis of the weighting coefficients 198 (W2) and 230 (W1):

$$\text{corrected target value} = \text{face luminance} + (\text{temporary target value}) \times (1-(W1+W2)/2) \quad (10)$$

Figure 28:
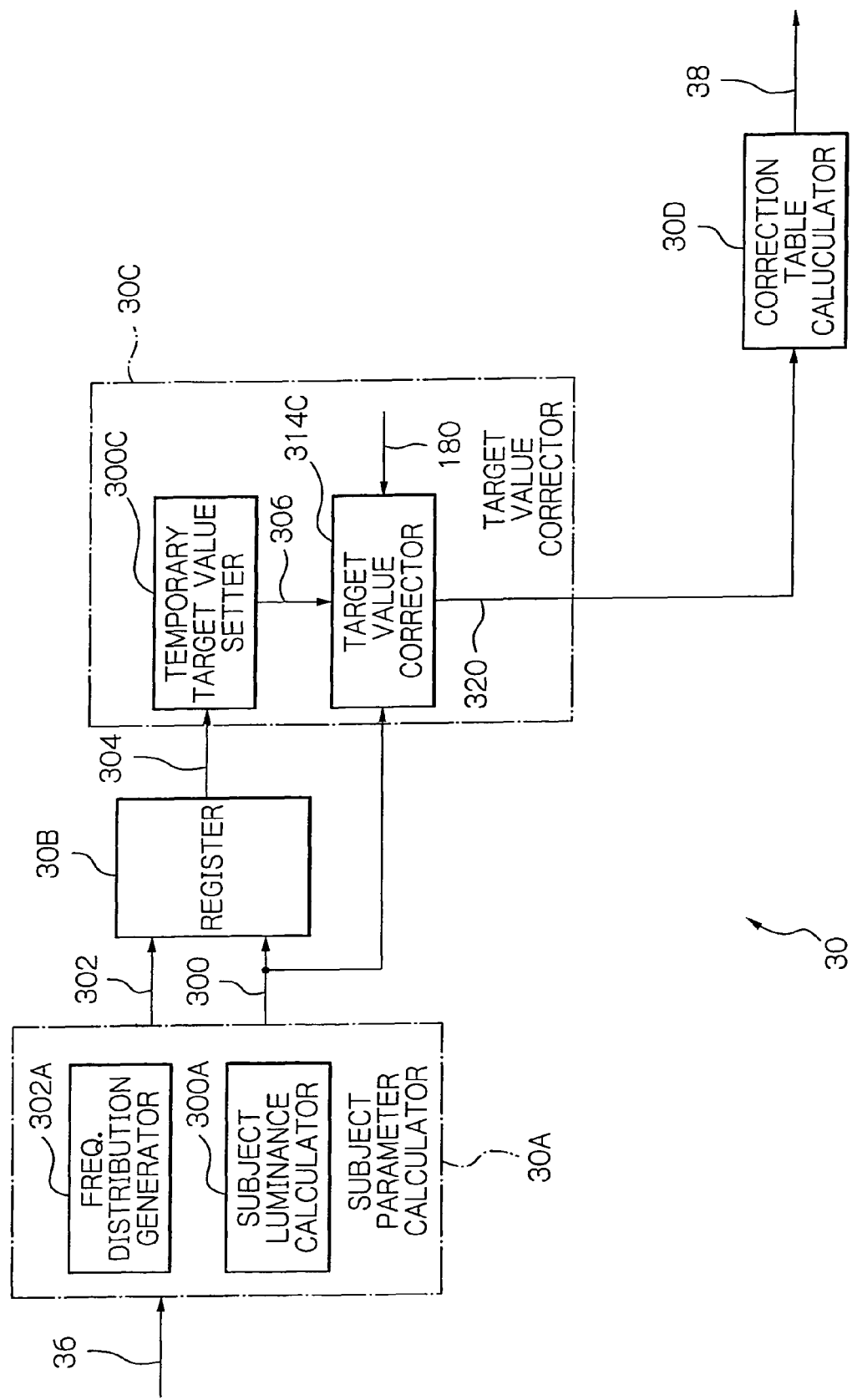
FIG. 28 is a block diagram schematically showing a specific configuration of a correction gamma calculator included in the face processor of FIG. 27.

The correction value calculator 190 feeds the target value 320 thus calculated to the correction table calculator 30D, FIG. 28. The correction table calculator 30D generates correction gamma coefficients 38 on the basis of the corrected target value 320.

As stated above, by adding the ratio of high-luminance pixels to the entire image as a parameter in generating a corrected target value, it is possible to prevent the correction amount from being unnecessarily reduced or otherwise erroneously controlled, compared to the previous circuitry. This limits the subject of monitoring as to a decrease in tone to high-luminance pixels for thereby allowing correction accuracy to be further enhanced because.

Figure 36A:
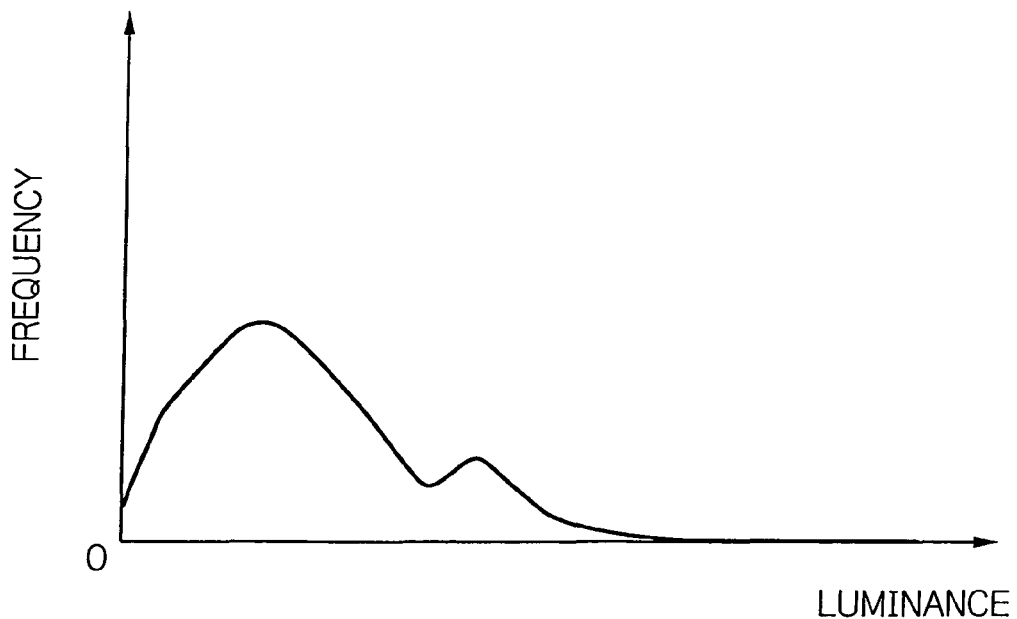
FIGS. 36A and 36B are graphs respectively showing a frequency distribution of luminance stored in a frequency distribution generator and a cumulative frequency % distribution of luminance stored in a max value acquirer included in the target value corrector of FIG. 35.

Reference will be made to FIG. 35 for describing a further specific configuration of the target value corrector 314C. The configuration of FIG. 35 pertains to the correction of the target value in accordance with flash light. As shown, the target value corrector 314C includes a frequency distribution generator 232, a maximum value acquirer 234 and weighting coefficient selectors 236, 238 and 188. The frequency distribution generator 232 generates a frequency distribution of the luminance of the input image data shown in FIG. 36A. More specifically, the frequency distribution generator 232 generates such a frequency distribution on the basis of the image data 36 input thereto when the strobe drive signal 168 is in its high level "H", and delivers data 240 representative of the frequency distribution to the maximum value acquirer 234.

Figure 36B:
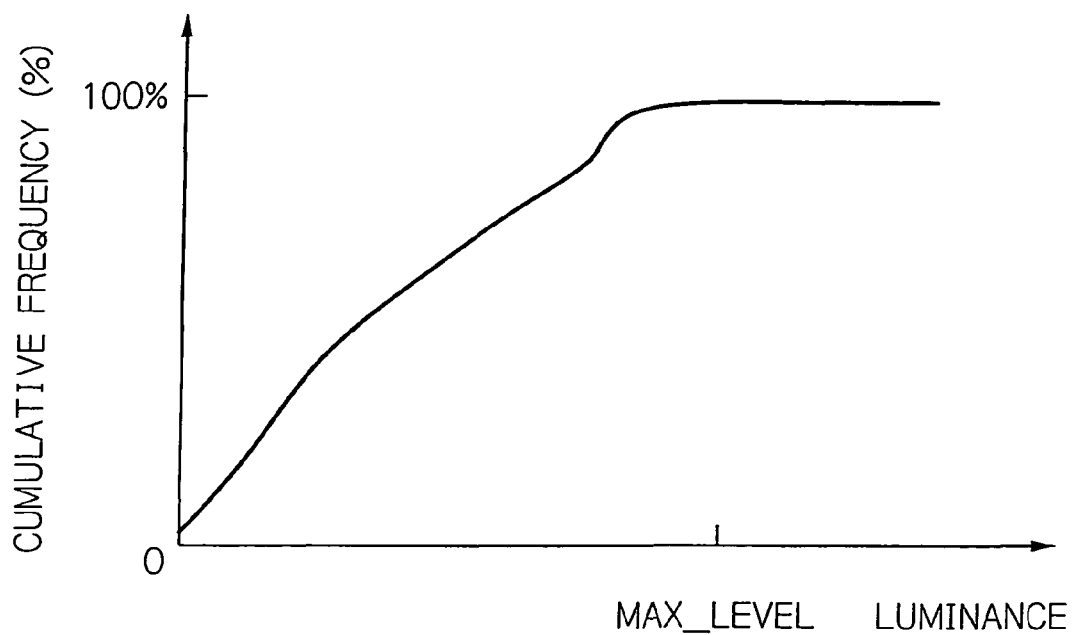

The maximum value acquirer 234 produces a cumulative frequency distribution from the input frequency distribution and then selects a luminance value 242 at which the cumulative frequency distribution becomes 100% for the first time as a maximum value MAX_LEVEL. As shown in FIG. 36B specifically, the maximum value acquirer 234 produces cumulative frequencies % for luminance values. The luminance value 242 (MAX_LEVEL) when the flash drive signal 168 is in its high level "H", is fed from the maximum value acquirer 234 to the weighting coefficient selector 236.

Figure 37A:
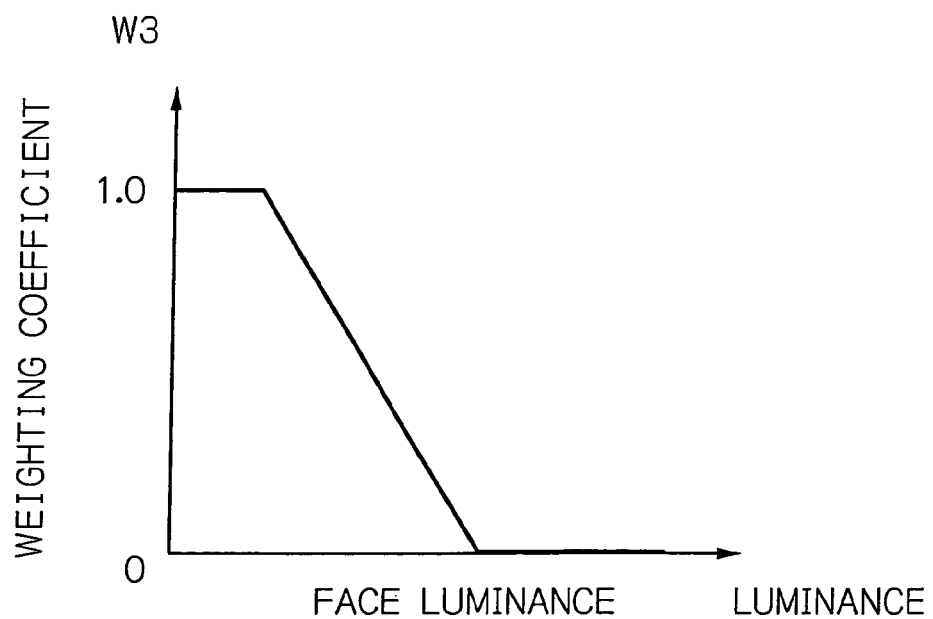
FIGS. 37A and 37B are graphs each showing a particular relation between a weighting coefficient on a face luminance and a weighting coefficient on the maximum value of the face luminance.
Figure 37B:
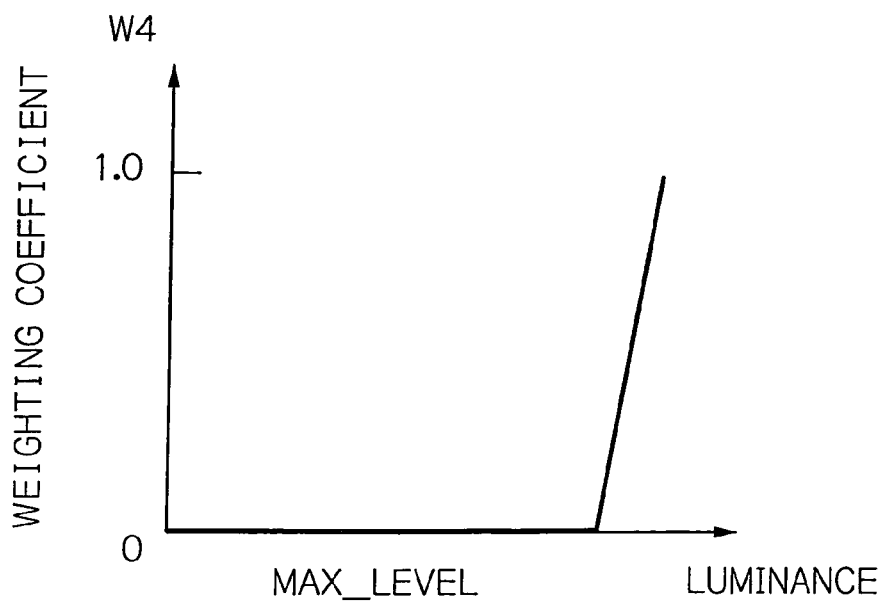

The weighting coefficient selector 238 selects a weighting coefficient W3 to be applied to face luminance 300 input thereto when the flash drive signal 168 is in its high level "H". More specifically, storing data representative of a lookup table shown in FIG. 37A specifically, the weighting coefficient selector 238 outputs a particular weighting coefficient 244 (W3) matching with each face luminance 300. The weighting coefficient selector 236, storing data representative of a lookup table shown in FIG. 37B specifically, selects a particular weighting coefficient W4 matching with each luminance value 242 (MAX_LEVEL) output when the flash drive signal 168 is in its high level "H". Further, the weighting coefficient selector 188 outputs a weighting coefficient W when the flash drive signal 168 is in its low level "L" in accordance with the decrease in color difference 196 (X), as stated earlier.

The correction value calculator 190 calculates a target value corrected in accordance with the emission/non-emission of the flash light. More specifically, the correction value calculator 190 applies the weighting coefficients 244 (W3) and 246 (W4), which are selected in accordance with the emission/non-emission, to the face luminance 300 and set temporary target value 306, thereby outputting a corrected target value 320 expressed as:

$$\text{corrected target value} = \text{face luminance value} + (\text{temporary target value} - \text{face luminance value}) \times (1-(W3+W4)/2) \quad (11)$$

Further, the correction value calculator 190, received the face luminance value 300 and set temporary target value 306, calculates a target value 320 by using the expression (9) on the basis of the weighting coefficient 198 (W) determined in the non-emission condition. Alternatively, the correction value calculator 190 may simply establish the set temporary target value 306 as a target value in the event of non-emission.

The target value 320 thus calculated by the correction value calculator 190 is fed to the correction table calculator 30D, FIG. 28. The correction table calculator 30D produces correction gamma coefficients 38 on the basis of the corrected target value 320.

The correction and calculation of the target value will be described more specifically hereinafter. When flash light is not emitted from the digital camera 10, the correction value unique to the circuitry of FIG. 35 is not corrected. On the emission of flash light, the frequency distribution generator 232 generates a luminance frequency distribution 240 of the entire image. Subsequently, the maximum value acquirer 234 produces a cumulative frequency distribution from the frequency distribution data 240 and then selects a luminance value whose cumulative frequency distribution reaches 100% first as MAX_LEVEL for thereby acquiring a luminance value 242. If desired, the ratio of 100% mentioned above may be replaced with a ratio slightly lower than 100%, e.g., 99%, so that the value of MAX_LEVEL does not fluctuate due to a small number of pixels.

Subsequently, the weighting coefficient selectors 238 and 236 select a weighting coefficient 244 (W3) and a weighting coefficient 246 (W4) from the face luminance and MAX_LEVEL, respectively. The correction value calculator 190 corrects a target value with the expression (11) using the weighting coefficients W3 and W4.

Generally, when a face actually detected is dark despite the emission of flash light, it is difficult to determine whether or not correction is necessary. For example, when the entire image is dark, the image is determined to be of a scene to which flash light has not reached, so that sufficient correction is required. On the other hand, when a bright object is present in the background, it is erroneously determined that, e.g., a person is not the main subject to be picked up or that a person to be picked up has dark skin, requiring the amount of correction to be reduced. With the specific circuitry described above, it is possible to implement an image meeting the two requirements contradictory to each other.

Figure 38:
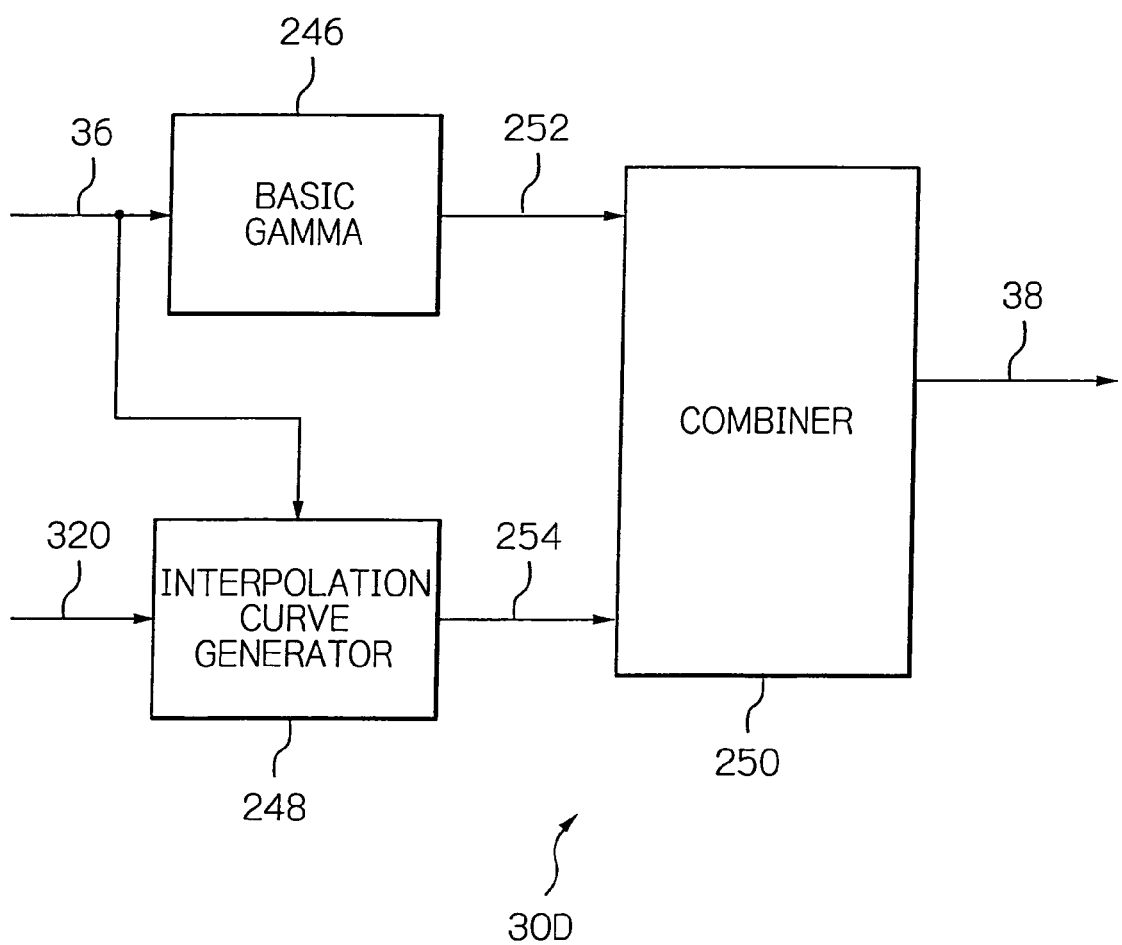
FIG. 38 is a block diagram schematically showing a specific configuration of a correction table calculator included in the correction gamma calculator of FIG. 28.

FIG. 38 shows a specific configuration of the correction table calculator 30D. As shown, the correction table calculator 30D is made up of a basic gamma table 246, an interpolation curve generator 248 and a combiner 250. The basic gamma table 246 is configured to execute gamma correction on the input image data or luminance 36 and output the resulting converted image data or luminance 252.

The interpolation curve generator 248 determines the maximum and minimum values of the image data 36 and then generates a correction curve 254 by spline interpolation using the maximum and minimum values and target value 320. The combiner 250 combines the image data 252 and correction curve data 254 output from the basic gamma table 246 and interpolation curve generator 248, respectively, and outputs the resulting correction gamma data 38.

Figure 39A:
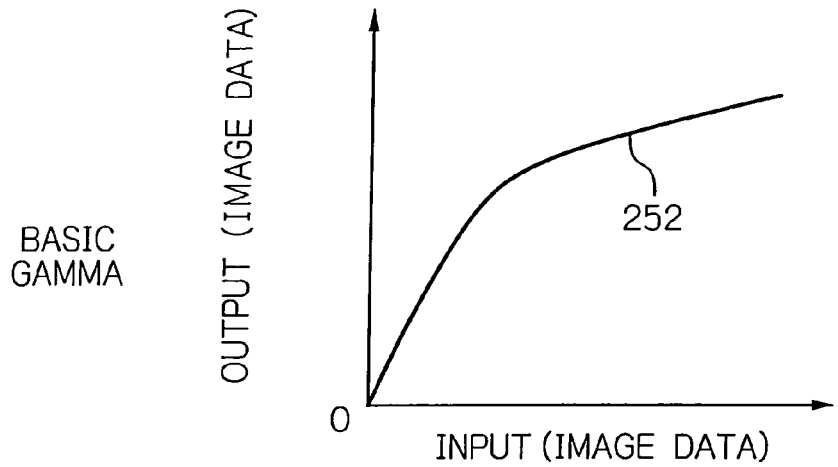
FIGS. 39A, 39B and 39C are graphs demonstrating the principle of operation of the correction table calculator shown in FIG. 38.
Figure 39B:
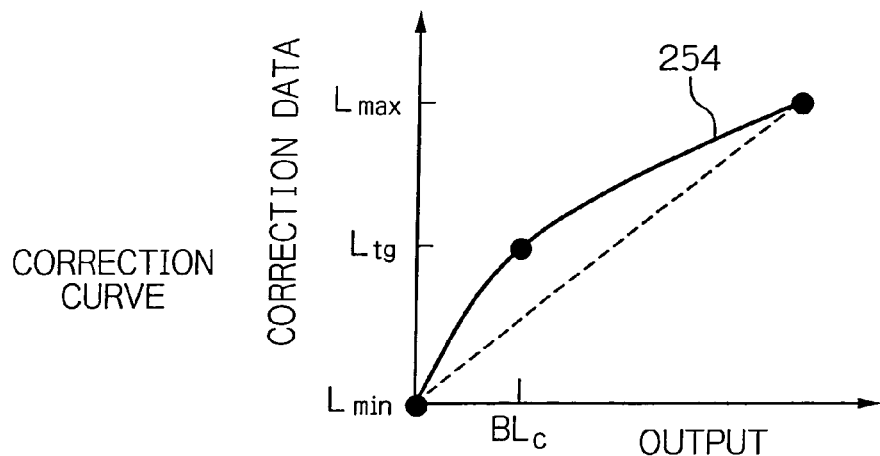
Figure 39C:
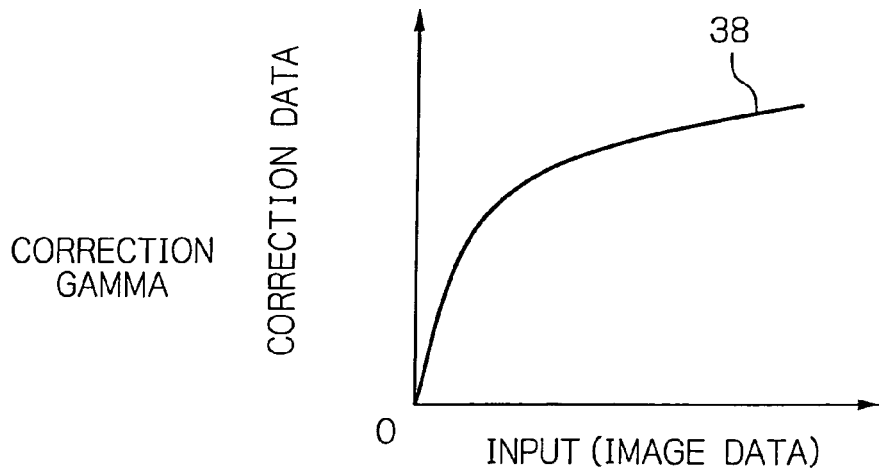

FIGS. 39A, 39B and 39C demonstrate the principle of operation of the correction table calculator 30D described above with reference to FIG. 38. As shown in FIG. 39A, the basic gamma table 246 converts the input image data in accordance with the basic gamma. On the other hand, as shown in FIG. 39B, the interpolation curve generator 248 calculates a target value $L_{tg}$ of face luminance included in the image and making the face and the entire image adequately bright, thereby matching the face luminance after basic gamma to the control luminance value $BL_c$. More specifically, the interpolation curve generator 248 generates a correction curve for the image data subjected to basic gamma by spline interpolation or similar interpolation using the three values, i.e., the target value $L_{tg}$ and the maximum and minimum values in a range available for the image data.

As shown in FIG. 39C, the combiner 250 combines the image data 252 represented by the basic gamma curve of FIG. 39A and the correction curve data 254 of FIG. 39C to thereby output final correction gamma data 38.

As stated above, the basic gamma, used as a base, serves to reduce brightness hunting ascribable to the success/failure of face detection. Also, with the circuitry of FIG. 38, the illustrative embodiment achieves a more stable correction curve than the previous embodiment.

Figure 40:
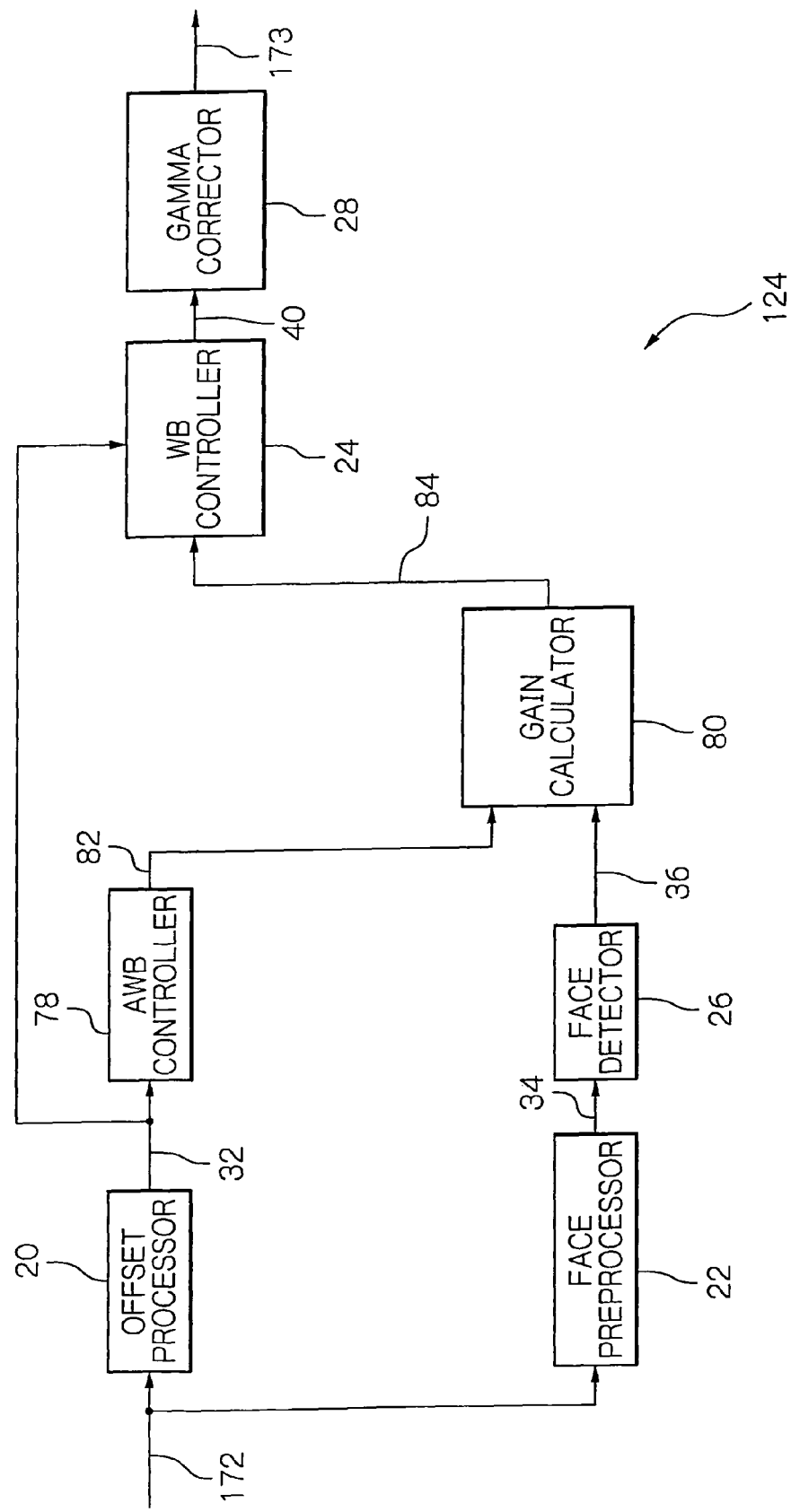
FIG. 40 is a block diagram schematically showing a specific configuration of a correction gamma calculator included in the face processor of FIG. 27.
Figure 41:
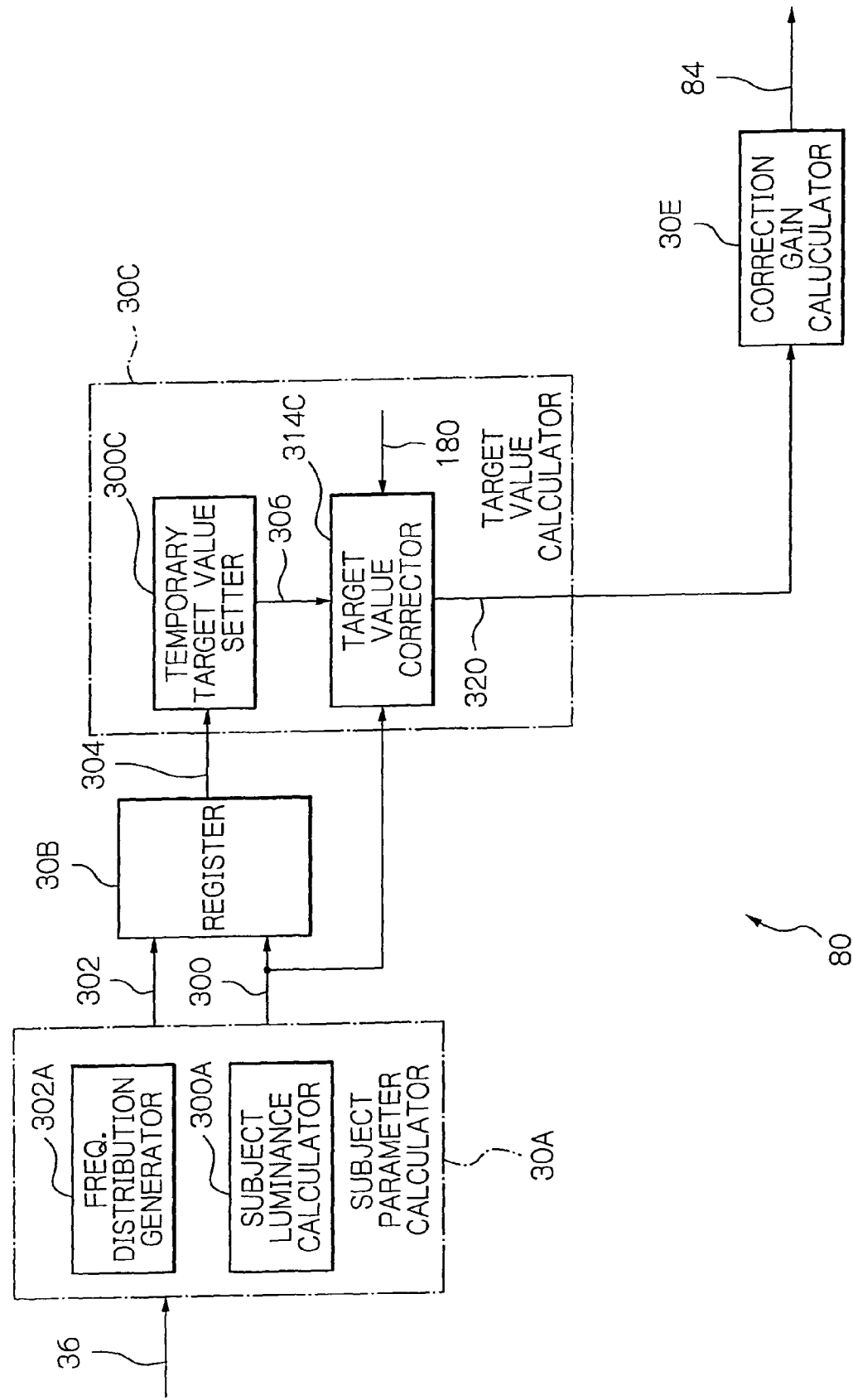
FIG. 41 is a block diagram schematically showing a specific configuration of a gain calculator included in the correction gamma calculator of FIG. 40.

FIG. 40 shows another specific configuration of the face processor 124 configured to execute gain correction instead of tone correction. The circuitry of FIG. 40 is identical with the circuitry of FIG. 14 in that it includes the offset processor 20, AWB controller 78, face preprocessor 22, face detector 26, gain calculator 80, WB controller 24 and gamma corrector 28. In FIG. 40, the image data, labeled 172, are input to the offset processor 20, face preprocessor 28 and gamma corrector 28 because the face processor 124 is included in the signal processor 16. Also, data 173 output from the gamma corrector 28 are delivered to, e.g., the interpolation processor 44 as the output of the face processor 124.

The gain calculator 80 is implemented as the same circuitry as the gain calculator 80 of FIG. 15 except for the configuration of the target value calculator 30C. The target value calculator 30C is made up of the temporary target value setter 300C and target value corrector 314C, as stated with reference to FIG. 28 previously. The background data 180 and face luminance 300, for example, are input to the target value corrector 314C. The target value corrector 314C may be provided with any one of the configurations shown in FIGS. 29, 31, 32 and 35.

A specific operation of the face processor 124 shown in FIG. 40 will be described hereinafter. The face processor 124 detects all face areas out of the input image data 172 and then acquires the positions, sizes and degrees of likelihood of the individual face areas. At this instant, if no face areas are detected, the gain calculator 80 outputs the AWB gain 82 as an output gain 84.

Subsequently, the gain calculator 80 calculates the face luminance of each face area and then outputs the maximum face luminance as face luminance. Further, the gain calculator 80 assigns a particular weighting coefficient, which determines the degree of importance, to each face area on the basis of at least one of the luminance and the position, sizes and likelihood of a face, so that the mean value of the resulting weighting coefficients is output as face luminance.

If the face luminance thus determined is higher than a preselected threshold value, the gain calculator 80 outputs the AWB gain with the result that the AWB gain is applied to the input image. On the other hand, if the face luminance is lower than the threshold value inclusive, the gain calculator 80 calculates a target face luminance value that will provide the face and the entire image including it with adequate brightness, and then calculates a ratio of the target value to the face luminance by using the gains G1 applied to the entire image and WB gains G0 represented by the expressions. (4), (5) and (6).

The gain calculator 80 feeds to the WB controller 24 either one of the correction gains $G1_R$, $G1_G$ and $G1_B$ thus calculated and the usual $AW_B$ correction gains $G0_R$, $G0_G$ and $G0_B$ as an output 84.

The target value calculator 30C calculates face luminance with the following procedure. First, paying attention to only the detected face areas, the calculator 30C sets a temporary target value of face luminance. Subsequently, by using background information, the calculator 30C corrects the target value such that the entire image, including background, is provided with adequate brightness.

With the above configuration and operation, the face processor 124 is capable of providing even a dark face with adequate brightness by gain correction instead of tone correction.

Figure 42:
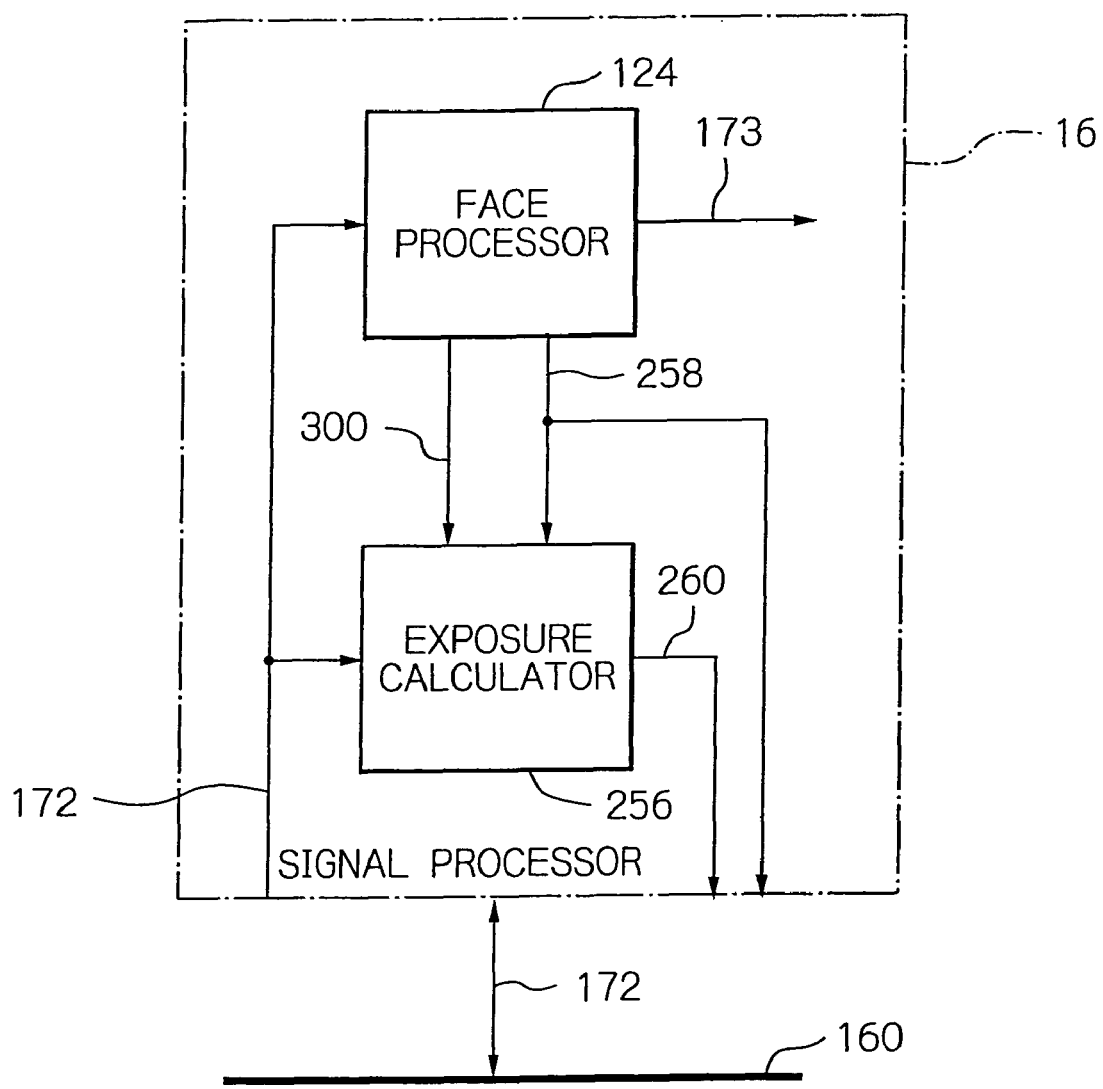
FIG. 42 is a block diagram schematically showing a specific configuration of a signal processor included in the alternative embodiment.

FIG. 42 shows specific circuitry in which the face processor 124 and exposure calculator 256 arranged in the signal processor 16 cooperate to produce an attractive image. As shown, the face processor 124 feeds face luminance 300 to the exposure calculator 256 while feeding a detection signal 258 indicative of whether or not a face is present to the luminance calculator 256 and to the system controller 92 via the bus 160 and signal line 164 not shown.

The exposure calculator 256 calculates an exposure in accordance with the input image data 172 and delivers the exposure 260 to the system controller 92 via the signal line 172, bus 160 and signal line 164 not shown.

Figure 43:
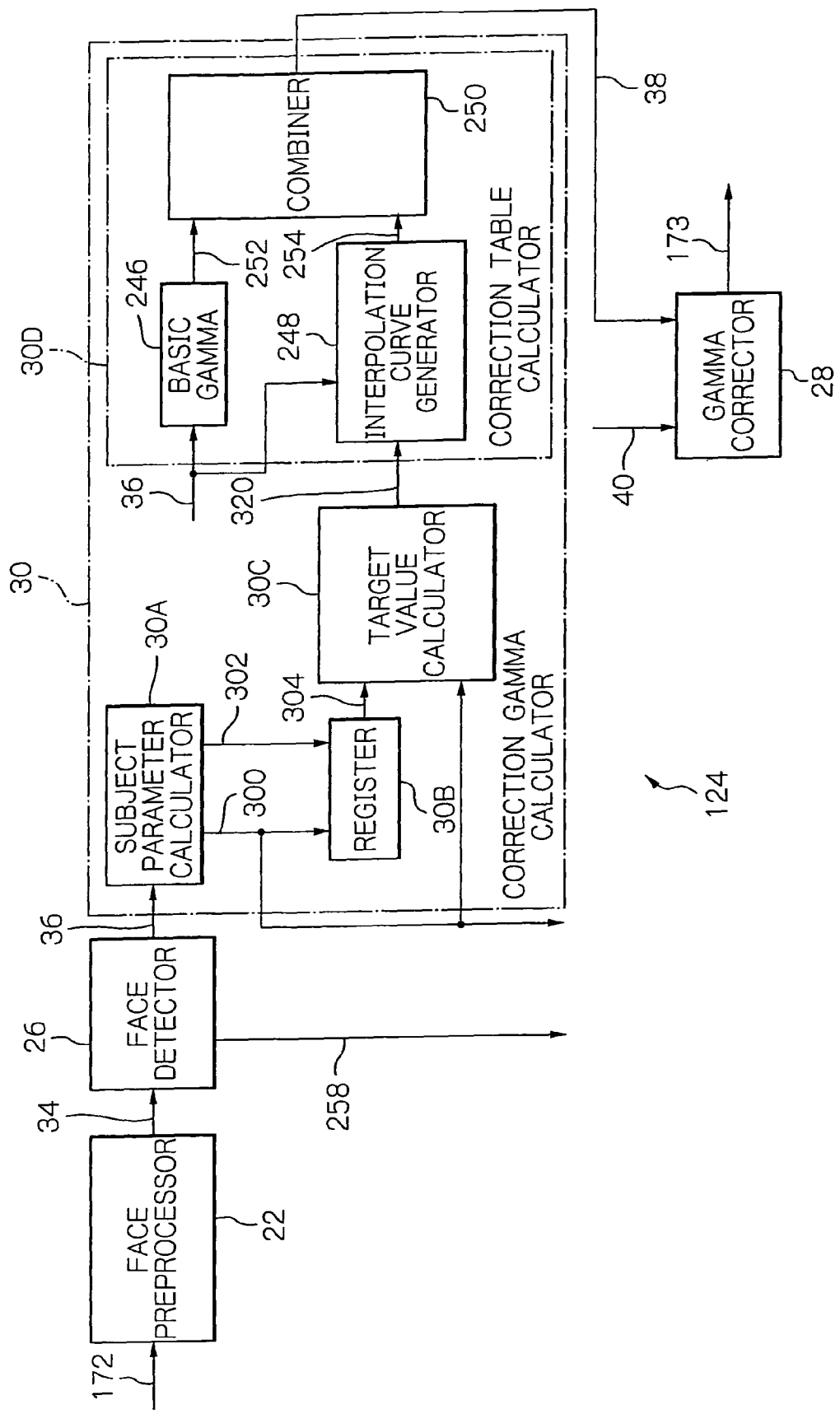
FIG. 43 is a block diagram schematically showing a specific configuration of a face processor included in the configuration of FIG. 42.

FIG. 43 shows part of a specific configuration of the face processor 124 stated above. As shown, the face detector 26 delivers the image data 36, including the result of face detection, to the correction gamma calculator 30 while outputting a detection signal 258 at the same time. The correction gamma calculator 30 outputs face luminance 300. It is to be noted that the correction gamma calculator 30 has the basic configuration shown in FIG. 28 while the target value corrector 314C has any one of the configurations shown in FIGS. 29, 31, 32 and 35. The correction table calculator 30D includes the same constituents as those shown in FIG. 38.

Figure 44:
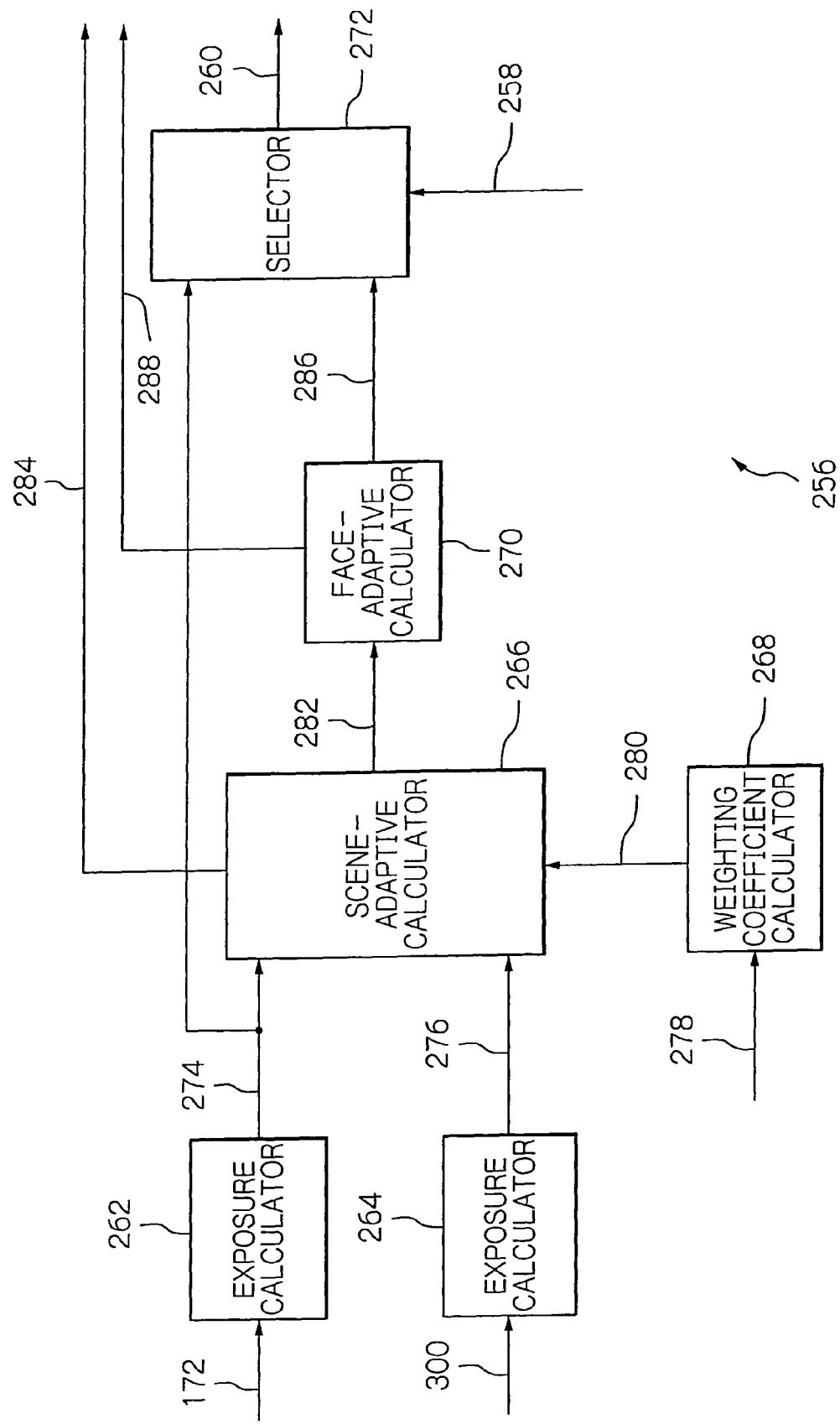
FIG. 44 is a block diagram schematically showing an exposure calculator included in the signal processor of FIG. 42.

As shown in FIG. 44 specifically, the exposure calculator 256 includes exposure calculators 262 and 264, a scene-adaptive calculator 266, a weighting coefficient selector 268, a face-adaptive calculator 270 and a selector 272. The exposure calculators 262 and 264 produce an exposure from input data each. More specifically, the exposure calculator 262 produces an optimum exposure 274 (Ev_t) from all input image data 172 and feeds it to the scene-adaptive calculator 266 and one input of the selector 272. The exposure calculator 264 produces an optimum exposure 276 (Ev_f) and feeds it to the scene-adaptive calculator 266.

The scene-adaptive calculator 266 calculates the optimum exposure of the scene in accordance with the optimum exposures 274 and 276 input thereto. The weighting coefficient selector 268 selects an adequate weighting coefficient 280 (W) for the brightness of the scene 278 and also feeds it to the scene-adaptive calculator 266. The weighting coefficient selector 268 selects a great weighting coefficient W if the entire scene, for example, is bright or selects a small weighting coefficient W if it is dark. By using the optimum exposures 274 (Ev_t) and 276 (Ev_f) and weighting coefficient 280 (W) input thereto, the scene-adaptive calculator 266 calculates an optimum exposure 282 (Ev1) for the scene represented by the input image data:

$$Ev1 = Ev\_t \times W + Ev\_f \times (1-W) \quad (12)$$

The scene-adaptive calculator 266 feeds the scene optimum exposure 282 (Ev1) thus calculated to the face-adaptive calculator 270. Further, the scene-adaptive calculator 266 calculates face luminance 284 (F1) corresponding to the scene optimum exposure Ev1 and outputs it. At this instant, the face luminance 284 (F1) is a value produced by conversion using the basic gamma. The scene-adaptive calculator 266 outputs the face luminance 284 (F1) calculated. The face luminance 284 (F1) is written to the memory 132 via the memory controller 130.

The face-adaptive calculator 270 calculates an optimum exposure (Ev2) for actual pickup, i.e., for a face by subtracting a fixed value (Ev_o) from the scene optimum exposure 282 (Ev1):

$$Ev2 = Ev1 - Ev\_o \quad (13)$$

The face-adaptive calculator 270 feeds the face optimum exposure 286 (Ev2) to the selector 272. Further, the face-adaptive calculator 270 calculates face luminance 288 (F2) corresponding to the face optimum exposure (Ev2) and outputs it to the memory 132 via the memory controller 130. At this instant, the face luminance 288 (F2) is also a value produced by conversion using the basic gamma.

The selector 272 selects either one of the optimum exposure 274 (Ev_t) and face optimum exposure 286 (Ev2), depending on whether or not a face is present in the scene picked up. More specifically, the selector 272 selects the face optimum exposure 286 (Ev2) if a face is detected or, otherwise, selects the optimum exposure 274 (Ev_t).

Figure 45A:
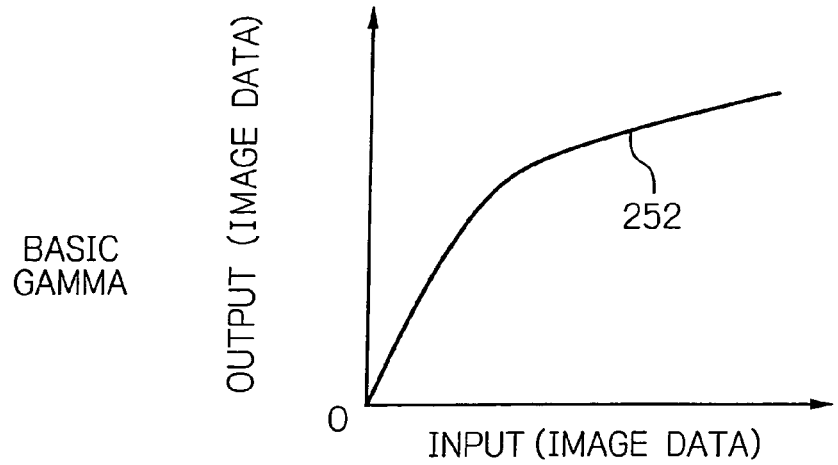
FIGS. 45A, 45B and 45C are graphs demonstrating the principle of operation for calculating a correction table on the basis of face luminance produced by the exposure calculator of FIG. 44.

A specific operation of the illustrative embodiment will be described hereinafter. First, when the operator of the digital camera 10 pushes the shutter release of the control panel 134 to its half-stroke position, the camera 10 executes preliminary pickup for the calculation of an exposure and focusing. Subsequently, whether or not a face is present in the resulting image data 172 is determined on the basis of, e.g., the position, size and likelihood of a face. If a face is absent in the image data 172, an optimum exposure 274 (Ev_t) is calculated on the basis of all image data 172 and used to actually pickup the scene. In this case, the face processor 124 converts the image data 172 with a basic gamma shown in FIG. 45A.

If a face or faces are present in the image data 172, face luminance is calculated from the face areas of the image by the method executed in the step S16 of FIG. 4. Subsequently, optimum exposures 274 (Ev_t) and 276 (EV_f) are calculated and then applied to the expression (12) together with a weighting coefficient 280 (W) for thereby calculating a scene optimum exposure 282 (Ev1) and further an optimum face exposure 284 (F1)

After the above step, a face optimum exposure 286 (Ev2) lower than the scene optimum exposure 282 (Ev1) is set as an exposure for actual pickup, followed by the calculation of face luminance 288 (F2). The face luminance 284 (F1) and 288 (F2) thus calculated are written to the memory 132.

Figure 45B:
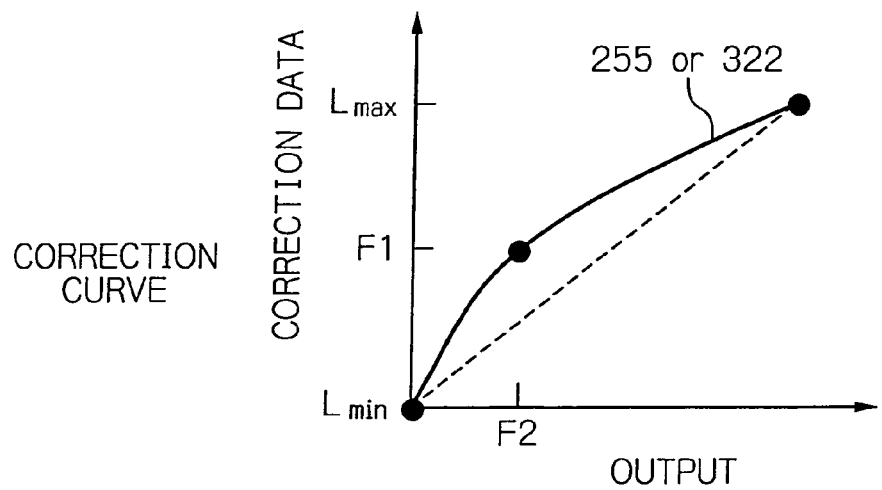
Figure 45C:
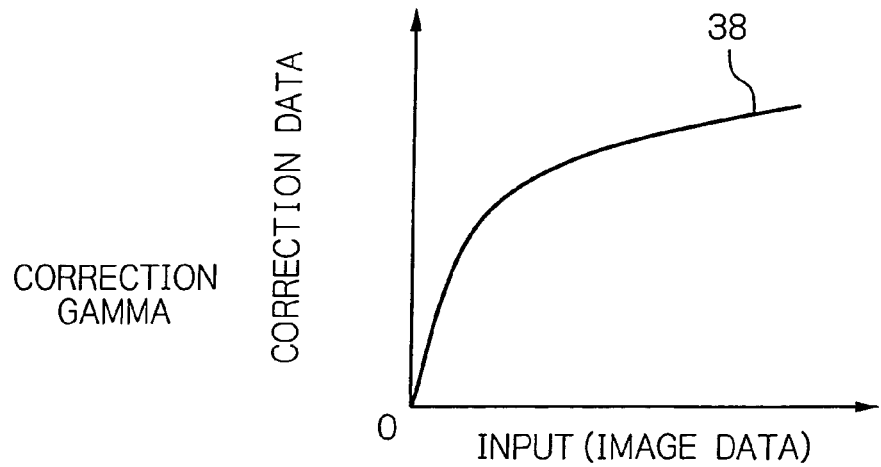

When the operator depresses the shutter release of the control panel 134 to its full-stroke position assigned to actual pickup, a correction gamma for the resulting image data 172 is calculated by reading out the face luminance 284 (F1) and 288 (F2) from the memory 132 and setting them as a target value and a control luminance value, respectively. The correction table calculator 30D generates a correction curve 255 by spline interpolation or similar interpolation using the minimum value, (F2, F1) and maximum value in the range of face luminance shown in FIG. 45B. The correction table calculator 30D then generates a correction curve or correction gamma coefficients 38 for the image data subjected to the basic gamma, as shown in FIG. 45C.

With the above configuration and operation, the illustrative embodiment is capable of providing an image with a broader dynamic range than one obtainable with conventional exposure control. By using such gradation correction, it is possible to realize a high-quality image with a minimum of white saturation of background, compared to the case in which brightness is corrected only by exposure control.

Still another specific configuration of the correction table calculator 30D will be described with reference to FIG. 46. As shown, the correction table calculator 30D includes a correction curve generator 290, a two-input OR gate 292 and a condition selector 294 in addition to the configuration parts shown in FIG. 38 or 43.

Figure 46:
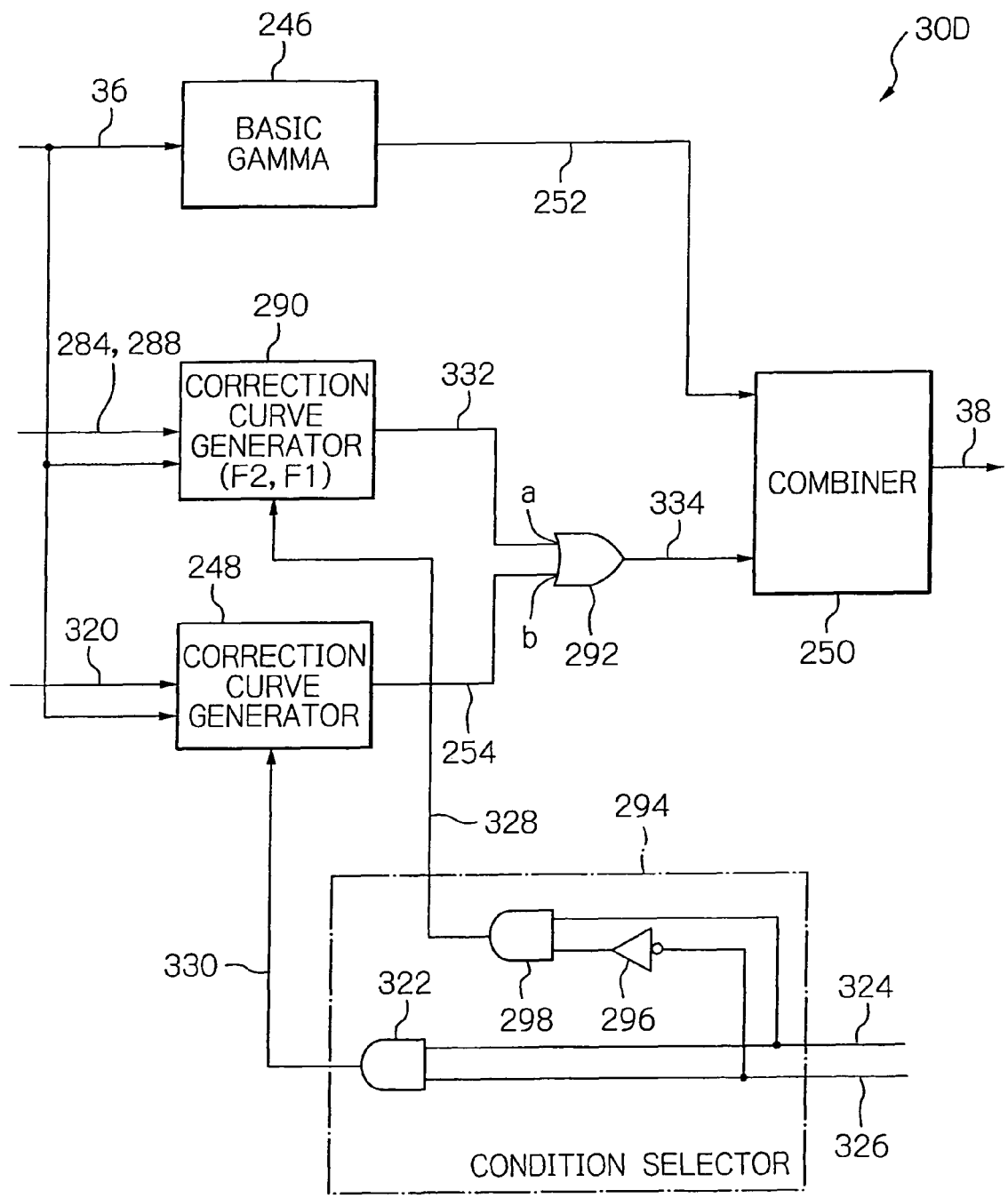
FIG. 46 is a block diagram schematically showing a specific configuration of the correction table calculator included in the face processor of FIG. 43.

The condition selector 294, characterizing the configuration of FIG. 46, includes an inverter 296 and two-input AND gates 298 and 322. The detection signal 258 output from the face detector 26 is input to the condition selector 294 as condition signals 324 and 326 in accordance with timing. The condition signals 324 and 326 are indicative of the presence/absence of faces at the time of preliminary pickup and actual pickup, respectively, and each goes to its level "high" if faces are detected or, otherwise, goes to its level "low".

In the above configuration, when faces are detected at the time of preliminary pickup, but not detected at the time of actual pickup, the AND gate 298 causes an enable signal 328 to go to its level "high" for thereby driving only the correction curve generator 290. The other AND gate 322 causes an enable signal 330 to go to its level "high" when faces are detected at the time of both of preliminary pickup and actual pickup, driving only the correction curve generator 248.

The correction curve generator 290 operates in the same manner as the correction curve generator 248. The image data 36 are input to the basic gamma table 246 and correction curve generators 248 and 290. The target value 320 is input to the correction curve generator 248 while the face luminance 284 and 288 read out of the memory 132 are input to the correction curve generator 290. The correction curve generator 248 generates correction curve data 254 when the enable signal 330 is in its "high" level or "ON" state while the correction curve generator 290 generates correction curve data 254 when the enable signal 328 is in its "high" level or "ON" state. The outputs of the correction curve generators 248 and 290 are respectively connected to input terminals a and b included in the OR gate 292, so that the OR gate 292 feeds either one of the correction curve data 254 and 332 to the combiner 250 as correction curve data 334.

The combiner 250 combines the basic gamma data 252 and correction curve data 334 to thereby output combined correction table data 38.

In operation, assume that the condition signal 324 input to the AND gate 322 is in its "high" level, showing that faces are detected at the time of preliminary pickup and is in its "low" level, showing that no face is detected at the time of preliminary pickup. After actual pickup, the face detector 26, received the image data 36, again, determines whether or not faces are present. If the faces are present, the face detector 26 causes the enable signal 326 also input to the AND gate 322 to go to its "high" level. If the face is absent, then the face detector 26 causes the enable signal 326 input to the AND gate b 322 to go to its "low" level. When the condition signals 324 and 326 both are in the "high" level thereof, the enable signal 330 is fed in its "high" level to the correction curve generator 248. At this time, the enable signal 328 input to the correction curve generator 290 goes to its "low" level with the result that the correction curve generator 248 is driven alone. Consequently, the correction table calculator 30D outputs combined correction data 38 consisting of the basic gamma data 252 and correction curve data 254.

On the other hand, when the condition signals 324 and 326 both go to the "low" level thereof, the enable signal 330 input to the correction curve generator 248 goes to its "low" level while the enable signal 328 input to the other correction curve generator 290 goes to its "high" level, driving only the correction curve generator 290. Consequently, the correction table calculator 30D outputs combined data 38 consisting of the basic gamma 252 and correction curve data 332. It is to be noted that the correction curve data 332 are generated by interpolation based on the coordinates data of the face luminance 284 (F1) and 288 (F2) as interpolated data.

When the condition signals 324 and 326 both are in the "low" level thereof, the correction curve generator 248 does not operate. In this case, the input image data are subjected to gamma corrected using the basic gamma data.

With the above operation, it is possible to set up optimum brightness even if a subject varies between preliminary pickup and actual pickup, compared to image generation effected by the previous embodiment. In addition, even if the detection of faces fails at the time of actual pickup, the optimum brightness set up at the time of preliminary pickup is guaranteed.

While the foregoing description has concentrated on the correction table calculator 30D, the correction gain calculator 30E may also be configured to generate correction gamma in accordance with the result of face detection at the time of preliminary pickup and actual pickup. Therefore, the digital camera 10 has high-quality image, compared to image generation effected by the previous embodiment.

The entire disclosure of Japanese patent application Nos. 2005-284519 and 2006-47515 filed on Sep. 29, 2005 and Feb. 23, 2006, respectively, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An image processing apparatus for executing signal processing with input image data, said apparatus comprising:
    a detector for detecting a subject area, which is included in the image data and includes a subject, characteristically distinguishable from another area; and
    a tone corrector for using a correction table produced from a representative value of the subject area and distribution information in either one of an entire image area represented by the image data and part of the entire image area to correct the image data.

2. The apparatus in accordance with claim 1, further comprising a correction calculator for calculating the correction table;
    said correction calculator comprising:
    a representative value calculator for calculating the representative value of the subject area; and
    a distribution information generator for generating the distribution information by estimation.

3. The apparatus in accordance with claim 2, wherein the correction table comprises gradation correction coefficients.

4. The apparatus in accordance with claim 3, wherein the representative value of the subject area comprises one of any one of a luminance component Y and color components R, G and B representative of a luminance/color difference signal, L* representative of brightness of a CIE (Commission International de l' Éclairage) 1976. L*a*b* color space and a CIE 1976. L*u*v* color space and Y of an XYZ color representation system.

5. The apparatus in accordance with claim 4, wherein when a plurality of subject areas are detected by said detector, said representative value calculator reduces the plurality of subject areas to a predetermined number on the basis of at least one of a plurality of conditions comprising the representative value of the subject area and a position, a size and an evaluation value of the subject area and then determines a representative value of the reduced number of subject areas.

6. The apparatus in accordance with claim 5, wherein said representative value calculator weights representative values of the reduced number of subject areas on the basis of at least one of the plurality of conditions and then produces a mean value of resulting weighted representative values as the representative value.

7. The apparatus in accordance with claim 6, wherein said correction calculator produces a particular correction table for each of color signal components dealt with by the image data.

8. The apparatus in accordance with claim 7, wherein the representative value comprises either one of a luminance value and one of representative values of the color signals of each subject area.

9. The apparatus in accordance with claim 7, wherein the distribution information comprises at least one of a frequency distribution of luminance and spatial distribution information of luminance.

10. The apparatus in accordance with claim 7, wherein the distribution information uses signal levels of color signals representative of respective color components as the luminance of the subject area and comprises at least one of a frequency distribution of the luminance and spatial distribution information of the luminance.

11. The apparatus in accordance with claim 10, wherein the frequency distribution and the spatial distribution information of luminance are calculated after being reduced or resized with respect to the image data.

12. The apparatus in accordance with claim 11, further comprising a parameter changing circuit for changing a parameter to be used for signal processing of the image data in accordance with the correction table.

13. The apparatus in accordance with claim 12, wherein said parameter changing circuit comprises:
a slope calculator for calculating a slope of a curve, which is representative of a relation of output values produced by applying the correction table to input values of the image data to the input values, on the basis of a reference input value included in the input values and an output value derived from the reference input value, and
a change controller for comparing the slope with a predetermined slope and control a change of the parameter in accordance with a result of comparison.

14. The apparatus in accordance with claim 13, wherein the parameter is representative of at least one of sharpness of the image data and granularity reflecting an amount of noise.

15. The apparatus in accordance with claim 14, wherein said apparatus comprises a mobile-phone handset.

16. The apparatus in accordance with claim 14, further comprising a program for allowing functions of said detector, said tone corrector, said corrector and said parameter changing circuit to be implemented by a computer.

17. An image processing apparatus for executing signal processing with input image data, said apparatus comprising:
a detector for detecting a subject area, which is included in the image data and includes a subject, characteristically distinguishable from another area; and
a tone corrector for using a correction value produced from a representative value of the subject area and distribution information in either one of an entire image area represented by the image data and part of the entire image area to correct the image data by.

18. The apparatus in accordance with claim 17, further comprising a correction value calculator for calculating the correction value;
said correction value calculator comprising:
a representative value calculator for calculating a representative value of the subject area; and
a distribution information generator for generating the distribution information by estimation.

19. The apparatus in accordance with claim 18, wherein the correction value comprises a value for correcting a gain.

20. The apparatus in accordance with claim 19, wherein the representative value of the subject area comprises any one of a luminance component Y and color components R, G and B representative of a luminance/color difference signal, L* representative of brightness of a CIE (Commission International de l' Éclairage) 1976. L*a*b* color space and a CIE 1976. L*u*v* color space and Y of an XYZ color representation system.

21. The apparatus in accordance with claim 20, wherein when a plurality of subject areas are detected by said detector, said representative value calculator reduces the plurality of subject areas to a predetermined number on the basis of at least one a plurality of conditions comprising the representative value of the subject area and a position, a size and an evaluation value of the subject area and then determines a representative value of the reduced number of subject areas.

22. The apparatus in accordance with claim 21, wherein said representative value calculator weights representative values of the reduced number of subject areas on the basis of at least one of the plurality of conditions and then produces a mean value of resulting weighted representative values as the representative value.

23. The apparatus in accordance with claim 22, wherein said correction calculator produces a particular correction table for each of color signal components dealt with by the image data.

24. The apparatus in accordance with claim 23, wherein the representative value comprises either one of a luminance value and one of representative values of the color signals of each subject area.

25. The apparatus in accordance with claim 23, wherein the distribution information comprises at least one of a frequency distribution of luminance and spatial distribution information of luminance.

26. The apparatus in accordance with claim 23, wherein the distribution information uses signal levels of color signals representative of respective color components as the luminance of the subject area and comprises at least one of a frequency distribution of the luminance and spatial distribution information of the luminance.

27. The apparatus in accordance with claim 26, wherein the frequency distribution and the spatial distribution information of luminance are calculated after being reduced or resized with respect to the image data.

28. The apparatus in accordance with claim 27, further comprising a parameter changing circuit for changing a parameter to be used for signal processing of the image data in accordance with the correction value.

29. The apparatus in accordance with claim 28, wherein said parameter changing circuit comprises:
a change controller for comparing output values produced by applying the correction value to input values of the image data with a predetermined output value and control a change of the parameter in accordance with a result of comparison.

30. The apparatus in accordance with claim 29, wherein the parameter is representative of at least one of sharpness of the image data and granularity reflecting an amount of noise.

31. The apparatus in accordance with claim 29, wherein said apparatus comprises a mobile-phone handset.

32. The apparatus in accordance with claim 29, further comprising a program for allowing functions of said detector, said tone corrector, said corrector and said parameter changing circuit to be implemented by a computer.

33. A signal processing method for executing signal processing with image data, said method comprising:

a first step of detecting a subject area by a detector for detecting the subject area, which is included in the image data and includes a subject, characteristically distinguishable from another area; and a second step of calculating a correction table by a correction calculator for calculating the correction table on the basis of a representative value of the subject area and distribution information in either one of an entire image area represented by the image data or part of the entire image area, and using either one of a resulting calculated correction table and a basic correction table, and correcting the image data by a tone corrector for correcting tone of the image data.

34. The method in accordance with claim 33, wherein said second step comprises:

a third step of calculating a target value by a target value calculator in the correction calculator for calculating the representative value of the subject area and determining the target value which is an output value resulting from the representative value; and a fourth step of calculating the correction table by a correction table calculator for calculating the correction table using a maximum value and a minimum value that the image data can take and the target value determined in said third step.

35. The method in accordance with claim 34, wherein said third step comprises:

a fifth step of determining a temporary target value by a determining circuit for determining, as the temporary target value, the target value assumed on the basis of the representative value;

a sixth step of estimating a first frequency distribution by a distribution estimator for estimating, when the tone is to be corrected by the temporary target value, luminance or each color component of the first frequency distribution as the distribution information of the image data with respect to the target value; and a seventh step of determining a variation by a decider for determining whether or not the variation represented by a difference between the first frequency distribution and a second frequency distribution by a subject parameter calculator for estimating the second frequency distribution of luminance or each color derived from the basic correction table lies in a predetermined allowable range;

said method setting, if the variation does not lie in the predetermined allowable range, a new temporary target value by a resetter for resetting the new temporary target value and then repeating said sixth step and seventh step or using, if the variation lies in the predetermined allowable range, the temporary target value as the target value.

36. The method in accordance with claim 35, wherein the correction table comprises a gradation correction table.

37. The method in accordance with claim 36, wherein the variation comprises either one of a difference between cumulative frequencies of highlight, which is assumed to include part of the image data higher than a predetermined value inclusive, in the first frequency distribution and the second frequency distribution and a difference between a value of a peak frequency of the first frequency distribution and a value of a peak frequency of the second frequency distribution.

38. The method in accordance with claim 37, wherein when a plurality of subject areas are detected, said third step reduces the plurality of subject areas to one or more subject areas on the basis of at least one of conditions comprising the representative value, a position, a size and an evaluation value of the subject area and determines the target value for each subject area.

39. The method in accordance with claim 38, wherein said third step weights at least one of the conditions, produces a mean value of the representative values of resulting weighted subject areas and uses the mean value as the representative value.

40. The method in accordance with claim 39, wherein the representative value of the subject area comprises either one of a luminance value and a representative value of each color signal.

41. The method in accordance with claim 40, wherein said third step compares the target value with a correction threshold value, which is used to determine whether or not to execute correction, and causes an operation to occur in accordance with a result of comparison for thereby calculating the target value only in one direction.

42. The method in accordance with claim 40, wherein said method changes a parameter for signal processing to be executed with the image data in accordance with the correction table.

43. The method in accordance with claim 42, further comprising:

an eighth step of calculating a slope of a curve by a slope calculator for calculating the slope of the curve, which is representative of a relation of output values produced by applying the correction table to input values of the image data to the input values, on the basis of a reference input value included in the input values and an output value derived from the reference input value; and a ninth step of comparing the slope calculated with a predetermined slope and then changing the parameter by a system controller for controlling the change of the parameter in accordance with a result of comparison.

44. The method in accordance with claim 43, wherein the parameter is representative of at least one of sharpness of the image data and granularity reflecting an amount of noise.

45. A signal processing method for executing signal processing with image data, said method comprising:

a first step of detecting a subject area by a detector for detecting the subject area, which is included in the image data and includes a subject, characteristically distinguishable from another area; and a second step of calculating a correction value by a gain calculator for calculating the correction value on the basis of a representative value of the subject area and distribution information in either one of an entire image area represented by the image data, and using either one of a resulting calculated correction value and a basic correction value, and correcting tone of the image data by a tone corrector for correcting tone of the image data.

46. The method in accordance with claim 45, wherein said second step comprises:

a third step of calculating a target value by a target value calculator in the gain calculator for calculating the representative value of the subject area and determining a target value which is an output value resulting from the representative value; and a fourth step of setting the representative value as an input value and calculating the correction value by the gain calculator for calculating the correction value on the basis of a ratio of the target value to the input value.

47. The method in accordance with claim 46, wherein said third step comprises:

a fifth step of determining a temporary target value by a determining circuit for determining, as a temporary target value, the target value assumed on the basis of the representative value;

a sixth step of estimating a first frequency distribution by a distribution estimator for estimating, when the tone is to be corrected by the temporary target value, luminance or each color component of the first frequency distribution as the distribution information of the image data a seventh step of determining a variation by a decider for determining whether or not the a variation represented by a difference between the first frequency distribution and a second frequency distribution by a subject parameter calculator for estimating the second frequency distribution of luminance or each color derived from the basic correction value lies in a predetermined allowable range;

said method setting, if the variation does not lie in the predetermined allowable range, a new temporary target value by a resetter for resetting the new temporary target value and then repeating said sixth step and seventh step or using, if the variation lies in the predetermined allowable range, the temporary target value as the target value.

48. The method in accordance with claim 47, wherein the correction value comprises a gain.

49. The method in accordance with claim 46, wherein the correction value in the fourth step comprises a final gain produced in terms of a product of a basic gain automatically assigned to the image data and a ratio of the target value to the input value.

50. The method in accordance with claim 47, wherein the variation comprises either one of a difference between cumulative frequencies of highlight, which is assumed to include part of the image data higher than a predetermined value inclusive, in the first frequency distribution and the second frequency distribution and a difference between a value of a peak frequency of the first frequency distribution and a value of a peak frequency of the second frequency distribution.

51. The method in accordance with claim 50, wherein when a plurality of subject areas are detected, said third step reduces the plurality of subject areas to one or more subject areas on the basis of at least one of conditions comprising the representative value, a position, a size and an evaluation value of the subject area and determines the target value for each subject area.

52. The method in accordance with claim 51, wherein said third step weights at least one of the conditions, produces a mean value of the representative values of resulting weighted subject areas and uses the mean value as the representative value.

53. The method in accordance with claim 52, wherein the representative value of the subject area comprises either one of a luminance value and a representative value of each color signal.

54. The method in accordance with claim 53, wherein said third step compares the target value with a correction threshold value, which is used to determine whether or not to execute correction, and causes an operation to occur in accordance with a result of comparison for thereby calculating the target value only for one direction.

55. The method in accordance with claim 53, wherein said method changes a parameter for signal processing to be executed with the image data in accordance with the correction table.

56. The method in accordance with claim 55, further comprising:
an eighth step of comparing an output value produced by applying the correction value to the input value of the image data with a predetermined output value and changing the parameter in accordance with a result of comparison.

57. The method in accordance with claim 56, wherein the parameter is representative of at least one of sharpness of the image data and granularity reflecting an amount of noise.

58. An image processing apparatus for executing signal processing with input image data, said apparatus comprising:
a detector for detecting a subject area, which is included in area of the image data and includes a subject, characteristically distinguishable from another area;
a representative value calculator for calculating a representative value of the subject area detected by said detector;
a characteristic amount calculator for calculating an amount of a characteristic in an entire image area represented by the image data or part of the entire image area;
a correction table calculator for calculating a correction table based on the representative value and the amount of the characteristic; and
a tone corrector for using the correction table to correct tone of the image data.

59. The apparatus in accordance with claim 58, wherein the correction table comprises gradation correction coefficients.

60. The apparatus in accordance with claim 58, wherein when the subject area is not detected by said detector, said tone corrector uses a basic correction table to be originally used to correct the tone of the image data.

61. The apparatus in accordance with claim 60, wherein the representative value comprises any one of luminance, brightness and one of three primary color components.

62. The apparatus in accordance with claim 60, wherein when a plurality of subject areas are detected by said detector, said representative value calculator reduces the subject areas to a predetermined number on the basis of at least one of conditions comprising the representative value, a position, a size and an evaluation value of the subject area and determines the representative value of each of resulting reduced subject areas.

63. The apparatus in accordance with claim 61, wherein when a plurality of subject areas are detected by said detector, said representative value calculator weights each subject area on the basis of at least one of conditions comprising the representative value, a position, a size and an evaluation value of the subject area, produces a mean value of representative values of resulting weighted subject areas and uses the mean value as the representative value.

64. The apparatus in accordance with claim 63, wherein the correction table calculator comprises:
a determining circuit for determining a target value which is an output value of the representative value; and
a calculator for using a maximum value and a minimum value that the image data can take and the target value to calculate the correction table.

65. The apparatus in accordance with claim 64, wherein said determining circuit comprises:
a temporary target value determining circuit for setting a target value assumed on the basis of the representative value as a temporary target value;
a temporary correction table calculator for calculating a temporary correction table from the temporary target value; and
a difference calculator for calculating a first characteristic amount produced by applying the basic correction table to the image data and a second characteristic amount produced by applying the temporary correction table to the image data and calculating a difference between the first characteristic amount and the second characteristic amount;

the temporary target value being corrected in accordance with the difference calculated, and a resulting corrected target value being set as the target value.

66. The apparatus in accordance with claim 64, wherein said determining circuit comprises:
a temporary target value determining circuit for setting a value assumed on the basis of the representative value as a temporary target value;
a temporary correction table calculator for calculating a temporary correction table from the temporary target value;
a difference calculator for calculating a first characteristic amount produced by applying the basic correction table to the image data and a second characteristic amount produced by applying the temporary correction table to the image data and calculating a difference between the first characteristic amount and the second characteristic amount;
a decider for determining whether or not the difference lies in a predetermined allowable range; and
a resetter for setting a new temporary target value when the difference does not lie in the allowable range;
said determining circuit causing said temporary target value calculator, said difference calculator, said decider and said resetter to sequentially, repeatedly operate and setting the temporary target value as the target value in accordance with a difference brought into the allowable range.

67. The apparatus in accordance with claim 64, wherein said determining circuit comprises:
a temporary target value determining circuit for setting a value assumed on the basis of the representative value as a temporary target value;
a temporary correction table calculator for calculating a temporary correction table from the temporary target value;
a difference calculator for calculating a first characteristic amount produced by applying the basic correction table to the image data and a second characteristic amount produced by applying the temporary correction table to the image data and calculating a difference between the first characteristic amount and the second characteristic amount; and
a ratio calculator for extracting pixels with luminance higher than predetermined luminance from the image data to which the temporary correction table is applied and calculating a ratio of extracted pixels to all pixels as a third characteristic amount;
said determining circuit correcting the temporary target value in accordance with the difference and the third characteristic amount and setting a resulting corrected temporary value as the target value.

68. The apparatus in accordance with claim 64, wherein said determining circuit comprises:
a temporary target value determining circuit for setting a value assumed on the basis of the representative value as a temporary target value;
a decider for determining whether or not flash light is emitted; and
a characteristic calculator for producing a frequency distribution of luminance from the image data to which the basic correction table is applied and calculating a fourth characteristic amount based on said frequency distribution of luminance;
said determining circuit correcting the temporary target value in accordance with the representative value and the fourth characteristic amount in response to an emission of the flash light and setting a resulting corrected temporary target value as the target value.

69. The apparatus in accordance with claim 68, wherein a cumulative distribution is produced from the frequency distribution of luminance, and the fourth characteristic amount comprises luminance to hold when the cumulative frequency distribution reaches a predetermined value for the first time.

70. The apparatus in accordance with claim 69, wherein the correction table calculator sets a value produced by applying the basic correction table to the representative value, calculates a quasi-correction table for bringing the representative value to the target value and combines the basic correction table and said quasi-correction table to thereby produce the correction table.

71. The apparatus in accordance with claim 67, wherein the first characteristic value comprises at least one of a color difference and a chroma signal.

72. An image processing apparatus for executing signal processing with input image data, said apparatus comprising:
an image sensor for converting incident light to an electric image signal and output the image signal;
a detector for detecting a subject area, which is included in image area formed by image data converted the image signal and includes a subject, characteristically distinguishable from another area;
a representative value calculator for calculating a representative value of the subject area detected by said detector;
an exposure controller for controlling an exposure of said image sensor to a second exposure different from a first exposure calculated by using the representative value;
a memory for storing the first exposure and the second exposure as control information;
a correction table calculator for calculating a correction table based on the control information or image data picked up by the second exposure; and
a tone corrector for using the correction table to correct tone of the image data.

73. The apparatus in accordance with claim 72, wherein the correction table comprises gradation correction coefficients.

74. The apparatus in accordance with claim 73, wherein the second exposure is lower than the first exposure calculated by using the representative value.

75. The apparatus in accordance with claim 73, wherein said exposure controller calculates the first exposure from a third exposure calculated on the basis of a parameter other than the representative value and a fourth exposure calculated on the basis of only the representative value.

76. The apparatus in accordance with claim 75, further comprising a calculator for calculating a first representative value estimated from the first exposure and a second representative value estimated from the second exposure;
the first representative value and the second representative value being written to the memory.

77. The apparatus in accordance with claim 76, wherein the correction table calculator sets an output value derived from the second representative value as the first representative value and uses a maximum value and a minimum value that the image data can take and the output value to calculate the correction table.

78. The apparatus in accordance with claim 76, wherein the correction table calculator calculates the correction table in accordance with presence/absence of the subject area in the image data picked up by the second exposure.

79. The apparatus in accordance with claim 78, wherein when the subject area is present in the image data picked up by the second exposure, the correction table calculator calculates the representative value of the subject area, calculates a target value which is to become the output value of the representative value, and uses the maximum value and the minimum value and the target value to calculate the correction table.

80. The apparatus in accordance with claim 78, wherein when the subject area is absent in the image data picked up by the second exposure, the correction table calculator sets the second representative value as an input value while setting an output value derived from the input value as the first representative value and uses the maximum value and the minimum value and the output value to calculate the correction table.

81. The apparatus in accordance with claim 80, wherein the correction table calculator sets a value produced by applying the basic correction table to the representative value, calculates a quasi-correction table that brings the representative value toward the target value and combines said basic correction table and said quasi-correction table to thereby produce the correction table.

82. An image processing apparatus for executing signal processing with input image data, said apparatus comprising:
a detector for detecting a subject area, which is included in area of the image data and includes a subject, characteristically distinguishable from another area;
a representative value calculator for calculating a representative value of the subject area detected by said detector;
a characteristic amount calculator for calculating an amount of a characteristic in an entire image area represented by the image data or part of the entire image area;
a correction value calculator for calculating a correction value based on the representative value and the amount of the characteristic; and
a tone corrector for using the correction value to correct tone of the image data.

83. The apparatus in accordance with claim 82, wherein the correction value comprises a value for correcting a gain.

84. The apparatus in accordance with claim 82, wherein when the subject area is not detected by said detector, said tone corrector uses a basic correction value to be originally used to correct the tone of the image data.

85. The apparatus in accordance with claim 84, wherein the representative value comprises any one of luminance, brightness and one of three primary color components.

86. The apparatus in accordance with claim 85, wherein when a plurality of subject areas are detected by said detector, said representative value calculator reduces the subject areas to a predetermined number on the basis of at least one of conditions comprising the representative value, a position, a size and an evaluation value of the subject area and determines the representative value of each of resulting reduced subject areas.

87. The apparatus in accordance with claim 85, wherein when a plurality of subject areas are detected by said detector, said representative value calculator weights each subject area on the basis of at least one of conditions comprising the representative value, a position, a size and an evaluation value of the subject area, produces a mean value of representative values of resulting weighted subject areas and uses the mean value as the representative value.

88. The apparatus in accordance with claim 87, wherein said correction value calculator comprises:
a determining circuit for determining a target value which is an output value of the representative value; and
a calculator for setting the representative value as an input value and calculating the correction value on the basis of a ratio of the target value to the input value.

89. The apparatus in accordance with claim 88, wherein said determining circuit comprises:
a temporary target value determining circuit for setting a value assumed on the basis of the representative value as a temporary target value;
a temporary correction value calculator for calculating a temporary correction value from the temporary target value; and
a difference calculator for calculating a first characteristic amount produced by applying the basic correction value to the image data and a second characteristic amount produced by applying the temporary correction value to the image data and calculating a difference between the first characteristic amount and the second characteristic amount;
the temporary target value being corrected in accordance with the difference, and a resulting corrected target value being set as the target value.

90. The apparatus in accordance with claim 88, wherein said determining circuit comprises:
a temporary target value determining circuit for setting a value assumed on the basis of the representative value as a temporary target value;
a temporary correction value calculator for calculating a temporary correction value from the temporary target value;
a difference calculator for calculating a first characteristic amount produced by applying the basic correction value to the image data and a second characteristic amount produced by applying the temporary correction value to the image data and calculating a difference between the first characteristic amount and the second characteristic amount;
a decider for determining whether or not the difference lies in a predetermined allowable range; and
a resetter for setting a new temporary target value when the difference does not lie in the allowable range;
said determining circuit causing said temporary target value calculator, said difference calculator, said decider and said resetter to sequentially, repeatedly operate and setting the temporary target value as the target value in accordance with a difference brought into the allowable range.

91. The apparatus in accordance with claim 88, wherein said determining circuit comprises:
a temporary target value determining circuit for setting a value assumed on the basis of the representative value as a temporary target value;
a temporary correction value calculator for calculating a temporary correction value from the temporary target value;
a difference calculator for calculating a first characteristic amount produced by applying the basic correction value to the image data and a second characteristic amount produced by applying the temporary correction value to the image data and calculating a difference between the first characteristic amount and the second characteristic amount; and
a ratio calculator for extracting pixels with luminance higher than predetermined luminance from the image data to which the temporary correction value is applied and calculating a ratio of extracted pixels to all pixels as a third characteristic amount;
said determining circuit correcting the temporary target value in accordance with the difference and the third characteristic amount and setting a resulting corrected temporary target value as the target value.

92. The apparatus in accordance with claim 88, wherein said determining circuit comprises:

a temporary target value determining circuit for setting a value assumed on the basis of the representative value as a temporary target value;

a decider for determining whether or not flash light is emitted; and a characteristic calculator for producing a frequency distribution of luminance from the image data to which the basic correction value is applied and calculating a fourth characteristic amount based on said frequency distribution of luminance;

said determining circuit correcting the temporary target value and the fourth characteristic amount in response to an emission of the flash light and setting a resulting corrected temporary target value as the target value.

93. The apparatus in accordance with claim 92, wherein a cumulative distribution is produced from the frequency distribution of luminance, and the fourth characteristic amount comprises luminance to hold when the cumulative frequency distribution reaches a predetermined value for the first time.

94. An image processing apparatus for executing signal processing with input image data, said apparatus comprising:

an image sensor for converting incident light to an electric image signal and output the image signal;

a detector for detecting a subject area, which is included in image area formed by the image data converted the image signal and includes a subject, characteristically distinguishable from another area;

a representative value calculator for calculating a representative value of the subject area detected by said detector;

an exposure controller for controlling an exposure of said image sensor to a second exposure different from a first exposure calculated by using the representative value;

a memory for storing the first exposure and the second exposure as control information;

a correction value calculator for calculating a correction value based on the control information or image data picked up by the second exposure; and a tone corrector for using the correction value to correct tone of the image data.

95. The apparatus in accordance with claim 94, wherein the correction value comprises a value for correcting a gain.

96. The apparatus in accordance with claim 95, wherein the second exposure is lower than the first exposure calculated by using the representative value.

97. The apparatus in accordance with claim 96, wherein said exposure controller calculates the first exposure from a third exposure calculated on the basis of a parameter other than the representative value and a fourth exposure calculated on the basis of only the representative value.

98. The apparatus in accordance with claim 97, further comprising a calculator for calculating a first representative value estimated from the first exposure and a second representative value estimated from the second exposure;

the first representative value and the second representative value being written to the memory.

99. The apparatus in accordance with claim 98, wherein said correction value calculator sets an output value derived from the second representative value as the first representative value and uses a maximum value and a minimum value that the image data can take and the output value to calculate the correction table.

100. The apparatus in accordance with claim 99, wherein said correction value calculator calculates the correction value in accordance with presence/absence of the subject area in the image data picked up by the second exposure.

101. The apparatus in accordance with claim 100, wherein when the subject area is present, said correction value calculator calculates the representative value of the subject area represented by the image data, sets the representative value as an input value, sets an output value derived from the representative value as the target value, and calculates the correction value on the basis of a ratio of the target value to the input value.

102. The apparatus in accordance with claim 100, wherein when the subject area is absent in the image data picked up by the second exposure, said correction value calculator sets the second representative value as an input value while setting an output value derived from the input value as the first representative value and calculates the correction value on the basis of a ratio of the first representative value to the input value.

* * * * *